(12) United States Patent
Mori

(10) Patent No.: US 8,717,356 B2
(45) Date of Patent: May 6, 2014

(54) DISPLAY PROCESSING METHOD AND APPARATUS

(71) Applicant: Digital Process Ltd., Atsugi (JP)

(72) Inventor: Hiromi Mori, Isehara (JP)

(73) Assignee: Digital Process Ltd., Atsugi (JP)

( * ) Notice: Subject to any disclaimer, the term of this patent is extended or adjusted under 35 U.S.C. 154(b) by 0 days.

(21) Appl. No.: 13/898,049

(22) Filed: May 20, 2013

(65) Prior Publication Data

US 2013/0249911 A1    Sep. 26, 2013

Related U.S. Application Data

(63) Continuation of application No. PCT/JP2010/071566, filed on Dec. 2, 2010.

(51) Int. Cl.
 *G06T 17/20* (2006.01)

(52) U.S. Cl.
 USPC ........... 345/423; 345/419; 345/602; 345/581; 345/620

(58) Field of Classification Search
 CPC ......... G06T 17/20; G06T 17/30; G06T 17/40; G06F 17/50
 USPC .......... 345/419, 423, 442, 581, 606, 611, 620
 See application file for complete search history.

(56) References Cited

U.S. PATENT DOCUMENTS

| | | | |
|---|---|---|---|
| 5,283,860 A | | 2/1994 | Einkauf et al. |
| 5,377,320 A | | 12/1994 | Abi-Ezzi et al. |
| 6,600,485 B1 * | 7/2003 | Yoshida et al. | 345/419 |
| 6,996,505 B1 * | 2/2006 | Edelsbrunner et al. | 703/2 |
| 7,212,205 B2 * | 5/2007 | Uesaki et al. | 345/423 |
| 7,283,134 B2 * | 10/2007 | Hoppe | 345/423 |
| 7,348,976 B2 | 3/2008 | Mori | |
| 8,004,517 B1 * | 8/2011 | Edelsbrunner et al. | 345/419 |
| 8,259,101 B2 * | 9/2012 | Shimada et al. | 345/419 |

FOREIGN PATENT DOCUMENTS

| | | |
|---|---|---|
| JP | 4-289984 | 10/1992 |
| JP | 6-231261 | 8/1994 |
| JP | 8-180209 | 7/1996 |
| JP | 11-328436 | 11/1999 |

(Continued)

OTHER PUBLICATIONS

Vatti, Bala R., "A Generic Solution to Polygon Clipping," *Communications of the ACM*, Jul. 1992, vol. 35, No. 7, pp. 56-63.

(Continued)

*Primary Examiner* — Kimbinh T Nguyen
(74) *Attorney, Agent, or Firm* — Staas & Halsey LLP

(57) ABSTRACT

A disclosed method for displaying a shape of an object including a trimmed surface generated based on a base surface includes: dividing the base surface into plural triangles; generating a loop polygon for loops including an outer loop for defining an outer shape of the trimmed surface and an inner loop provided, in the outer loop, depending on the shape of the object; identifying plural sight-line single-valued areas, each of which satisfies a condition that mapping onto a projection surface is bijection, includes plural triangles, and is an area on the base surface, based on a positional relationship between a viewpoint and the base surface; generating, for each of the plural sight-line single-valued areas, mask data for each pixel from the sight-line single-valued area and the loop polygon; generating image data on the projection surface for each of the triangles; and perform drawing using the mask data and image data.

13 Claims, 53 Drawing Sheets

(56) References Cited

FOREIGN PATENT DOCUMENTS

| JP | 3344597 | 8/2002 |
|----|---------|--------|
| JP | 4437504 | 1/2010 |
| WO | WO 00/02165 | 1/2000 |

OTHER PUBLICATIONS

Austin, Shawn P. et al., "Comparison of discretization algorithms for NURBS surfaces with application to numerically controlled machining," *Computer-Aided Design*, vol. 29, No. 1, pp. 71-83, 1997.

Eberly, David, "Triangulation by Ear Clipping," Geometric Tools, LLC, http://www.geometrictools.com/Documentation/TriangulationByEarClipping.pdf Created Nov. 18, 2002, Last Modified: Mar. 1, 2008.

International Search Report mailed Jan. 18, 2011 in corresponding to International Application No. PCT/JP2010/071566.

\* cited by examiner

<BOUNDARY OF FRONT SURFACE/REAR SURFACE EDGE-CONNECTED BODY>::=<BOUNDARY POLYLINE> |
     <BOUNDARY OF FRONT SURFACE/REAR SURFACE EDGE-CONNECTED BODY>{<BOUNDARY OF FRONT SURFACE/REAR SURFACE EDGE-CONNECTED BODY>}
<BOUNDARY POLYLINE>::={<POINT><POINT ATTRIBUTE>}
<POINT ATTRIBUTE>::=<VERTEX> | <NON-VERTEX>
<NON-VERTEX>::=<CURVED SURFACE BOUNDARY POINT> | <CLOSED FRONT/REAR BOUNDARY POINT> | <OPEN FRONT/REAR BOUNDARY POINT>
<VERTEX>::= ϕ

FIG.35

<BOUNDARY OF FRONT SURFACE/REAR SURFACE EDGE-CONNECTED BODY>::=(<FACE><FACE ORDER INFO.>){(<FACE><FACE ORDER INFO.>)}|<BOUNDARY OF FRONT SURFACE/REAR SURFACE EDGE-CONNECTED BODY>{<BOUNDARY OF FRONT SURFACE/REAR SURFACE EDGE-CONNECTED BODY>}
<FACE ORDER INFO.>::=(<FACE ON VIEWPOINT SIDE><FACE ON OPPOSITE SIDE OF VIEWPOINT>)
<FACE ON VIEWPOINT SIDE>::=<FACE>|ϕ
<FACE ON OPPOSITE SIDE OF VIEWPOINT>::=<FACE>|ϕ
<FACE>::=(<PARTIAL BOUNDARY POLYLINE><ORDER INFO. OF PARTIAL BOUNDARY POLYLINE>){(<PARTIAL BOUNDARY POLYLINE><ORDER INFO. OF PARTIAL BOUNDARY POLYLINE>)}<ATTRIBUTE OF PARTIAL BOUNDARY>
<ORDER INFO. OF PARTIAL BOUNDARY POLYLINE>::=(<PARTIAL BOUNDARY POLYLINE ON VIEWPOINT SIDE><PARTIAL BOUNDARY POLYLINE ON OPPOSITE SIDE OF VIEWPOINT>)
<PARTIAL BOUNDARY POLYLINE>::=(<POINT><TRIANGLES OBTAINED BY DIVIDING BASE SURFACE><POINT ATTRIBUTE>){(<POINT><TRIANGLES OBTAINED BY DIVIDING BASE SURFACE><POINT ATTRIBUTE>)}
<ATTRIBUTE OF PARTIAL BOUNDARY>::=<CURVED SURFACE BOUNDARY>|<OPEN FRONT/REAR BOUNDARY POINT>|<CLOSED FRONT/REAR BOUNDARY POINT>|<SUPERPOSITION POLYLINE>
<POINT ATTRIBUTE>::=<NON-VERTEX ATTRIBUTE>|(<VERTEX ATTRIBUTE><VERTEX ORDER INFO.>)
<VERTEX ORDER INFO.>::=(<VERTEX ON VIEWPOINT SIDE><VERTEX ON OPPOSITE SIDE OF VIEWPOINT>)
<VERTEX ON VIEWPOINT SIDE>::=<VERTEX>|ϕ
<VERTEX ON OPPOSITE SIDE OF VIEWPOINT>::=<VERTEX>|ϕ
<VERTEX>::=<POINT>
<NON-VERTEX ATTRIBUTE>::=<CURVED SURFACE BOUNDARY POINT>|<CLOSED FRONT/REAR BOUNDARY POINT>|<OPEN FRONT/REAR BOUNDARY POINT>|<CURVED SURFACE PROJECTED POINT>
<VERTEX ATTRIBUTE>::=<SINGULAR POINT>|<SUPERPOSITION POINT>

FIG.44

SINGULAR POINT

| | FLAG | SUPPLEMENTAL INFO. (1) | SUPPLEMENTAL INFO. (2) | SUPPLEMENTAL INFO. (3) | SUPPLEMENTAL INFO. (4) |
|---|---|---|---|---|---|
| BASE SURFACE 1 | PLANE | GEOMETRIC DATA OF PLANE (3 ARBITRARY GRID POINTS) | | | GEOMETRIC DATA OF INTERSECTION LINE OF TANGENT PLANES |
| BASE SURFACE 2 | ARC SWEEPING BODY | GEOMETRIC DATA OF ARC SWEEPING BODY (AXIS, ...) | GEOMETRIC DATA 1 OF TANGENT PLANE THAT TOUCHES DEFINED BOUNDARY OF ARC SWEEPING BODY | GEOMETRIC DATA 2 OF TANGENT PLANE THAT TOUCHES DEFINED BOUNDARY OF ARC SWEEPING BODY | |
| BASE SURFACE 3 | SPHERE | GEOMETRIC DATA OF SPHERE (CENTER OF CURVATURE, END POINT OF BASE SURFACE) | GEOMETRIC DATA 1 OF CONE (AXIS, VERTEX, HALF ANGLE) | GEOMETRIC DATA 2 OF CONE (SYMMETRY WITH "1" USING VERTEX AS CENTER) | |
| BASE SURFACE 4 | FREE SURFACE | GEOMETRIC DATA OF FREE SURFACE (...) | GEOMETRIC DATA 1 OF CONE (AXIS, VERTEX, HALF ANGLE) | GEOMETRIC DATA 2 OF CONE (SYMMETRY WITH "1" USING VERTEX AS CENTER) | |
| BASE SURFACE 5 | NOT EXIST | ... | ... | ... | ... |
| ... | | | | | |

FIG.79

DISPLAY PROCESSING METHOD AND APPARATUS

CROSS-REFERENCE TO RELATED APPLICATIONS

This application is a continuing application, filed under 35 U.S.C. section 111(a), of International Application PCT/JP2010/071566, filed on Dec. 2, 2010.

FIELD

This technique relates to a display processing technique for displaying an object onto a display apparatus.

BACKGROUND

For example, in the Computer Aided Design (CAD), in order to express an object precisely, the object is often expressed as a collection of trimmed surfaces. As illustrated in FIG. 89, a trimmed surface is a certain area on a base surface 1001 or an expanded surface thereof, which is surrounded by an outer loop 1002 that is a closed line on a surface, which has no self-intersections, and is a figure that is generated by removing areas that are surrounded by inner loops 1003 and 1004 that are closed curves inside of the certain area. However, there are cases in which there are no inner loops 1003 and 1004. Moreover, there are special cases in which the boundary of the base surface matches the outer loop.

In a computer of a CAD system, information about an object surface that is formed from a collection of trimmed surfaces that are internally stored, and display conditions such as a viewpoint and lighting condition are given, and the shape of an object is displayed as a collection of trimmed surface images.

The term "trimmed surface" has been used since the time when a surface modeler was mainstream, however, it is used regardless of whether or not topological information, which is data that expresses the connection relationship between trimmed surfaces, is retained. In the case of a solid modeler that has data expressing the connection relationship between trimmed surfaces, a trimmed surface corresponds to the term "face".

The trimmed surfaces generated in the CAD cannot be displayed on a screen in the form of a curved surface that expresses the base surface or curves on a surface. Therefore, a conventional technique is known in which a display of trimmed surfaces is realized by executing approximation (tessellation or triangulation) of the trimmed surface in FIG. 89 to a collection of triangles such as illustrated in FIG. 90, and displaying each triangle using a Z buffer for a hidden-surface removal. The tessellation of a trimmed surface is characterized in that the curves on a surface and the curves of constant parameter values on the base surface are approximated to a series of line segments, and the intersections of both are referenced to perform triangulation, however, there is a problem in that tessellation of a trimmed surface requires a long calculation time.

On the other hand, in a graphics system that displays this kind of trimmed surfaces, there is conventional technique that uses the following mask, and the present invention is related to this conventional technique. In other words, in the conventional technique, based on the tessellation method, triangulation of the base surface is performed, and whether a trim curve intersects any triangle is determined. When any intersection occurs, a point of intersection between that triangle and the trim curve is calculated, and based on the intersecting state, a mask buffer is generated so that the inside of the trimmed surface is displayed. When pixels that correspond to the inside of the triangle are displayed on the display screen, "1", which means the mask is OFF, is set for each pixel in the mask buffer, and when the pixels are not displayed, "0" is set, which means the mask is ON. When displaying triangles that were generated by triangulation on the display screen, the pixel values of all of the pixels inside the triangles are calculated, and, when the mask value of a pixel is "1", the pixel is displayed on the display screen, and when the mask value of a pixel is "0", that pixel is not displayed on the screen. This display processing is repeated for all of the triangles. In a disclosed conventional technique, negative logic is employed, where "1" means the mask is OFF, and "0" means the mask is ON, however, when building a system, there is no problem in using positive logic, where "0" means the mask is OFF, and "1" means the mask is ON.

Even in the conventional technique that uses this kind of mask, the tessellation technique for the trimmed surfaces is used so the intersections with trim curves have to be determined for each triangle, and when there is a large number of triangles, many calculations for the intersection determination are performed, so there is a problem in that an excessive amount of calculation time is required.

SUMMARY

In one aspect, this technique is a display processing method for displaying a shape of an object including a trimmed surface generated based on a base surface, and the display processing method includes: (A) dividing the base surface into plural triangles, and storing data of generated plural triangles into a data storage unit; (B) generating a loop polygon for loops including an outer loop for defining an outer shape of the trimmed surface and an inner loop provided, in the outer loop, depending on the shape of the object, and storing data of the generated loop polygon into the data storage unit; (C) identifying one or plural sight-line single-valued areas, each of which satisfies a condition that mapping onto a projection surface is bijection, includes plural triangles, and is an area on the base surface, based on a positional relationship between a viewpoint and the base surface, and storing data of the sight-line single-valued area into the data storage unit; (D) generating, for each of the one or plural sight-line single-valued areas, mask data that is data for controlling whether or not display is performed for each pixel from the sight-line single-valued area and the loop polygon stored in the data storage unit, and storing the generated mask data into a mask data storage unit; (E) generating image data on the projection surface for each of the plural triangles stored in the data storage unit, and storing the image data into the data storage unit; and (F) performing a drawing processing from the mask data stored in the mask data storage unit, and the image data stored in the data storage unit.

BRIEF DESCRIPTION OF DRAWINGS

FIG. 35 is a diagram depicting an example of data that represents the edge-connected body in which the superposition is not taken into consideration and that is defined by Backus-Naur Form;

FIG. 44 is a diagram depicting an example of data that represents the edge-connected body in which the superposition is taken into consideration and that is defined by Backus-Naur Form;

FIG. 79 is a diagram depicting an example of data representing the sight-line single-valuedness definite volume;

DESCRIPTION OF EMBODIMENTS

Embodiment 1

Figure 1:
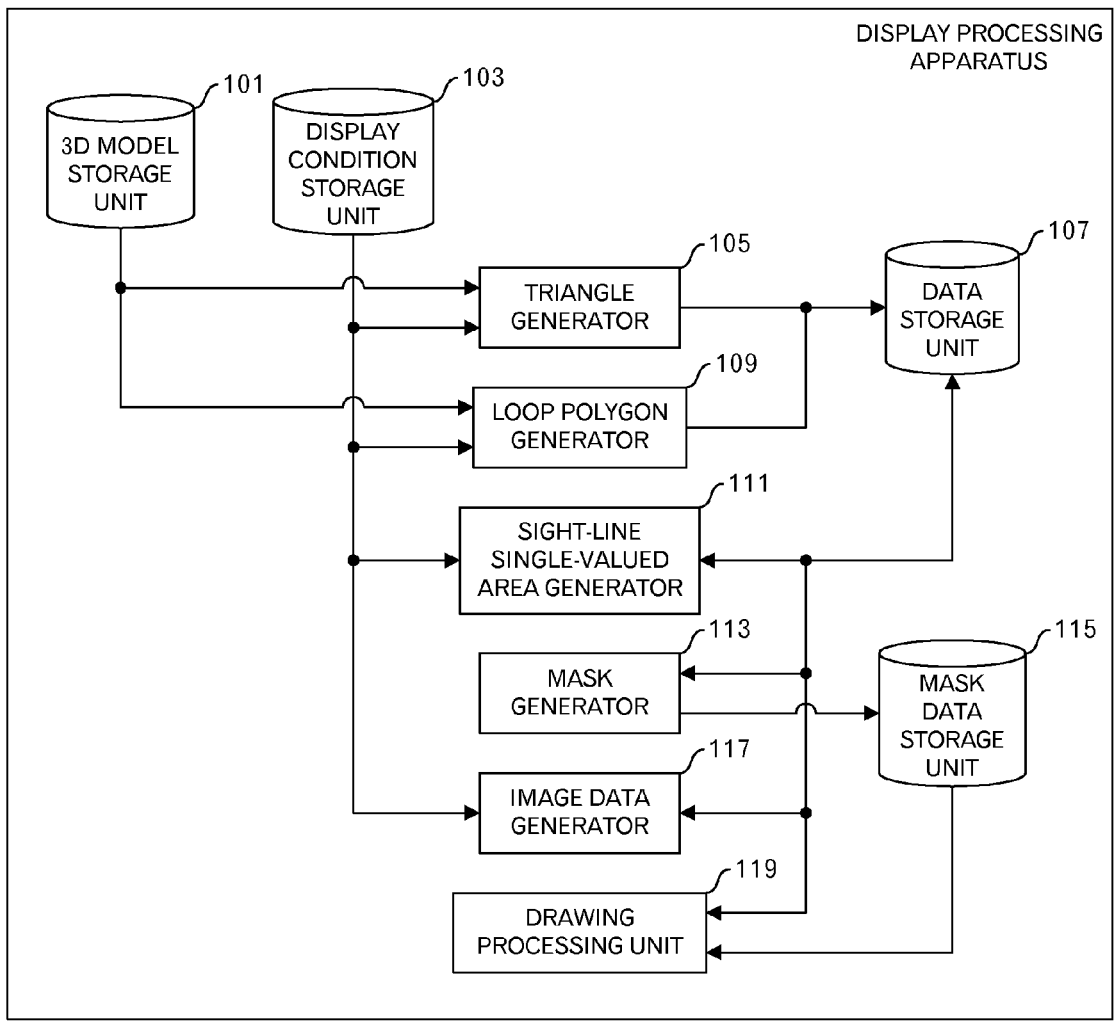
FIG. 1 is a functional block diagram of a display processing apparatus relating to a first embodiment.

FIG. 1 illustrates a functional block diagram of a display processing apparatus relating to this embodiment. The display processing apparatus relating to this embodiment has: a three-dimensional (3D) model storage unit 101 that stores three-dimensional model data that is generated by a CAD system; a display condition storage unit 103 that stores viewpoint data and lighting data within a three-dimensional space; a triangle generator 105; a data storage unit 107 that stores data during a processing; a loop polygon generator 109; a sight-line single-valued area generator 111; a mask generator 113; a mask data storage unit 115; an image data generator 117 and a drawing processing unit 119.

The triangle generator 105 divides the base surface to generate triangle data from data of the base surface, which is stored in the 3D model storage unit 101 and data stored in the display condition storage unit 103, and stores the generated data in the data storage unit 107. Moreover, the loop polygon generator 109 generates data of loop polygons that approximate the boundaries of a trimmed surface according to the level of detail of the model to be displayed from data of the trimmed surface, which is stored in the 3D model storage unit 101, and data stored in the display condition storage unit 103, and stores the generated data in the data storage unit 107. The sight-line single-valued area generator 111 uses the triangle data that is stored in the data storage unit 107 and the data stored in the display condition storage unit 103 to generate data of a sight-line single valued area that satisfies the condition that mapping to a projection plane is bijection, and stores the generated data in the data storage unit 107. Furthermore, the mask generator 113 generates mask data using a boundary data of the sight-line single-valued area and loop polygon data that are stored in the data storage unit 107, and stores the generated data in the mask data storage unit 115. Moreover, the image data generator 117 generates image data using the triangle data that is stored in the data storage unit 107 and the viewpoint and lighting data that are stored in the display condition storage unit 103, and stores the generated data in the data storage unit 107. The drawing processing unit 119 uses the image data that is stored in the data storage unit 107 and the mask data that is stored in the mask data storage unit 115 to perform a drawing processing.

Figure 2:
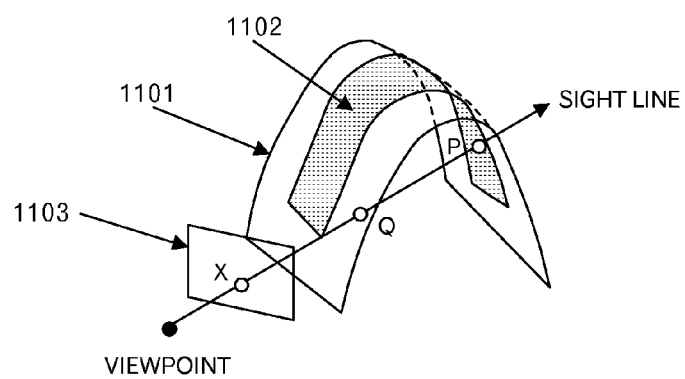
FIG. 2 is a diagram to explain a sight-line single-valued area.

Here, the sight-line single-valued area will be explained. First, the sight-line single-valuedness means one-to-one correspondence between a pixel and a display target. In other words, sight-line single-valuedness means that mapping onto a projection plane from a display target is bijective or one-to-one onto. In the example in FIG. 2, when the base surface 1101 is projected on the projection plane 1103 with respect to the viewpoint, point P and point Q correspond to one point (pixel) X. Therefore, the base surface 1101 as seen from this viewpoint is not said be sight-line single valued. In this case, by controlling the display state of the point P and point Q by using the mask information of the pixel X, there is contradiction in both in the display. Therefore, as will be described below, by dividing the base surface and performing display control using the mask, the point P that is on the trimmed surface 1102 is displayed, and display of the point Q that is not on the trimmed surface 1102 is suppressed. On the other hand, when the entire display target is sight-line single-valued, this problem does not occur. Here, an area that is sight-line single valued is called a sight-line single-valued area.

Next, the processing contents of the display processing apparatus that is illustrated in FIG. 1 will be explained using FIG. 3 to FIG. 26B. It is presumed that 3D model data that is expressed as a collection of trimmed surfaces is stored in advance in the 3D model storage unit 101, and viewpoint data, lighting data and the like are stored in advance in the display condition storage unit 103.

Figure 3:
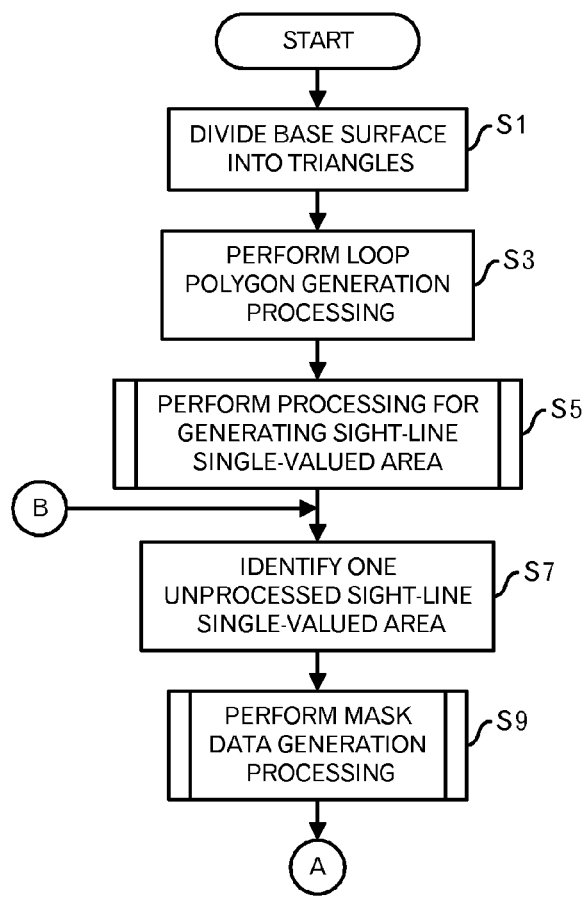
FIG. 3 is a diagram depicting a processing flow (first half) relating to the first embodiment.
Figure 4:
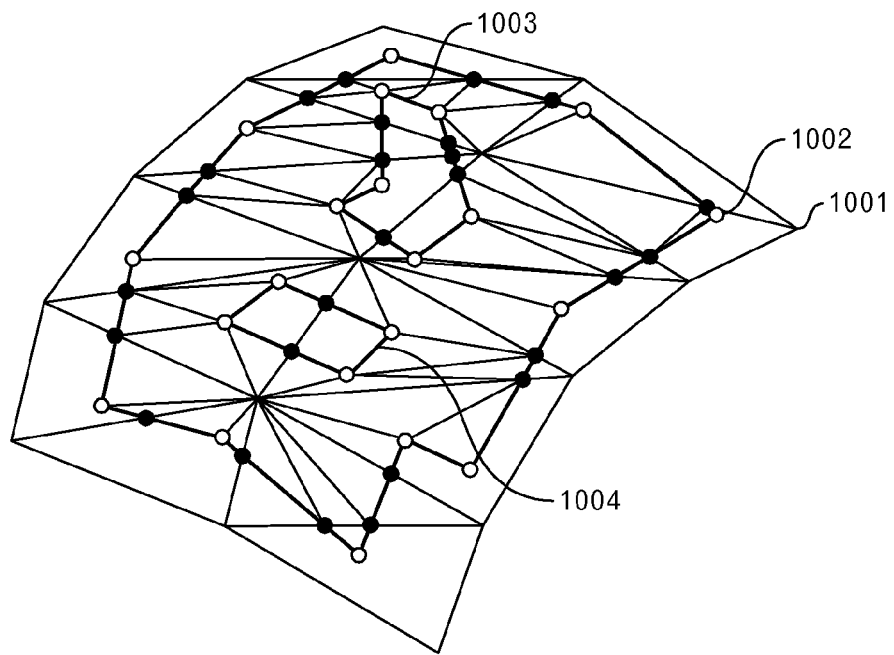
FIG. 4 is a diagram depicting an example of a base surface that is divided into triangles and a trimmed surface for which tessellation is carried out.
Figure 5:
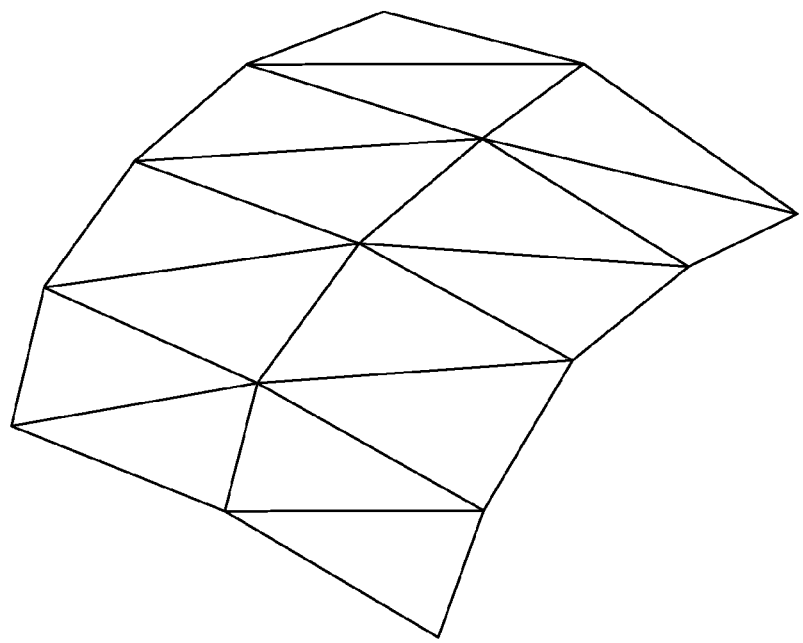
FIG. 5 is a diagram to explain triangulation of the base surface.

FIG. 3 illustrates the flow (first half) of the processing in this embodiment. First, the triangle generator 105 acquires data from the three-dimensional model storage unit 101 for a base surface relating to part of an object that is expressed as a three-dimensional (3D) model, and performs a triangulation processing (FIG. 3: step S1). In this embodiment, the base surface and trimmed surface illustrated in FIG. 4 will be explained as an example. At this step, the surface is divided such as illustrated in FIG. 5. The generated triangles are expressed by points in u, v parameter space or three-dimensional space. FIG. 5 illustrates an example of dividing the surface into triangles using equal parameters, however, the triangles do not need to be equal, and there is no problem even when the surface is divided into triangles that are as close as possible to equilateral triangles. The generated triangle data is stored in the data storage unit 107.

More specifically, first, the number of divisions of the base surface is set based on the level of detail (LOD) of the 3D model to be displayed. The level of detail is dynamically set based on viewpoint data and approximation tolerance that are stored, for example, in the display condition storage unit 103. Setting the level of detail is performed by a technique that is well-known to those skilled in the art, and, for example, is disclosed in Shawn P. Austin et al., "Comparison of Discretization Algorithms for NURBS Surfaces with Application to Numerically Controlled Machining", CAD vol. 29 no. 1, pp. 71-83, or disclosed in Japanese Patent No. 4437504.

After the number of divisions has been set, the u, v parameters of the division points can be calculated. Then, the coordinates of the vertices of the triangles can be calculated from the calculated u, v parameters. The calculation of the coordinates is geometric calculation that is well-known to those skilled in the art, and, for example, is disclosed in Gerald Farin; "Curves and Surfaces for Computer Aided Geometric Design", 2nd Edition, Academic Press Inc., CA, USA, 1990.

After connecting the vertices that were calculated by the aforementioned processing in the u, v directions, quadrangles that divide the base surface in a gridlike fashion are obtained. Then, the lattice diagonal triangles that are illustrated in FIG. 5 are obtained by connecting opposite angles of the quadrangles in the same direction. The lattice diagonal triangles can be expressed as a collection of points in table form, which are correlated with the u, v parameters. In other words, points in the three-dimensional space or parameter space can be expressed by a two-dimensional array. The vertices of the lattice diagonal triangles can be easily identified, and scanning of the divided triangles, which uses triangle strips in rows or columns, is possible, so it is advantageous from the aspect of high-speed processing. In the following, an explanation is given as dividing a base surface into the lattice diagonal triangles. A triangle strip means a series of coupled triangles that share at most two edges.

Figure 6:
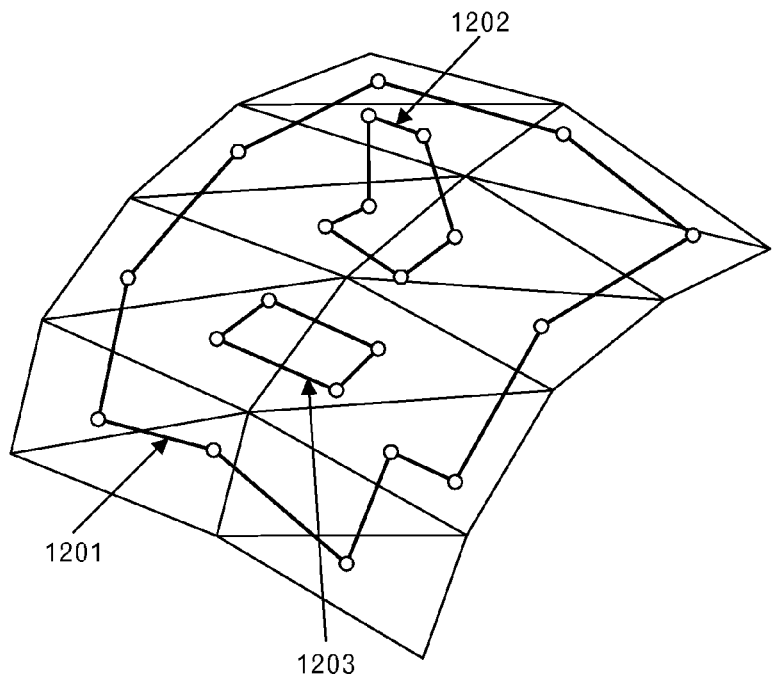
FIG. 6 is a diagram to explain a loop polygon.

Next, the loop polygon generator 109 acquires data from the 3D model storage unit 101 for the outer loop and inner loops that form the trimmed surface on the base surface, and generates loop polygons by approximating the outer loop and inner loops according to the level of detail of the model to be displayed (FIG. 3: step S3). Here, as illustrated in FIG. 6, outer loop polygon 1201 and inner loop polygons 1202 and 1203 are generated. Depending on the shape of the trimmed surface, there are cases in which there are no inner loops. The loop polygons, in many cases, are expressed as a polyline in the three-dimensional space, however, it is also possible to express loop polygons as a sequence of parameters for curved lines or curved surface. The data of the generated loop polygons is stored in the data storage unit 107.

At this step as well, first, the number of divisions of geometric curves that form the outer loop and inner loops is set. Similarly to the step S1, the number of divisions is dynamically set based on the viewpoint and approximation tolerance in the display state, and the number of divisions may be set with the level of detail, which is set at the step S1 as a reference.

After the number of divisions is calculated, the parameters of the curved line and coordinate values at the dividing points can be calculated. Similarly to the step S1, this also can be achieved by using the geometric calculation technique that is well known to those skilled in the art. Here, the dividing points that correspond to the connecting points of each edge in FIG. 6 are calculated. In other words, the loop polygons (white dots in FIG. 6) are generated by approximating the loops according to the level of detail of the model to be displayed, independent of the divided triangles of the base surface. In the conventional technique, as represented by the black dots, intersection points with the divided triangles are added to the loops, however, in this technique, the black dots in FIG. 4 are not added.

Typically, the 3D model to be displayed is formed by plural trimmed surfaces. In other words, adjacent trimmed surfaces share some edges of the outer loops. When the dividing points of the shared edges have already been calculated, the same dividing points may be adopted.

After that, the sight-line single-valued area generator 111 performs the processing for generating a sight-line single-valued area (FIG. 3: step S5). This processing for generating a sight-line single-valued area will be explained using FIG. 7 to FIG. 9. In this embodiment, as for the base surface illustrated in FIG. 4, which is a processing target, both the front surface edge-connected body and rear surface edge-connected body are respectively sight-line single-valued areas.

Figure 8:
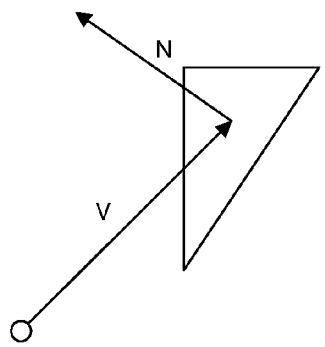
FIG. 8 is a diagram to explain an inner product for front/rear determination.
Figure 7:
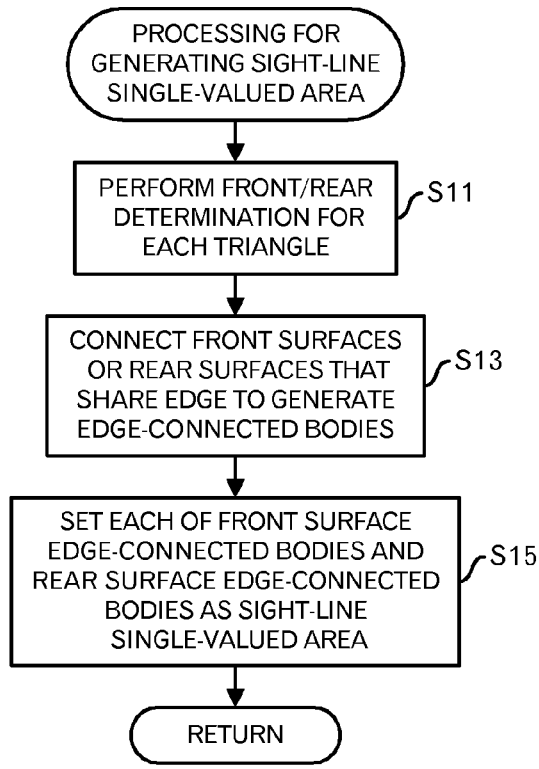
FIG. 7 is a diagram depicting a processing flow of a processing for generating a sight-line single-valued area in the first embodiment.

FIG. 7 illustrates a processing flow depicting the processing for generating a sight-line single-valued area in this embodiment. First, the sight-line single-valued area generator 111 acquires the triangle data that was generated at the step S1 (FIG. 3) and stored in the data storage unit 107, and the viewpoint data that is stored in the display condition storage unit 103, and performs front/rear determination for data of each triangle (FIG. 7: step S11). Data representing the determination results is temporarily stored in the data storage unit 107, for example. Here, as illustrated in FIG. 8, the side discriminative inner product, which is the inner product of the vector V from the view point to the triangle and the normal vector N of the triangle that has a direction is calculated, and when the inner product is a negative value, it is determined that the surface is a front surface.

This step is not performed in order to limit the processing targets to front surfaces. In the case of a special processing target, for example, in the case of the surface that is limited to a closed curved surface, such as disclosed in International Publication Pamphlet No. WO00/002165, the rear surface is eliminated as processing targets. However, when the technical field such as CAD is the main field, it is typically requested to also display the rear surface.

Figure 9:
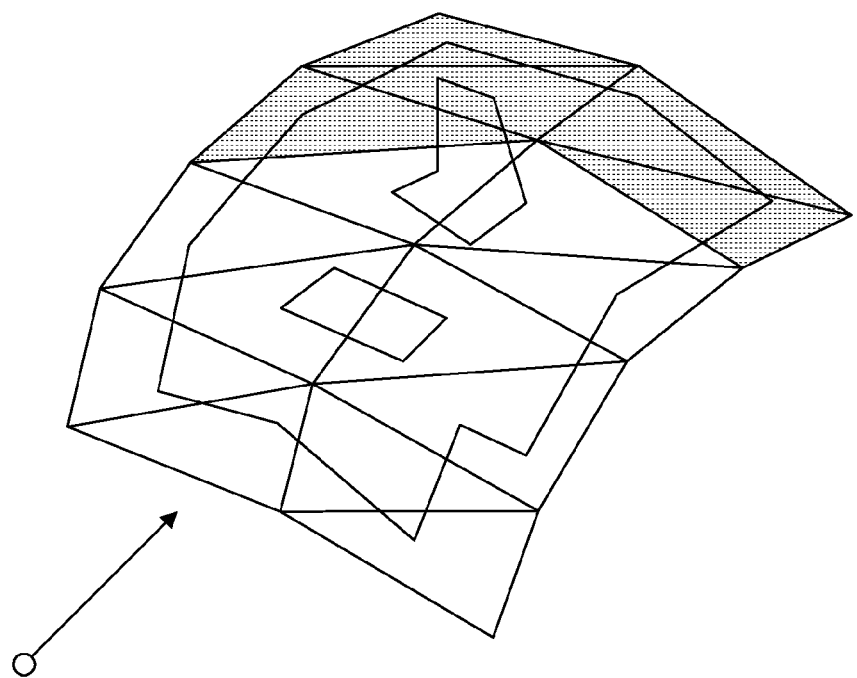
FIG. 9 is a diagram to explain a front surface edge-connected body and a rear surface edge-connected body.
Figure 11:
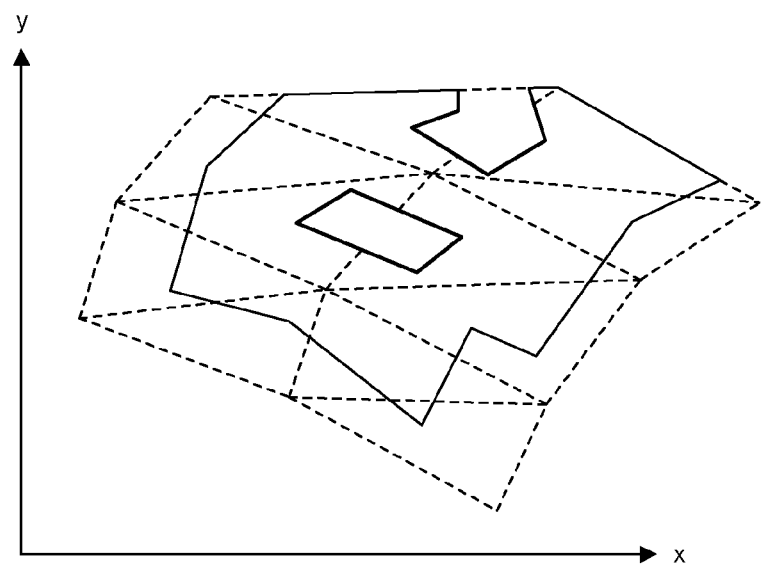
FIG. 11 is a diagram in which the front surface edge-connected body is represented on a screen coordinate system.

The sight-line single-valued area generator 111 then uses the data representing the result of the front/rear determination, which is stored in the data storage unit 107, to connect front surfaces that share edges or rear surfaces that share edges, and generates a front surface edge-connected body and rear surface edge-connected body (FIG. 7: step S13). The sight-line single-valued area generator 111 also stores data of boundary polylines for the front surface edge-connected body and rear surface edge-connected body in the data storage unit 107. Here, as illustrated in FIG. 9, using the triangles obtained by dividing the base surface, an area of which the front surface faces the viewpoint (white area) and an area of which the rear surface faces the viewpoint (hatched area) are generated.

In the case of typical divided triangles that have no regularity, it is possible to generate a front surface edge-connected body and rear surface edge-connected body using an advancing front method from one triangle. On the other hand, when the base surface is divided into lattice diagonal triangles, it is possible to perform a processing at high speed with scanning that uses triangle strips in the column direction or row direction of the grid.

After that, the sight-line single-valued area generator 111 identifies each of the front surface edge-connected body and rear surface edge-connected body that are stored in the data storage unit 107 as sight-line single-valued areas (step S15). In the case of the base surface illustrated in FIG. 4, the front surface edge-connected body and rear surface edge-connected body that are illustrated in FIG. 9 are respectively identified as a sight-line single-valued area. Data representing the sight-line single-valued area is registered in correlation with the boundary polyline that represents the front surface edge-connected body or rear surface edge-connected body that is stored in the data storage unit 107. Then, the sight-line single-valued area generation processing ends and the processing returns to the processing in FIG. 3.

Returning to the processing in FIG. 3 (first half of the processing flow), the mask generator 113 acquires one unprocessed sight-line single-valued area that is stored in the data storage unit 107 (step S7). In the case where the entire base surface is a sight-line single-valued area, the entire base surface is acquired. The mask generator 113 also acquires the data of the loop polygon from the data storage unit 107. Then, the mask generator 113 performs a mask data generation processing (step S9). This mask data generation processing will be explained using FIG. 10 to FIG. 20.

Figure 10:
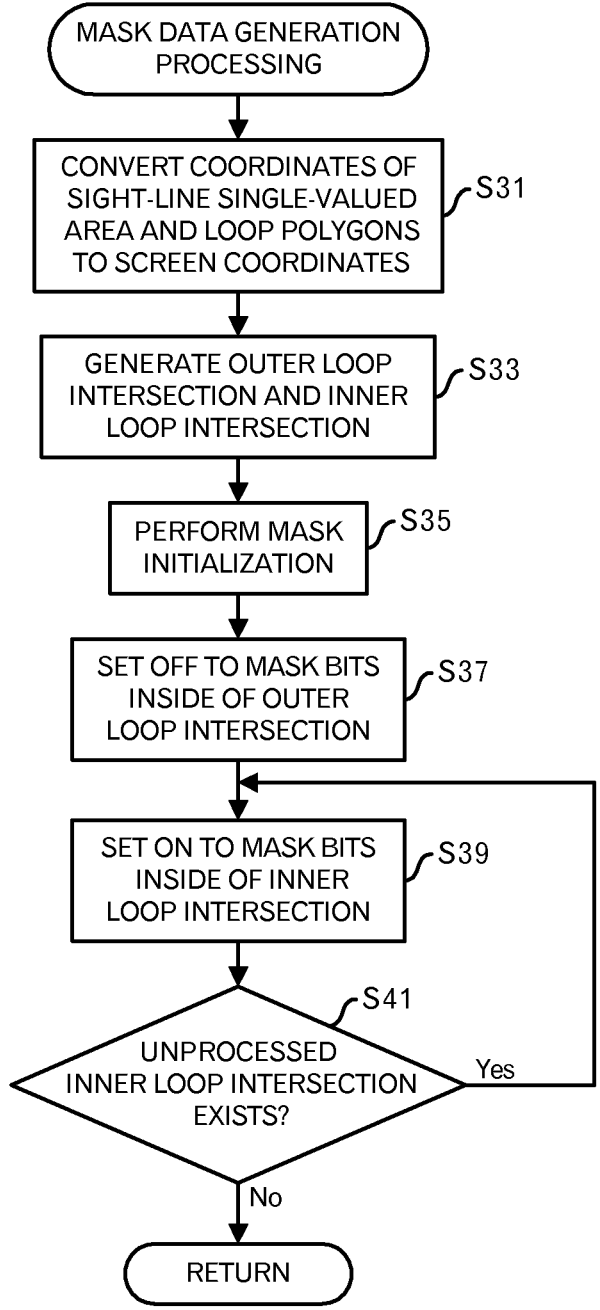
FIG. 10 is a diagram depicting a processing flow of a mask data generation processing in the first embodiment.
Figure 12:
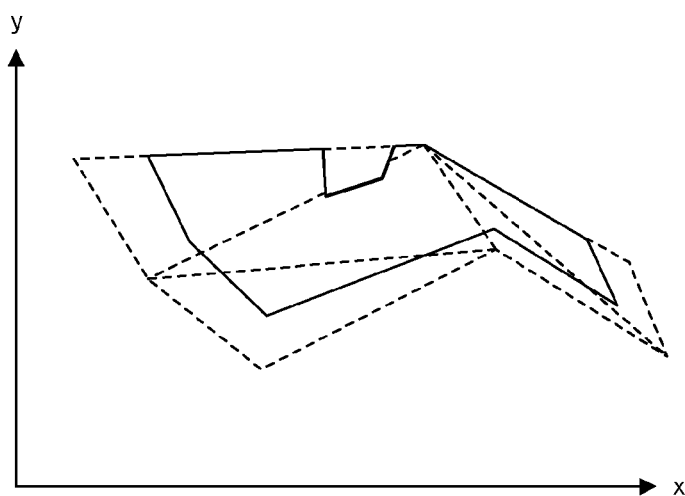
FIG. 12 is a diagram in which the rear surface edge-connected body is represented on a screen coordinate system.

In the mask data generation processing in FIG. 10, first, the mask generator 113 converts the coordinates of the acquired sight-line single-valued area and the loop polygons to screen coordinates, and stores the converted coordinates in the data storage unit 107 (FIG. 10: step S31). At this step, in the case where the front surface edge-connected body in FIG. 9 is the sight-line single-valued area to be processed, the coordinates are converted to screen coordinates as in FIG. 11. Moreover, in the case where the rear surface edge-connected body in FIG. 9 is a sight-line single-valued area to be processed, the coordinates are converted to screen coordinates as in FIG. 12.

Next, the mask generator 113 uses data of the sight-line single-valued area and loop polygons, which are stored in the data storage unit 107, to generate a loop intersection, which is an intersection between inner loops and outer loop and front surface edge-connected body or rear surface edge-connected body, and stores the result in the data store unit 107 (FIG. 10: step S33). Here, with the sight-line single-valued area, and the outer loop polygon and inner loop polygons that cross the sight-line single-valued area as inputs, an outer loop intersection and inner loop intersection are obtained. For example, the loop intersection can be generated by polygon-clipping of the boundary polyline of the sight-line single-valued area and the boundary polylines of the loop polygons. The method for performing the polygon clipping is a well-known technique, for example, in Bala R. Vatti, "A Generic Solution to Polygon Clipping", Communications of the ACM, July 1992 (vol. 35), pp. 56 to 63, and an example is described in which a scan line calculation method is used to select, based on union, difference, or intersection, fragments caused by the crossing. The clipping that is performed at the step S33 and the like can be performed in a parameter space, in a physical space, in a camera coordinate system and in a screen coordinate system. In this embodiment, a screen coordinate system is employed.

Figure 13:
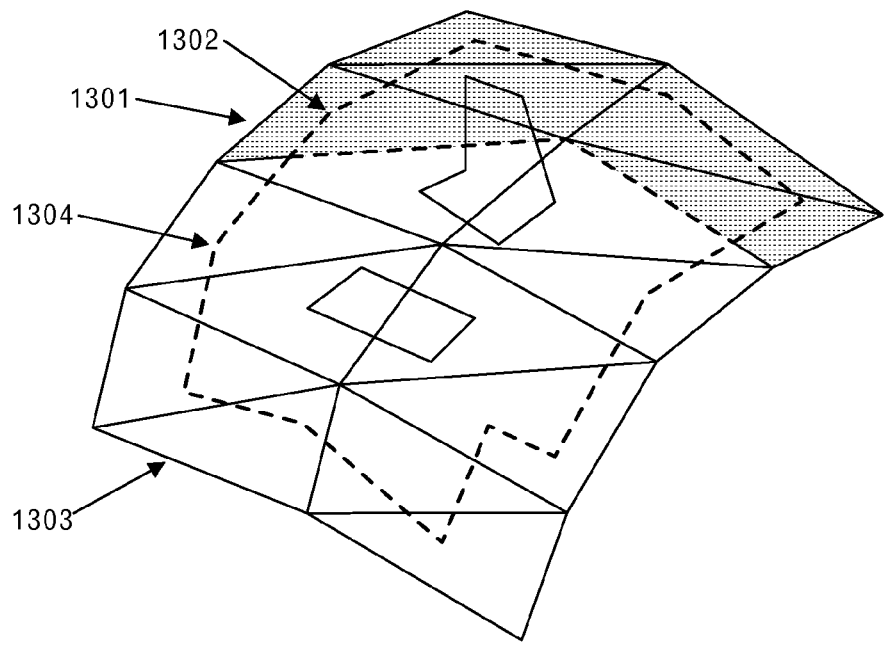
FIG. 13 is a diagram to explain an outer loop intersection (in polygon clipping)
Figure 14:
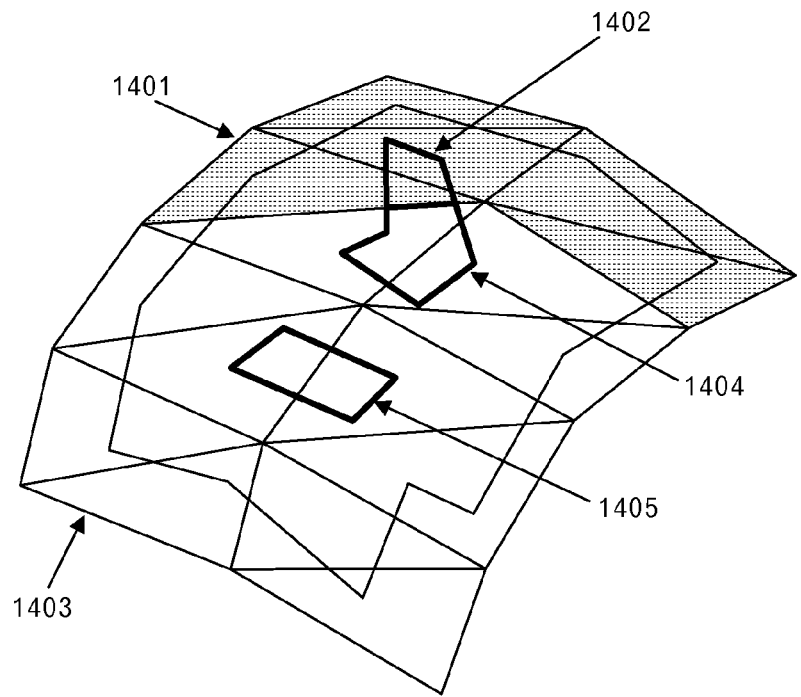
FIG. 14 is a diagram to explain an inner loop intersection (in polygon clipping)
Figure 15:
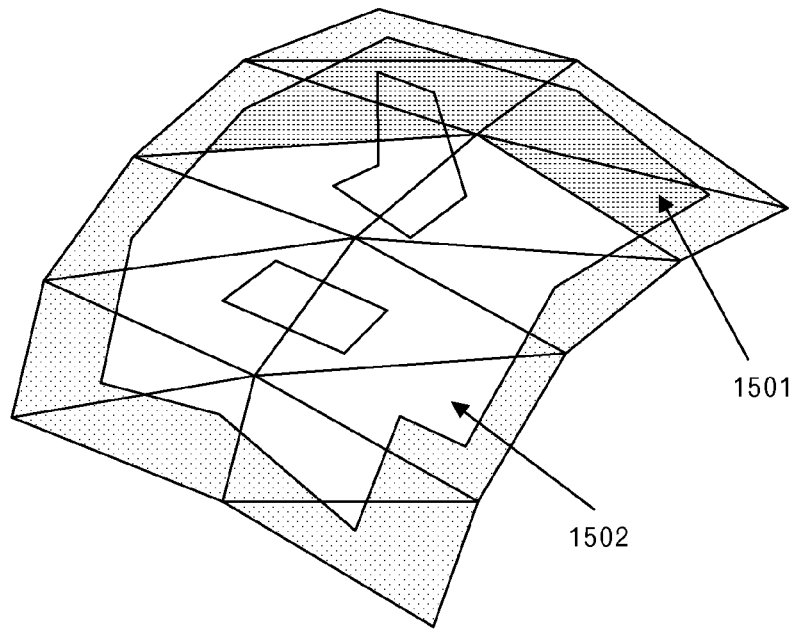
FIG. 15 is a diagram to explain generation of mask data.

At this step, an outer loop intersection such as illustrated in FIG. 13 and inner loop intersections such as illustrated in FIG. 14 are obtained for the sight-line single-valued area that is the object of processing. In FIG. 13, the contour of the outer loop intersection is illustrated by the dashed line. In the case where the sight-line single-valued area 1301 (with hatching) is the object of processing, the outer loop intersection 1302 (with hatching) is generated, and in the case where the sight-line single-valued area 1303 (with no hatching) is the object of processing, the outer loop intersection 1304 (with no hatching) is generated. Moreover, in FIG. 14, the contours of the inner loop intersections are illustrated by solid lines. When the sight-line single-valued area 1401 (with hatching) is the object of processing, the inner loop intersection 1402 (with hatching) is generated, and when the sight-line single-valued area 1403 (with no hatching) is the object of processing, the inner loop intersections 1404 and 1405 (with no hatching) are generated.

The mask generator 113 in FIG. 1 initializes the mask data in the mask data storage unit 115 so that masks for all of the pixels are ON (FIG. 10: step S35). ON or OFF is set as the mask data in pixel units, and the drawing processing for pixels for which ON is set as the mask data is suppressed, and the drawing processing for pixels for which OFF is set as the mask data is carried out.

Figure 16:
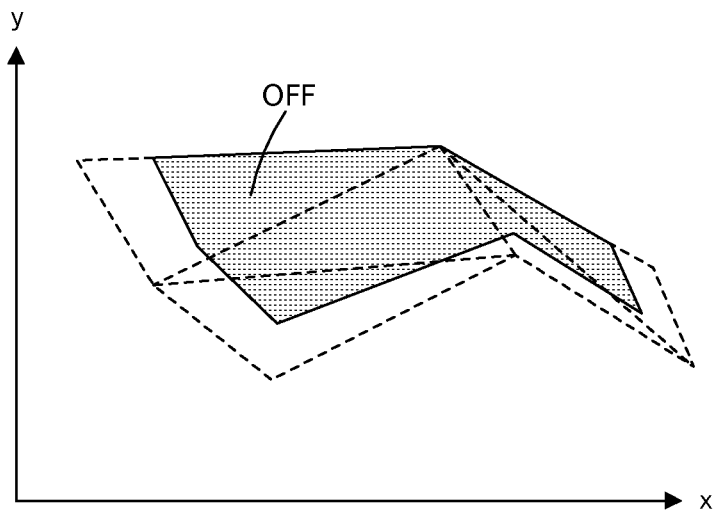
FIG. 16 is a diagram to explain the generation of the mask data.
Figure 17:
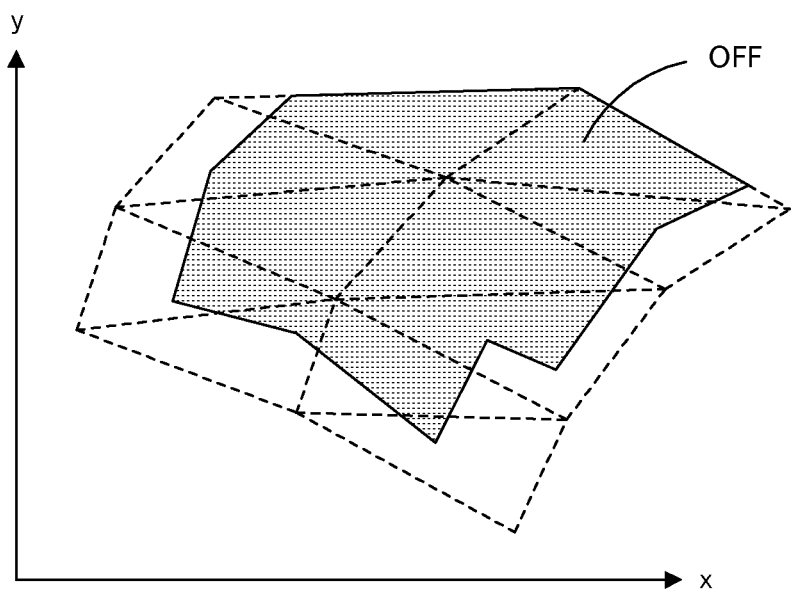
FIG. 17 is a diagram to explain the generation of the mask data.
Figure 18:
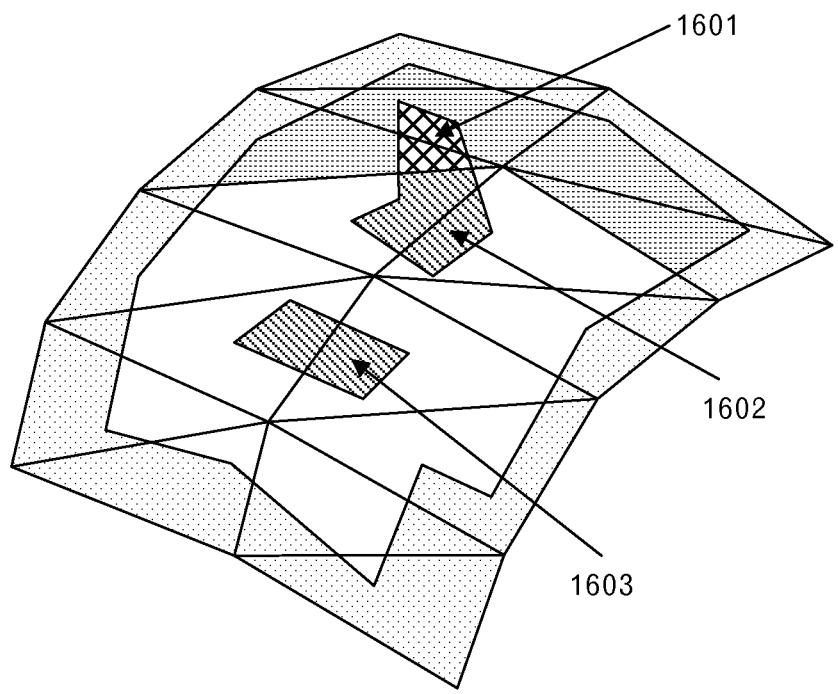
FIG. 18 is a diagram to explain the generation of the mask data.

The mask generator 113 uses the boundary data of the outer loop intersection, which is stored in the data storage unit 107, to set OFF to the mask data that corresponds to the inside of the outer loop intersection (FIG. 10: step S37). As methods for identifying the pixels inside the loop polygons, a method of dividing the loop polygons into triangles (projected polygon triangulation method), or a method of filling the loop polygons with scan lines (pixel scan line method) are well known and will be described in detail later. At this step, when the sight-line single-valued area 1301 in FIG. 13 is the object of processing, OFF is set to the mask data for the area that corresponds to the inside of the outer loop intersection 1501 in FIG. 15. Moreover, when the sight-line single-valued area 1303 in FIG. 13 is the object of processing, OFF is set to the mask data for the area that corresponds to the inside of the outer loop intersection 1502 in FIG. 15. When expressed as screen coordinates, OFF is set to the outer loop intersection 1501 in FIG. 15 as illustrated in FIG. 16, and OFF is set to the outer loop intersection 1502 in FIG. 15 as illustrated in FIG. 17.

As illustrated in FIG. 13 to FIG. 17, any points other than the intersection points between the loops and the front surface edge-connected body and rear surface edge-connected body are not added to the boundary of the outer loop intersection at the step S37. However, in conventional methods, as illustrated in FIG. 4, in a method that uses tessellation as it is, or in a method that uses masks as disclosed in the Japanese Laid-open Patent Publication No. 4-289984, a lot of intersection points between the loops and the divided triangles are added. In this embodiment, the time for the intersection point calculation for adding intersection points, and the time required for generating divided triangles for the display or generation of the mask data is greatly reduced. Here, one effect of this embodiment becomes apparent.

Figure 19:
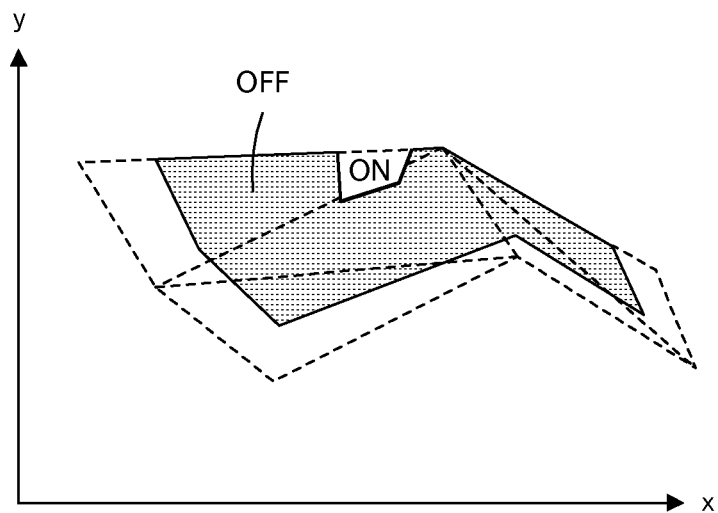
FIG. 19 is a diagram to explain the generation of the mask data.
Figure 20:
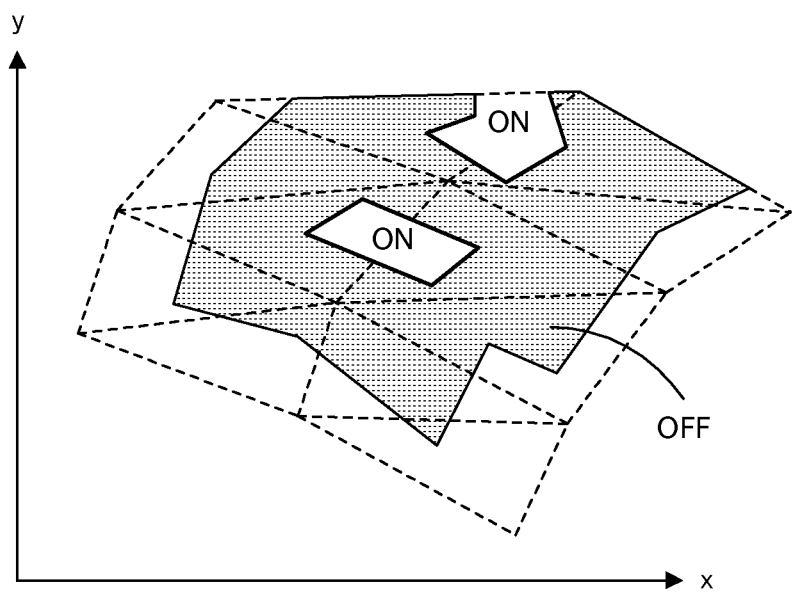
FIG. 20 is a diagram to explain the generation of the mask data.
Figure 22:
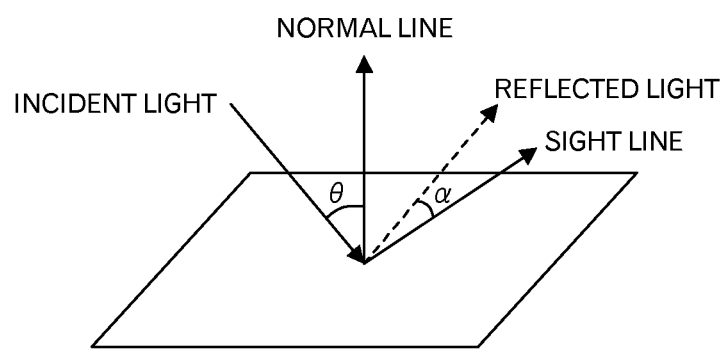
FIG. 22 is a diagram to explain the shading.

Furthermore, after that, the mask generator 113 in FIG. 1 uses data of the inner loop intersection, which is stored in the data storage unit 107, to set ON to the mask data that corresponds to the inside of the inner loop intersection (FIG. 10: step S39). As described above, depending on the shape of the trimmed surface, there are cases in which there are no inner loops. When there are no inner loops, the processing of this step is omitted. Moreover, it is possible to use the projected polygon triangulation method or the pixel scan line method as at the step S37 as the method for identifying the pixels inside the inner loop intersection. At this step, when the sight-line single-valued area 1401 in FIG. 14 is the object of processing, ON is set to the mask data for the area that corresponds to the inside of the inner loop intersection 1601 in FIG. 18. When the sight-line single-valued area 1403 in FIG. 14 is the object of processing, ON is set to the mask data for the areas that correspond to the inside of the inner loop intersections 1602 and 1603 in FIG. 18. When expressed with screen coordinates, ON is set to the inner loop intersection 1601 in FIG. 18 as illustrated in FIG. 19, and ON is set to the inner loop intersections 1602 and 1603 in FIG. 18 as illustrated in FIG. 20. Then, the mask generator 113 determines whether there is any unprocessed inner loop intersection (FIG. 10: step S41), and when there is an unprocessed inner loop intersection, the processing returns to the step S39. Here, the step S39 is repeated for each of the inner loops. On the other hand, when there are no unprocessed inner loop intersections, the mask data generation processing ends, and the processing returns to the processing in FIG. 3, then the processing shifts to the processing in FIG. 21 by way of terminal A.

The processing for generating mask data can also be achieved by an exclusive OR of the loop intersections. An example of using an exclusive OR is disclosed in Japanese Laid-open Patent Publication No. 4-289984. In the case of using the exclusive OR, pixels to which ON is set as mask data are displayed, and the display of the pixels to which OFF is set as the mask data is suppressed, and by using mask data in which ON is set to the inside of the outer loop polygon and inner loop polygons, it is possible to apply this method to this embodiment. The processing in FIG. 3 (first half of the processing flow) is now completed, so the processing advances to FIG. 21.

Figure 21:
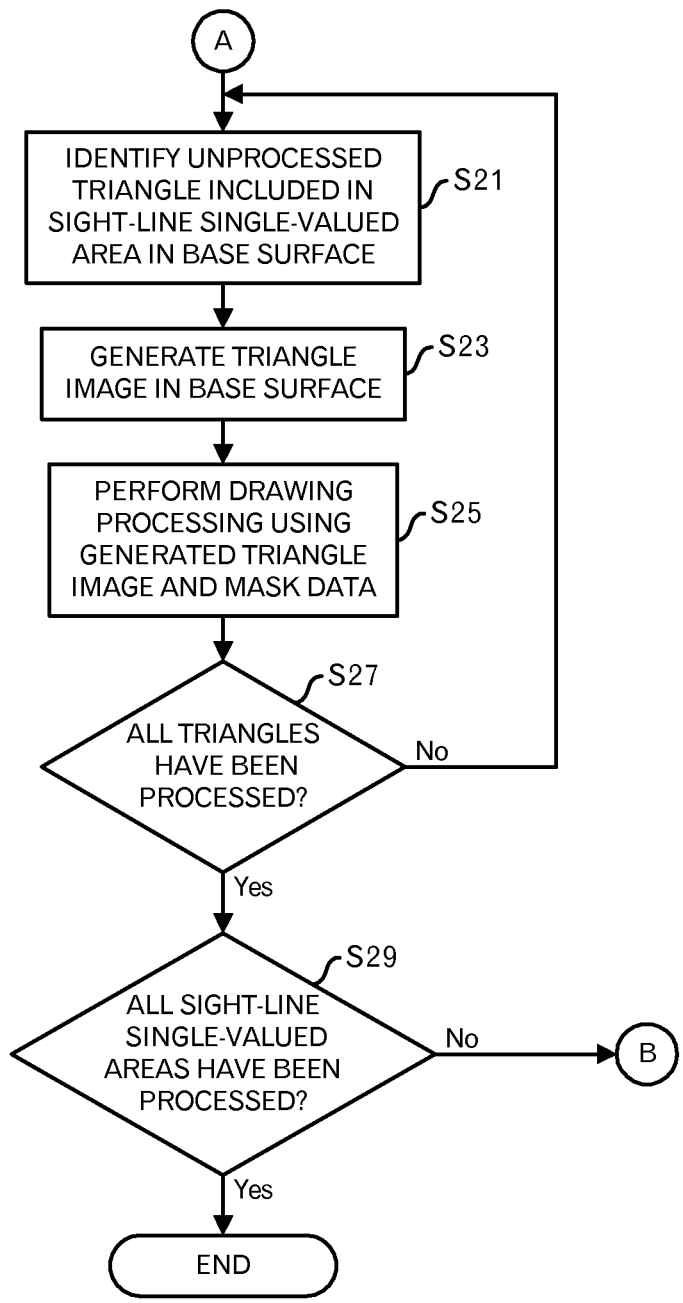
FIG. 21 is a diagram depicting a processing flow (second half) relating to the first embodiment.

FIG. 21 illustrates a processing flow (latter half) of this embodiment. The image data generator 117 acquires, from the data storage unit 107, data of one unprocessed triangle that is included in the sight-line single-valued area among the triangle data that was generated by dividing the base surface (FIG. 21: step S21). Then, the image data generator 117 generates image data for the acquired triangle, and stores the generated data in the data storage unit 107 (step S23). Here, image data is generated by using triangle data that is generated by dividing the base surface and stored in the data storage unit 107, and viewpoint data and lighting data that are stored in the display condition storage unit 103. More specifically, the coordinate conversion is carried out for a triangle that is the object of processing to display the triangle on the screen coordinate system. Moreover, the distance from the viewpoint is calculated for each point on the triangle, which corresponds to each pixel on the screen coordinate system, then saved as depth information (Z values) and used for removing hidden surfaces by comparing with the values in a Z buffer. Then, the color information for the pixels is calculated, for example, using the Phong reflection model illustrated in FIG. 22. The output light intensity is calculated using the following equation. However, here, the ambient light is omitted.

$$C = K_d L_d \cos\theta + K_s L_s (\cos\alpha)^k$$

Here, C represents output light intensity, $L_d$ represents diffuse reflection light intensity, $K_d$ represents diffuse reflectivity (which is positive, and equal to or less than 1), $K_s$ represents mirror reflectivity (which is positive, and equal to or less than 1), $\theta$ represents an angle between the normal direction and the light source direction, $\alpha$ represents an angle between the mirror reflection light and direction of sight, and k represents glossiness (when the object is smooth and the reflection of the object is closer to the mirror reflection, the value becomes greater.).

According to the aforementioned processing, the positions of the pixels, Z values and color information are calculated. After that, the drawing processing unit 119 uses the image data that is stored in the data storage unit 107 and the mask data that is stored in the mask data storage unit 115 to perform the drawing processing of the frame buffer (FIG. 21: step S25). Here, for a pixel whose mask data is OFF, the Z buffer value that is stored for that pixel is compared with the Z value, and when the Z value represents it is closer to the viewpoint side, the frame buffer is updated with the color information for that pixel. Moreover, the Z buffer is updated with the Z value. On the other hand, the drawing is not performed for a pixel whose mask data is ON.

After that, the image data generator 117 determines whether there is any unprocessed triangle in the sight-line single-valued area (FIG. 21: step S27), and when there is an unprocessed triangle, the processing returns to the step S21. On the other hand, when there are no unprocessed triangles, the mask generator 113 determines whether there is an unprocessed sight-line single-valued area (step S29), and when there is an unprocessed area, the processing returns to the step S7 by way of terminal B. However, when there are no unprocessed sight-line single-valued areas, the processing ends.

One trimmed surface is drawn by the aforementioned processing. In order to draw an entire 3D model that is the object of display, such a processing is performed for plural trimmed surfaces for the 3D model. Moreover, as the position or angle of the viewpoint is changed, or as the object of display is enlarged or reduced, the processing from the step S5 (FIG. 3) is performed again for the entire 3D model. When the level of detail that is used at the step S1 or step S3 is changed, the processing of the step S1 or step S3 is performed again. Moreover, data for the polyline, which corresponds to the level of detail, for the loop polygons that were generated by approximating the boundaries of triangles that were generated by dividing the base surface or boundaries of the trimmed surfaces may be held to omit recalculation.

Here, the generation of the mask data at the steps S37 and S39 (FIG. 10) will be described in more detail.

(A) Projected Polygon Triangulation Method

Figure 23:
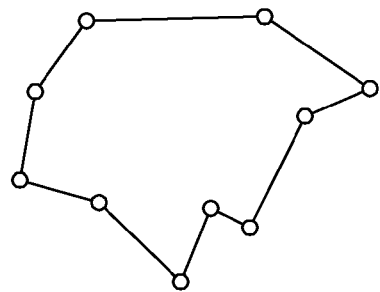
FIG. 23 is a diagram to explain triangulation of the projected loop intersection.
Figure 24:
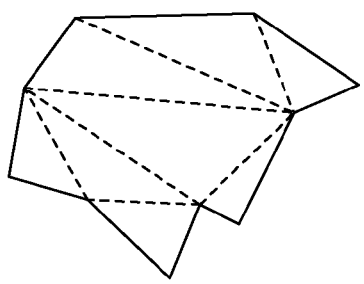
FIG. 24 is a diagram to explain the triangulation of the projected loop intersection.
Figure 25:
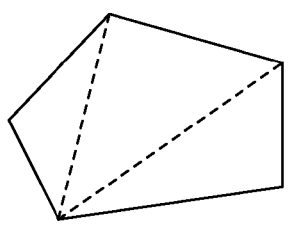
FIG. 25 is a diagram depicting an example of the triangulation.

In this method, the polygon formed by the boundary of a projected loop intersection is divided into triangles, and OFF is set to the mask data for pixels corresponding to the inside of each triangle in the case of an outer loop, and ON is set to the mask data for pixels corresponding to the inside of each triangle in the case of an inner loop. The boundary of a loop intersection on a projection surface is illustrated in FIG. 23, and the white dots are loop division points, or are intersections between the loop and front surface edge-connected body or rear surface edge-connected body. In other words, because this embodiment differs from the conventional method, the intersections between the loop and divided triangles are not made, high-speed processing becomes possible, when compared with the conventional method. The loop intersection that is illustrated in FIG. 23 is divided, for example, as illustrated in FIG. 24. Particularly when it is known that the loop intersection is a convex polygon (for example, when it can be known from the CAD data that the loop is a circle), as illustrated in FIG. 25, it is possible to divide the polygon into fan-shaped triangles obtained by connecting an arbitrary vertex with another vertex, therefore, dividing the polygon into triangles can be performed at high speed. Moreover, as a typical method for dividing a polygon into triangles, the plane scan line algorithm having the computational complexity order O (n log n) for an n-cornered polygon and using a monotone y-cornered polygon, and ear clipping having the computational complexity order O ($n^2$), which sequentially searches for a triangle tip in which a line segment, which connects two vertices that are adjacent to one vertex, does not cross another edge are well known. An n-cornered polygon is divided into (n−2) triangles. For example, in regards to the former, a detailed description is given in De Berg, et al., Tetsuo Asano Translation, "Computational Geometry", Kindai Kagaku Sha Co., Ltd., and in regards to the latter, a detailed description is given in David Eberly, Triangulation by Ear Clipping, Geometric Tools, LLC, Last Modified: Mar. 1, 2008 (http://www.geometrictools.com/Documentation/TriangulationByEarClipping.pdf, available on November 2010).

In the two representative triangulation methods above, the plane scan line algorithm is faster. The plane scan line algorithm converts a simple polygon that does not cross itself into a monotone y-cornered polygon, and divides that monotone y-cornered polygon into triangles. Moreover, the aforementioned plane scan line algorithm can also be used as it is even in a case having inner loops. In other words, it is possible to apply the same plane scan line algorithm to a polygon formed by plural closed polyline. When the total number of edges of inner loops and outer loop is n, and the number of inner loops is m, the polygon is divided into (n−2+2m) triangles.

Using the aforementioned scan line algorithm, it is possible to simultaneously generate mask data for an outer loop intersection and inner loop intersection, and it is possible to execute each of the step S37 to step S41, simultaneously. The processing speed is not much different than in the case of executing the processing for inner loops and outer loop separately.

(B) Pixel Scan Method

Figure 26A:
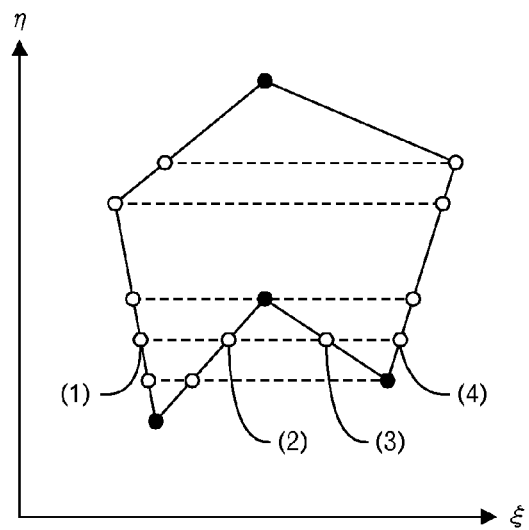
FIG. 26A is a diagram to explain a pixel scan method.

In this method, first, in the case of an outer loop intersection (step S37), OFF is set to the mask data for pixels that correspond to the boundary of the outer loop intersection, for example. In the example in FIG. 26A, OFF is set to the mask data for the pixels on the boundary polyline. After that, the pixels on the screen coordinate system are scanned from the left. Together with scanning, the intersection point numbers of intersections with the boundary polyline whose mask data is OFF are calculated from 1, and OFF is set to the mask data within sections where the intersection point number is an odd number. For example, for the maximum and minimum points expressed by black dots in FIG. 26A, two intersection point numbers are set. As can be seen in FIG. 26A, OFF is set to the mask data for the pixels inside the polygon. On the other hand, in the case of an inner loop intersection (step S39), only setting ON to the mask data is different, similarly to the case of the (A) projected polygon triangulation method.

Figure 26B:
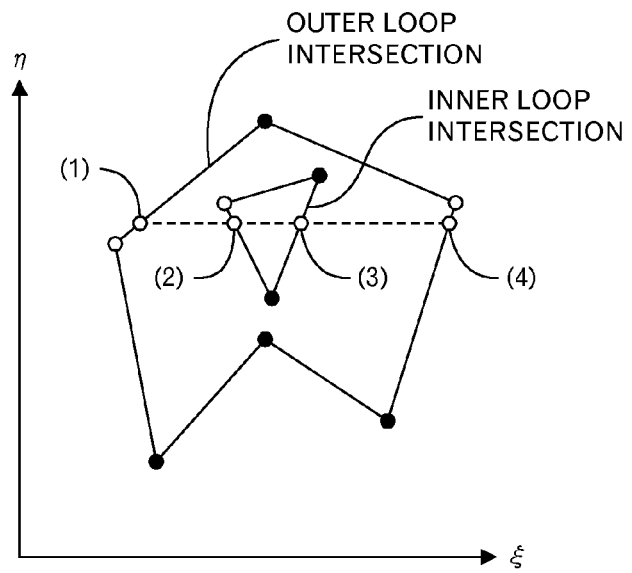
FIG. 26B is a diagram to explain a processing in case where the outer loop and inner loop are simultaneously scanned by the pixel scan method.

In the case of the pixel scan method as well, as illustrated in FIG. 26B, the intersection numbers of intersection points between the outer loop intersection or inner loop intersection and the scan line are calculated, and by setting OFF to the mask data in sections where the intersection number is an odd number, it is possible to execute each of the step S37 to step S41, simultaneously.

By performing the processing such as described above, it is possible to perform the mask data generation processing and trimmed surface drawing processing for each sight-line single-valued area. Overlapping of the sight-line single-valued areas is processed by eliminating hidden surfaces using a Z buffer, for example. In this embodiment, in the case of a simple object as illustrated in the example in this embodiment, as described above, areas in which the front surface faces the viewpoint side, and areas in which the rear surface faces the viewpoint side are determined to be sight-line single-valued areas. Mask data is then generated for each sight-line single-valued area based on whether or not the area is on a trimmed surface (inside of an outer loop and outside of an inner loop). Mask data is generated by set operations between an approximated polyline of a trimmed surface (outer loop polygon and inner loop polygons) and a sight-line single-valued area (a boundary polyline of a front surface edge-connected body or rear surface edge-connected body). When compared with the case of finding intersection points with the loop polygons for each triangle that is obtained by dividing the base surface, calculation for each of the intersections between the loop polygon and triangles is not performed in this embodiment, so the more intersecting triangles there are, the greater the effect is of reducing the processing load.

Embodiment 2

Figure 27:
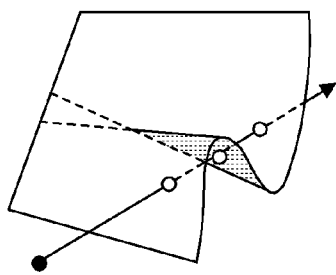
FIG. 27 is a diagram to explain an edge-connected body that is not a sight-line single-valued area due to appearance of a fold.

As for the object to be displayed in the first embodiment, both the front surface edge-connected body and rear surface edge-connected body were sight-line single-valued areas, however, there are cases in which either the front surface edge-connected body or rear surface edge-connected body is not sight-line single-valued area. In the example illustrated in FIG. 27 in which a fold or pleat appears, a portion of the continuous surface whose front surface faces the viewpoint side includes a portion which cannot be seen from the illustrated viewpoint because of the overlap. In FIG. 27, the black dot represents the viewpoint, and the white dots represent intersection points between the sight line and the base surface. Moreover, the hatched area is a rear surface edge-connected body, the rear surface of which faces the viewpoint side. For example, when tracing the illustrated sight line, first, there is an intersection point with the front surface in the front, next, there is an intersection point with the rear surface, and finally, there is an intersection point with the front surface in the back. In other words, the mapping of the front surface edge-connected body that is generated from the base surface onto the projection plane is not a bijection.

Figure 28:
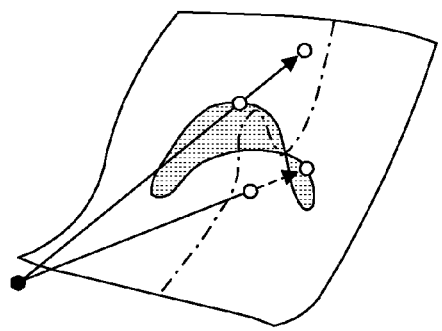
FIG. 28 is a diagram to explain an edge-connected body that is not a sight-line single-valued area because an upward protrusion exists.

Similarly, also in the case of the example illustrated in FIG. 28 where there is a peak that rises upward in the center portion, there is an overlapping portion between front surfaces when seen from the viewpoint illustrated in the figure. In FIG. 28, the dash dotted line represents a curve of a constant parameter value, and it can be seen that the base surface has a upwardly convex shape in the center. Also, in FIG. 28, the black dot represents the viewpoint, and the white dots represent intersection points between the sight line and the base surface. Moreover, the hatched area is a rear surface edge-connected body of which the rear surface faces the viewpoint side. The two sight lines that are illustrated in the figure pass through the border between the front surface and rear surface and the front surface, and the mapping of the front surface edge-connected body that is generated from this base surface onto the projection plane is also not a bijection.

In this embodiment, the front surface edge-connected body or rear surface edge-connected body that does not have sight-line single valuedness is divided into sight-line single-valued areas, after which, the mask generation processing and drawing processing are performed.

Figure 29:
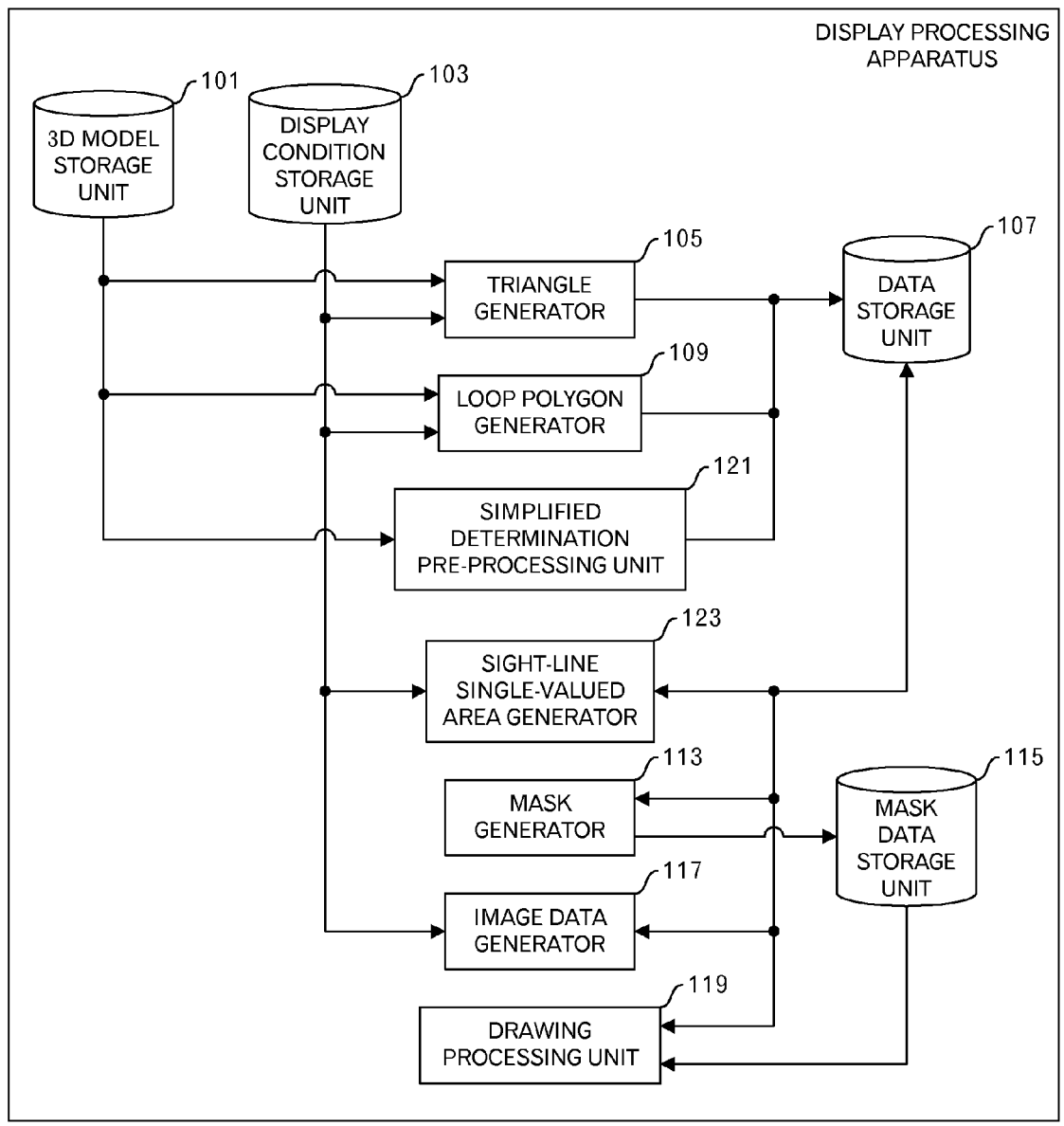
FIG. 29 is a functional block diagram of a display processing apparatus relating to a second embodiment.

FIG. 29 illustrates a functional block diagram of the display processing apparatus relating to this embodiment. The display processing apparatus relating to this embodiment has: a three-dimensional (3D) model storage unit 101 that stores three-dimensional model data that is generated by a CAD system; a display condition storage unit 103 that stores viewpoint data and lighting data inside a three-dimensional space; a triangle generator 105; a data storage unit 107 that stores data during the processing; a loop polygon generator 109; a simplified determination pre-processing unit 121; a sight-line single-valued area generator 123; a mask generator 113; a mask data storage unit 115; an image data generator 117 and a drawing processing unit 119. Moreover, there may also be a case in which there is no simplified determination pre-processing unit 121. The same reference numbers are used for components that perform the same processing as in the first embodiment.

The triangle generator 105 divides the base surface to generate triangle data from the base surface data that is stored in the 3D model storage unit 101 and data stored in the display condition storage unit 103, and stores the generated data in the data storage unit 107. The loop polygon generator 109 generates data of a loop polygon that approximates a trimmed surface from data of the trimmed surface that is stored in the 3D model storage unit 101 and data stored in the display condition storage unit 103, and stores the generated data in the data storage unit 107. The simplified determination pre-processing unit 121 uses the data of the base surface that is stored in the 3D model storage unit 101 to calculate a range of the coordinates of a viewpoint at which the entire base surface is identified as a sight-line single-valued area, and stores the calculated coordinates in the data storage unit 107. The sight-line single-valued area generator 123 uses the triangle data that is stored in the data storage unit 107 and the data stored in the display condition storage unit 103 to generate data of sight-line single-valued areas that satisfy the condition that the mapping onto the projection plane is bijection, and stores the generated data in the data storage unit 107. The sight-line single-valued area generator 123 may also use the data calculated by the simplified determination pre-processing unit 121 to determine whether the entire base surface is sight-line single valued. Furthermore, the mask generator 113 generates mask data using the data concerning the sight-line single-valued areas and the data of the loop polygons that is stored in the data storage unit 107, and stores the generated mask data in the mask data storage unit 115. Moreover, the image data generator 117 generates image data using the triangle data that is stored in the data storage unit 107 and the viewpoint and lighting data that are stored in the display condition storage unit 103, and stores the generated data in the data storage unit 107. The drawing processing unit 119 then uses the image data that is stored in the data storage unit 107 and the mask data that is stored in the mask data storage unit 115 to perform the drawing processing.

Figure 30:
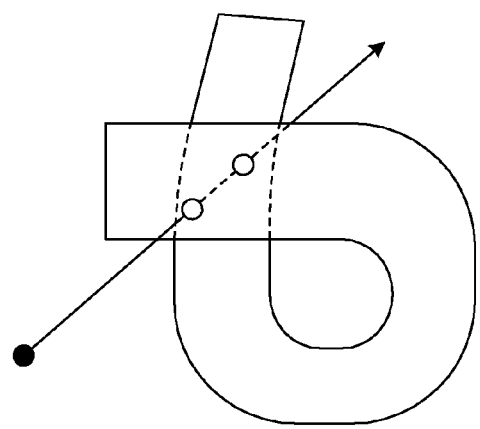
FIG. 30 is a diagram depicting an example of a base surface in which an overlap occurs on display.

Next, FIG. 30 to FIG. 74 will be used to explain the processing by the display processing apparatus illustrated in FIG. 29. In this embodiment as well, three-dimensional model data that is expressed as a collection of trimmed surfaces is stored in advance in the 3D model storage unit 101, and viewpoint data and lighting data are stored in advance in the display condition storage unit 103. Moreover, in this embodiment, a case will be explained in which a base surface such as illustrated in FIG. 30 will be processed. The black dot illustrated in the figure represents a viewpoint, and the white dots represent intersection points between the sight line and the base surface. The base surface in FIG. 30, which is seen from the viewpoint, is entirely the front surface, however part crosses and overlaps.

Figure 31:
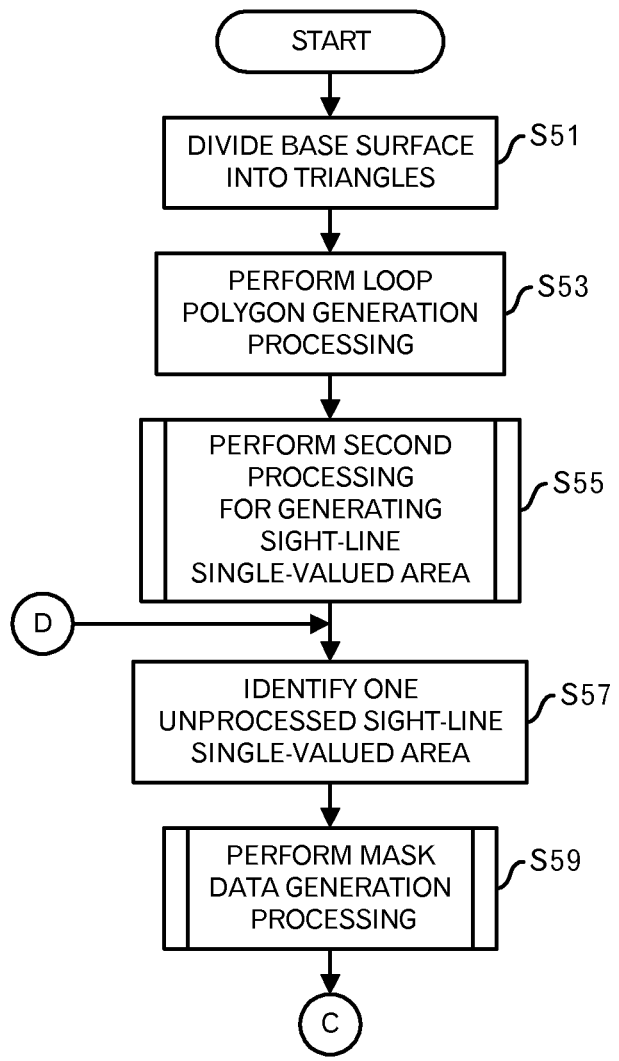
FIG. 31 is a diagram depicting a processing flow (first half) relating to the second embodiment.

FIG. 31 illustrates a processing flow (first half) in this embodiment. First, the triangle generator 105 acquires data of the base surface that is part of an object represented as a three-dimensional model from the 3D model storage unit 101, and divides the base surface into triangles (FIG. 31: step S51). The generated triangle data is then stored in the data storage unit 107. The processing of this step is the same as the processing of the step S1 (in FIG. 3) in the first embodiment. Here, the base surface illustrated in FIG. 30 is divided into triangles.

Next, the loop polygon generator 109 acquires, from the 3D model storage unit 101, data of the outer loop and inner loops that form the trimmed surface on the base surface, and generates loop polygons that approximate the outer loop and inner loops (FIG. 31: step S53). The data of the generated loop polygons is stored in the data storage unit 107. The processing of this step is the same as step S3. In this embodiment, a case will be explained in which the entire base surface illustrated in FIG. 30 is trimmed surface.

After that, the sight-line single-valued area generator 123 performs a processing for generating the sight-line single-valued area (step S55). This processing for generating the sight-line single-valued area will be explained using FIG. 32 to FIG. 65B.

Figure 32:
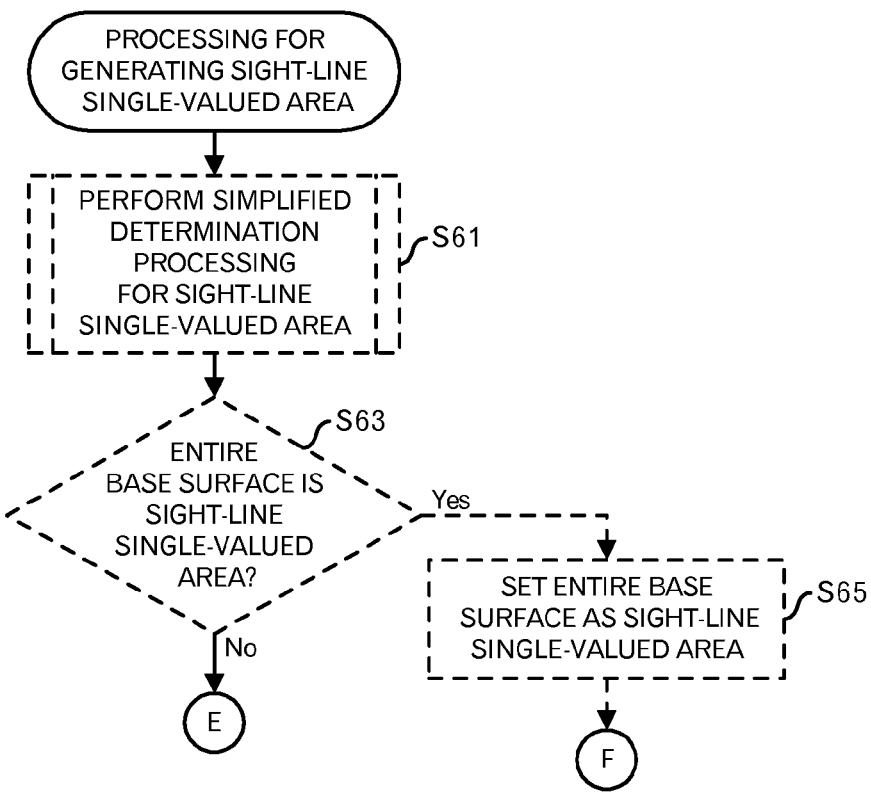
FIG. 32 is a diagram depicting a processing flow (first half) of a processing for generating a sight-line single-valued area in the second embodiment.

First, the sight-line single-valued area generator 123 performs a simplified determination processing for the sight-line single-valued area (optional) (FIG. 32: step S61). At this step, whether the entire base surface is the sight-line single-valued area is simply determined. The simplified determination processing for the sight-line single-valued area will be explained later. The sight-line single-valued area generator 123 then determines whether the entire base surface is a sight-line single-valued area (FIG. 32: step S63). For example, at the step S61, a simplified determination flag is set, and at this step, the processing is branched according to that simplified determination flag.

When it is determined that the entire base surface is a sight-line single-valued area, the sight-line single-valued area generator 123 sets data that represents that the entire base surface is a sight-line single-valued area (FIG. 32: step S65). Here, a front surface edge-connected body or rear surface edge-connected body is generated from the triangles that were generated at the step S51 (FIG. 31), and together with storing data that represents a boundary polyline of the front surface edge-connected body or rear surface edge-connected body in the data storage unit 107, data that represents that the surface is a sight-line single-valued area is registered. After that, the processing moves to the processing in FIG. 33 by way of terminal F, then the processing for generating sight-line single-valued area ends, and the processing returns to the processing in FIG. 31.

On the other hand, in the case that the entire base surface is not a sight-line single-valued area, the processing moves to the processing for generating the sight-line single-valued area (later half) in FIG. 33 by way of terminal E. In FIG. 32, the processing of step S61 to step S65 represented by the dashed line is not mandatory. The processing may shifts to the processing for generating the sight-line single-valued area (later half) by way of terminal E without performing these steps.

Figure 33:
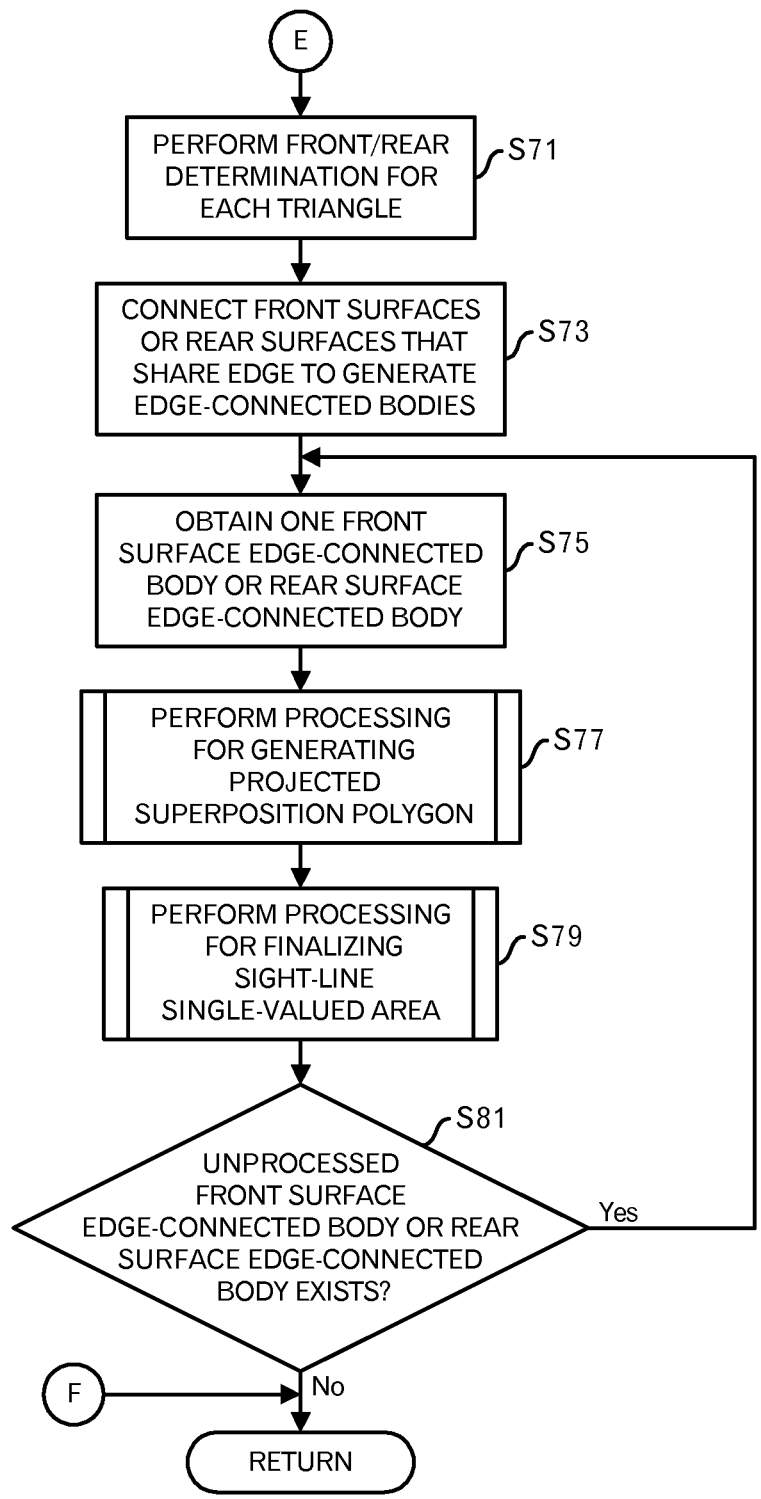
FIG. 33 is a diagram depicting a processing flow (second half) of the processing for generating a sight-line single-valued area in the second embodiment.

Moving to the processing for generating the sight-line single-valued area (later half) in FIG. 33, the sight-line single-valued area generator 123 acquires the triangle data that was generated at the step S51 (FIG. 31) and stored in the data storage unit 107, and the viewpoint data that was stored in the display condition storage unit 103, and performs front/rear determination for each triangle (FIG. 33: step S71). The processing of this step is the same as at the step S11 (FIG. 7). Here, it is presumed that the entire base surface that is illustrated in FIG. 30 is determined to be a front surface.

The sight-line single-valued area generator 123 then uses the data representing the result of the front/rear determination, which was stored in the data storage unit 107, to connect front surfaces that have common edges or rear surfaces that have common edges, to generate a front surface edge-connected body and a rear surface edge-connected body (FIG. 33: step S73). Moreover, the sight-line single-valued area generator 123 stores data of boundary polylines for the front surface edge-connected body and the rear surface edge-connected body in the data storage unit 107. The processing of this step is the same as at the step S13 (FIG. 7). Here, it is presumed that one front surface edge-connected body is generated from the base surface illustrated in FIG. 30.

Figure 34:
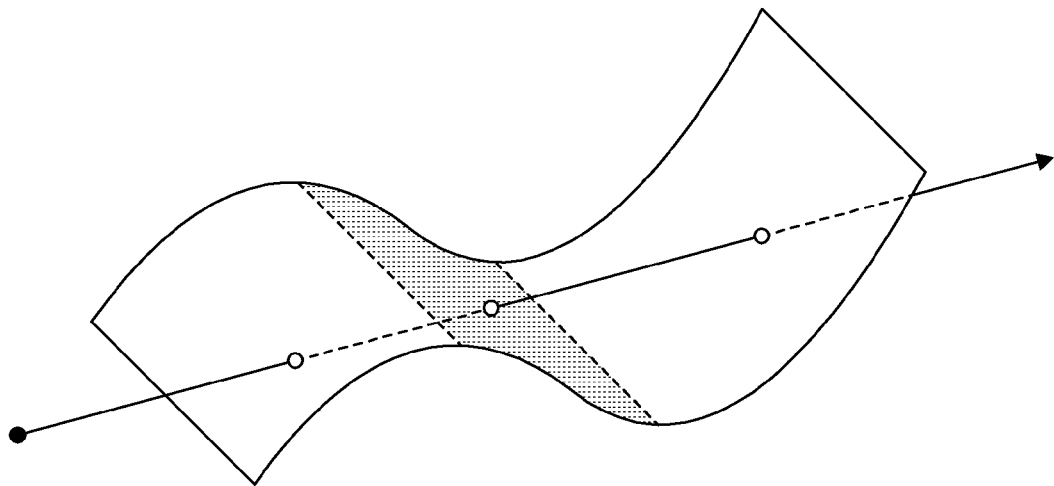
FIG. 34 is a diagram depicting an example in which plural front surface edge-connected bodies or plural rear surface edge-connected bodies due to the existence of the relief.

For a rolling shape such as illustrated in FIG. 34, plural front surface edge-connected bodies or plural rear surface edge-connected bodies may be generated from one base surface. In FIG. 34, the hatched area in the center faces the rear surface with respect to the viewpoint represented by the black dot, and is a rear surface edge-connected body. The two white areas on both sides of that area face the front surface with respect to the viewpoint, and are front surface edge-connected bodies.

Here, a detailed example will be given for the expression of the boundary polyline for the front surface edge-connected bodies and rear surface edge-connected body. On the base surface having a protrusion in the center portion, which protrudes upward, as illustrated in FIG. 28, there is a rear surface (area where the rear surface faces the viewpoint side) on the inside of the front surfaces (areas where the front surfaces face the viewpoint side). In this way, when the base surface is uneven, there may be a rear surface that is surrounded by front surfaces or a front surface that is surrounded by rear surfaces. The boundary between the front surfaces and the rear surfaces are called a front/rear boundary, and as illustrated in FIG. 28, a front/rear boundary that is closed is called a closed front/rear boundary. Moreover, as in the case of the outer perimeter in FIG. 28, the boundary of a front surface edge-connected body or a rear surface edge-connected body that corresponds to a boundary of the base surface is called a curved surface boundary. On the other hand, as in the front/rear boundary of the base surface illustrated in FIG. 28, a front/rear boundary that connects two points on the curved surface boundary is called an open front/rear boundary.

A boundary of a front surface edge-connected body or a rear surface edge-connected body can be expressed by a curved surface boundary, a closed front/rear boundary and an open front/rear boundary. A curved surface boundary, a closed front/rear boundary and an open front/rear boundary can be expressed as a collection of vertices of triangles (a sequence of points, polylines) that are obtained by dividing the base surface.

Therefore, as illustrated in FIG. 35, a front surface edge-connected body and a rear surface edge-connected body can be expressed by using Backus-Naur notation that expresses the syntax of context-free grammar. Here, the boundary polyline is expressed on a u, v parameter plane, for example, in order in the counterclockwise direction. Here, ψ in FIG. 35 is a symbol representing being empty. In FIG. 28, in the case where the front surface edge-connected body or rear surface edge-connected body includes another front surface edge-connected body or rear surface edge-connected body, the former can be expressed by recursively using the latter. The generation of relationship information expressing such an inclusion can be implemented by parallel-type pointing to each inside boundary polyline from an outside boundary polyline, or can be implemented by serial-type pointing that points from outside boundary polyline to inside boundary polyline, and correlates between inside boundary polylines. The saved data has the same form as winged-edge structure in solid modeling, for example, and is known technique among those skilled in the art. The data structure illustrated in FIG. 35 corresponds to a state that does not take into consideration superposition (described later), and can also be employed in the first embodiment as well. Moreover, in a later stage where the superposition is taken into consideration, the data structure illustrated in FIG. 35 is expanded to the data structure illustrated in FIG. 44.

Figure 36:
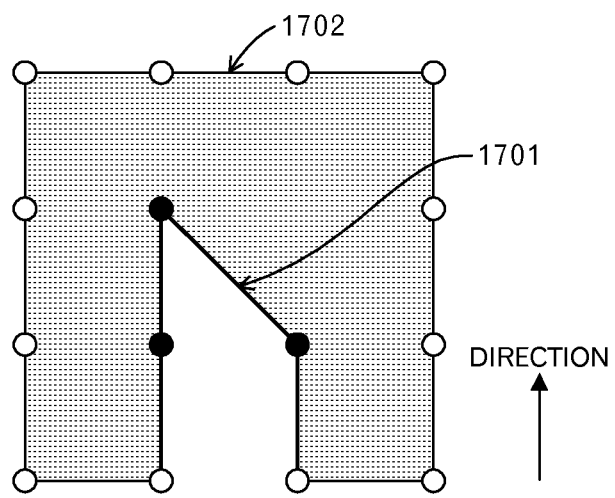
FIG. 36 is a diagram depicting the edge-connected body in FIG. 27 in a parameter space.
Figure 37:
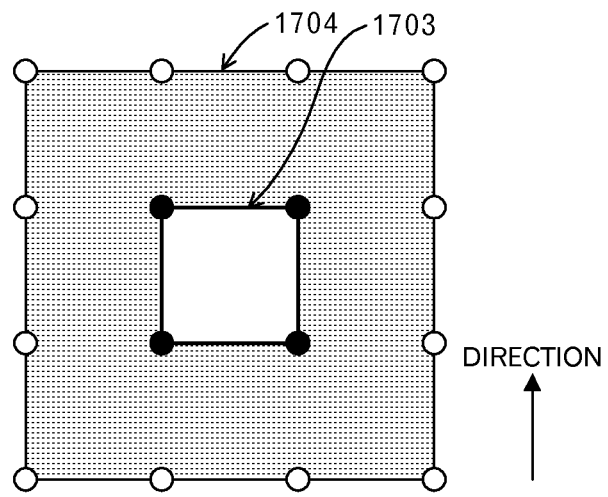
FIG. 37 is a diagram depicting the edge-connected body in FIG. 28 in a parameter space.

When the front surface edge-connected bodies that are generated from the base surfaces that are illustrated in FIG. 27 and FIG. 28 are represented schematically on the parameter plane, the results are as illustrated in FIG. 36 and FIG. 37. The front surface edge-connected body in FIG. 36 is represented as a boundary polyline, and is formed by a curved surface boundary 1702 that is represented by a thin line, and an open front/rear boundary 1701 that is represented by a thick line that connects two points on the curved surface boundary 1702. The black dots in the figure are points of the open front/rear boundary, and the white dots are points of the curved surface boundary. The front surface edge-connected body in FIG. 37 is represented by a boundary polyline, and formed by a curved surface boundary 1704 that is represented by a thin line, and a closed front/rear boundary 1703 that is represented by a thick line that is located inside the curved surface boundary 1704. The black dots in the figure are points of the closed front/rear boundary, and the white dots are points of the curved surface boundary. Moreover, the closed front/rear boundary 1703 is represented as a boundary polyline for a rear surface edge-connected body that is surrounded by a front surface edge-connected body. At the step S73 (FIG. 33), data of this kind of boundary polyline is stored as data that represents a front surface edge-connected body or rear surface edge-connected body.

Returning to an explanation of the processing from the explanation of the expression method for the edge-connected bodies or the like, the sight-line single-valued area generator 123 acquires one unprocessed front surface edge-connected body or rear surface edge-connected body from the data storage unit 107 (FIG. 33: step S75). Here, it is presumed that one front surface edge-connected body that was generated from the entire base surface that is illustrated in FIG. 30 is acquired. The sight-line single-valued area generator 123 then performs a processing for generating a projected superposition polygon (step S77). This processing for generating the projected superposition polygon will be explained using FIG. 45 to FIG. 56.

In the processing for generating the projected superposition polygon, in the case where there is a portion that is not the sight-line single-values area in part of the front surface edge-connected body or rear surface edge-connected body, the front surface edge-connected body or rear surface edge-connected body is divided into plural sight-line single-valued areas. More specifically, while scanning along a curved surface boundary or front/rear boundary, a superposition polyline, which is a collection of line segments obtained by projecting that curved surface boundary or front/rear boundary onto the front surface edge-connected body or rear surface edge-connected body, is identified, and the front surface edge-connected body or rear surface edge-connected body is divided by the identified superposition polyline.

Figure 38:
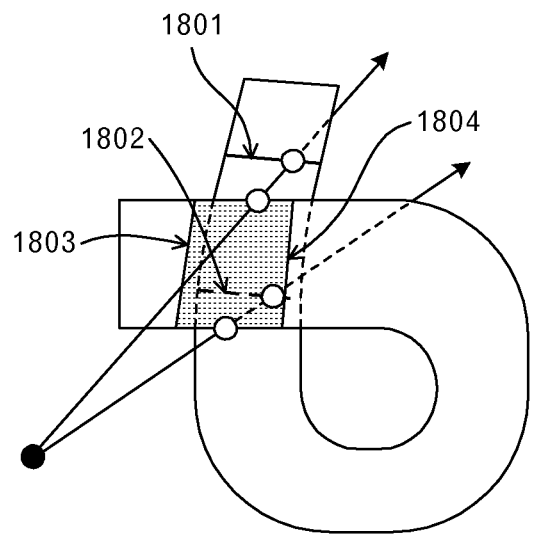
FIG. 38 is a diagram to explain a superposition polyline.
Figure 39:
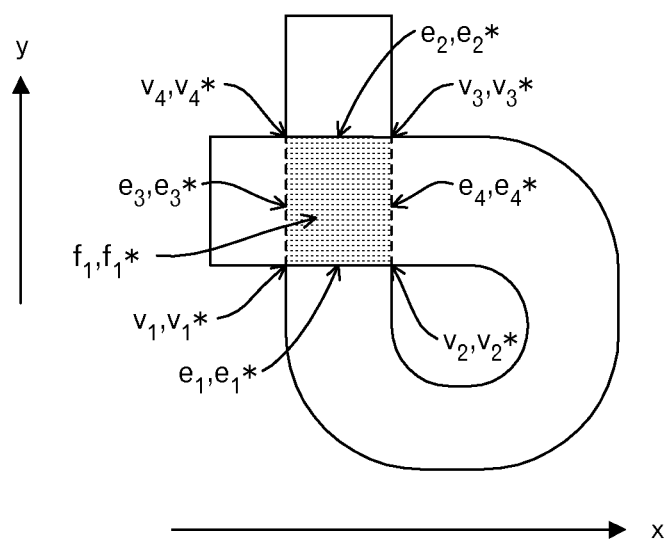
FIG. 39 is a diagram depicting the edge-connected body in FIG. 38, which is represented on a projection surface.
Figure 40:
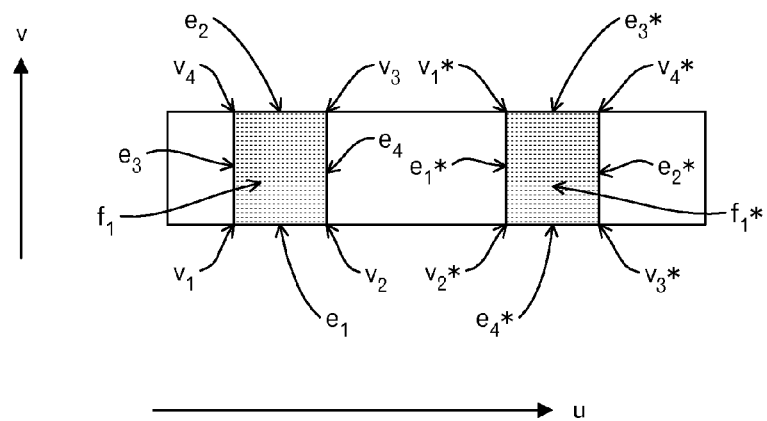
FIG. 40 is a diagram depicting the edge-connected body in FIG. 38, which is represented on a parameter plane.

For example, in the case of the front surface edge-connected body that was generated from the base surface in FIG. 30, superposition polylines 1801 to 1804 as illustrated in FIG. 38 are identified. Then, the front surface edge-connected body is divided so that the hatched front surface and the rear surface belong to different sight-line single-valued areas. The overlapping front surface and rear surface when viewed from the viewpoint in this way are called superposition faces. Moreover, the front surface edge-connected body in FIG. 38 can be represented on a projection plane, as illustrated in FIG. 39, for example, and can be represented on a parameter plane as illustrated in FIG. 40. In FIG. 39, points $v_1$ to $v_4$, edges $e_1$ to $e_4$ and surface $f_1$ are located in the front, and points $v_1^*$ to $v_4^*$, edges $e_1^*$ to $e_4^*$ and surface $f_1^*$ are located in the rear, so the overlapping points, edges and surfaces, on a parameter plane are as illustrated in FIG. 40.

Figure 41:
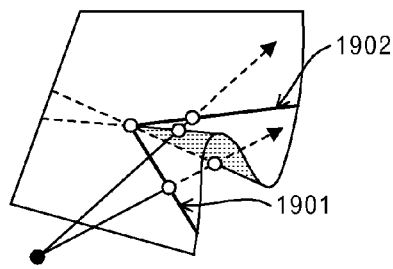
FIG. 41 is a diagram to explain the superposition polyline of an object in which a fold appears.

In the case of the base surface in FIG. 27, the superposition polylines 1901 and 1902 are identified as illustrated in FIG. 41. In FIG. 41, hatching is performed for the rear surface edge-connected body. Then, when the black dot represents the viewpoint and the front/rear boundary line is projected onto the front surface edge-connected body, superposition polylines 1901 and 1902 are identified.

Figure 42:
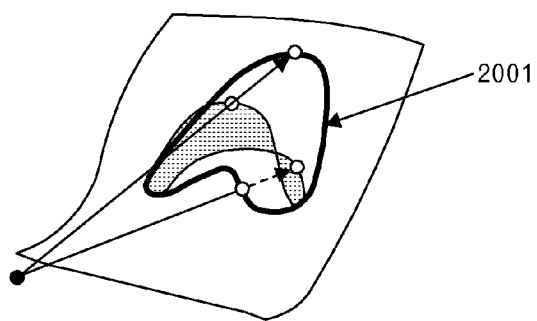
FIG. 42 is a diagram to explain the superposition polyline of an object having the protrusion.

In the case of the base surface in FIG. 28, the superposition polyline 2001 is identified as illustrated in FIG. 42. In FIG. 42 as well, hatching is performed for the rear surface edge-connected body. When the black dot represents the viewpoint, and the front/rear boundary line is projected on the front surface edge-connected body, the superposition polyline 2001 is identified.

Figure 43:
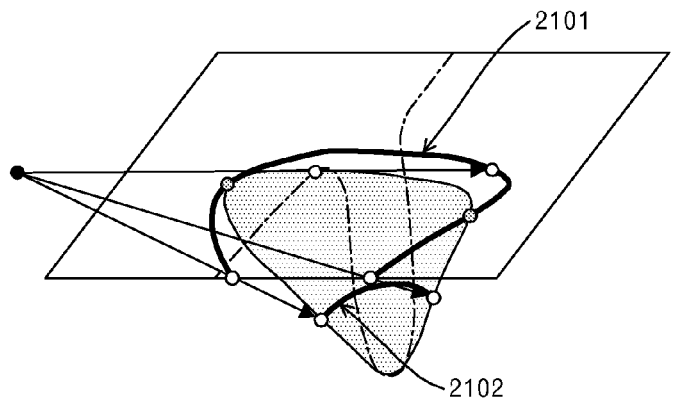
FIG. 43 is a diagram to explain the superposition polyline of an object having a concave.

Furthermore, FIG. 43 illustrates an example of a shape in which the center of the base surface is concave and the tip of the concave portion can be seen from the viewpoint represented by the black dot. In FIG. 43 as well, hatching is performed for the rear surface edge-connected body, and a front/rear boundary line is provided inside the base surface. When the front/rear boundary line is projected onto the front surface edge-connected body, superposition polyline 2101 that contacts with the curved surface boundary, and the superposition polyline 2102 that touches the closed front/rear boundary are identified.

An example of data structure that is obtained by adding data, which expresses the superposition polylines and superposition faces, to the data structure of the data of the boundary polyline illustrated in FIG. 35 is illustrated in FIG. 44 using the expanded Backus-Naur notation. In this example, the front surface edge-connected body or rear surface edge-connected body is divided into surfaces that are sight-line single-valued areas, and information that expresses the sequence relationship with the viewpoint as a reference is also stored in the data.

Figure 45:
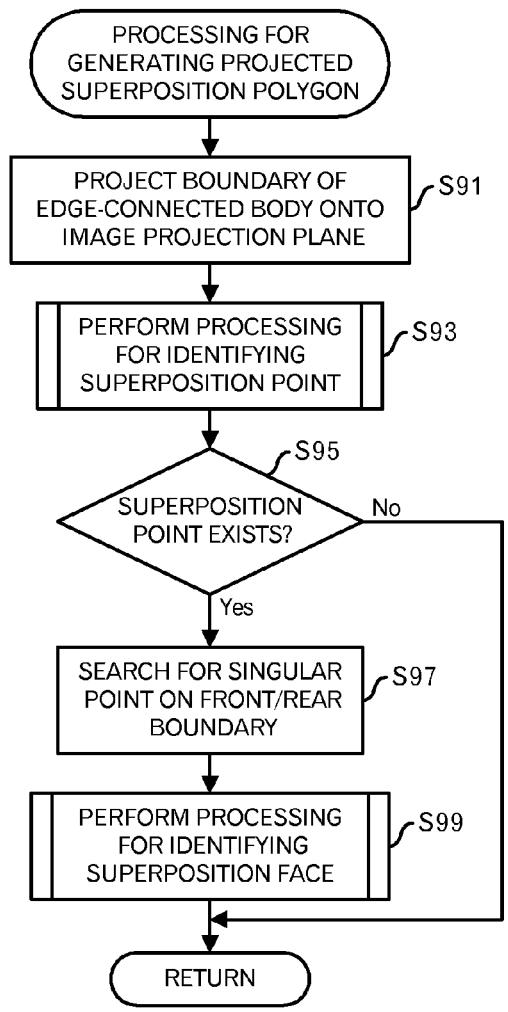
FIG. 45 is a diagram depicting a processing flow of a processing for generating a projected superposition polygon.

Entering the processing for generating the projected superposition polygon, which is illustrated in FIG. 45, the sight-line single-valued area generator 123 projects the front surface edge-connected body or rear surface edge-connected body to be processed on a projection plane, for example, and stores the data of the projected boundary polyline in the data storage unit 107 (FIG. 45: step S91). Here, a projection matrix (projection conversion matrix) is used for the boundary polyline of the front surface edge-connected body or rear surface edge-connected body, and the boundary polyline on the projection plane is calculated. As described above, the boundary polyline on the projection plane as illustrated in FIG. 39 is calculated. Instead of the projection plane, a different plane may be used as long as the plane does not include the viewpoint.

The sight-line single-valued area generator 123 performs a processing for identifying a superposition point (FIG. 45: step S93). This processing for identifying the superposition point will be explained using FIG. 46 to FIG. 56.

Figure 46:
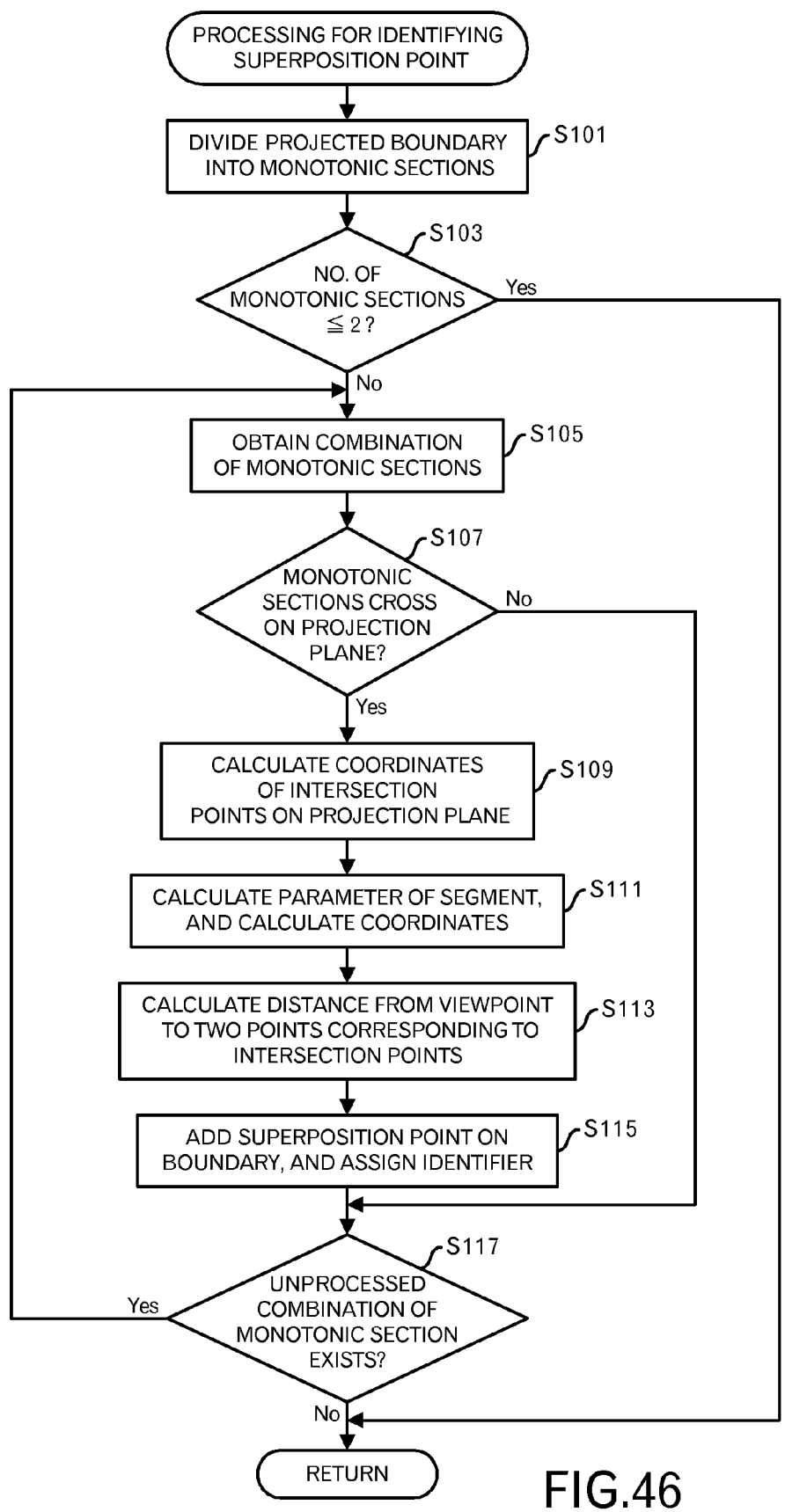
FIG. 46 is a diagram depicting a processing flow of a processing for identifying a superposition point.
Figure 47:
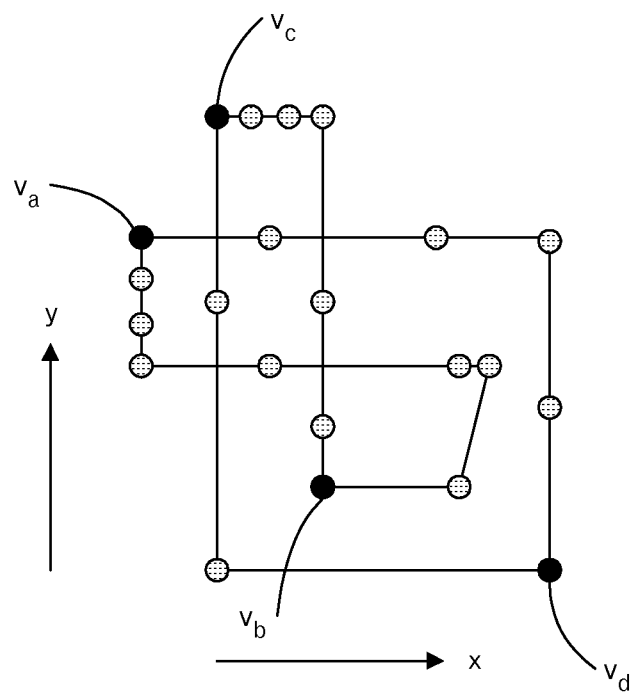
FIG. 47 is a diagram depicting an example in which a boundary polyline is divided into monotonic sections.

The sight-line single-valued area generator 123 calculates the superposition points. This calculation can be made by performing a round robin calculation for sets of segments, however, it is effective that the following steps are executed. In other words, the sight-line single-valued area generator 123 scans the projected boundary polyline, which was calculated at the step S91 (FIG. 45), for example, in the counter-clockwise direction starting from an arbitrary point, divides the projected boundary polyline into sections whose x-coordinate value increases or decreases monotonically, or whose y-coordinate value increases or decreases monotonically, and then stores information representing the boundary polyline after division in the data storage unit 107 (FIG. 46: step S101). For example, when the front surface edge-connected body illustrated in FIG. 39 is divided into sections whose y-coordinate value monotonically increases or decreases, the result is as illustrated in FIG. 47. In FIG. 47, the vertical direction is taken to be the y-axis direction, and the front surface edge-connected body is divided into sections whose y-coordinate value monotonically increase (in other words sections that do not decrease), and sections whose y-coordinate value monotonically decreases (in other words, section that do not increase). The points represented by black dots $v_a$ to $v_d$ are the end points of the sections and there are four monotonic sections.

Furthermore, the processing can be performed very efficiently when a simplified determination of whether or not there are superposition points is carried out. In other words, the sight-line single-valued area generator 123 determines whether the number of monotonic sections in the x-axis direction or y-axis direction, which were divided at the step S101, is two or less (step S103). When the number of monotonic sections is two or less, the sight-line single-valued area generator 123 ends the processing for identifying the superposition point and the processing returns to the processing for generating the projected superposition polygon in FIG. 45.

Figure 48:
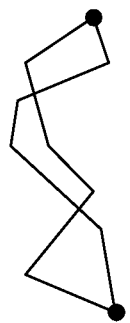
FIG. 48 is a diagram to explain the number of monotonic sections.

Here, FIG. 48 illustrates a shape in which there are two monotonic sections for the y-coordinate values, and the projected boundary polylines cross. The black dots represent the boundaries of the monotonic sections. As illustrated in FIG. 48, when there are two sections, and the projected boundary polyline crosses on the projection plane, the object to be displayed is not a front surface edge-connected body or rear surface edge-connected body, originally. In other words, in the case of a front surface edge-connected body or rear surface edge-connected body, as long as the number of monotonic sections is two or less, the boundary polyline does not cross on the projection plane, and it is possible to determine the entire surface is a sight-line single-valued area.

On the other hand, when the number of monotonic sections in the x-axis direction or y-axis direction is greater than two, the sight-line single-valued area generator 123 acquires one unprocessed set of the monotonic sections from the data storage unit 107 (step S105). At this step, one unprocessed set of monotonic sections is acquired, and at a later step, it will be determined whether the monotonic sections cross on the projection plane.

Next, the sight-line single-valued area generator 123 determines whether the monotonic sections in the identified set, which is the object of processing, cross on the projection plane (FIG. 46: step S107). Here, matching processing is carried out for segments, which are line segments between adjacent projected boundary points, in each monotonic section. Adjacent segments are connected at the ends of the segments, however, at this step, it is not determined that crossing occurs at the endpoint. Moreover, the segments in the same monotonic section do not cross.

Figure 49:
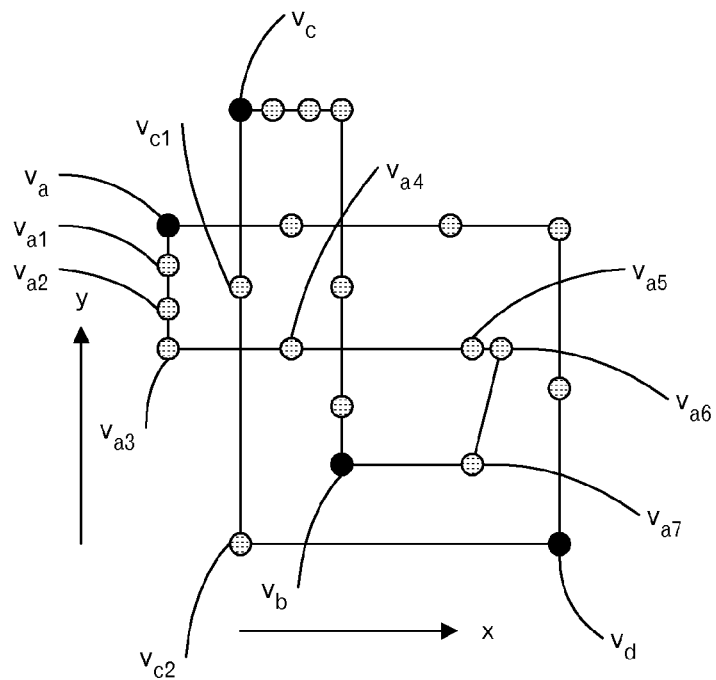
FIG. 49 is a diagram to explain an intersection between monotonic sections on a projection surface.

In the example in FIG. 49, when performing a processing for the combination of the monotonic section $v_a v_b$ and monotonic section $v_c v_d$, for example, $v_a$ and $v_c$ are starting points, and the segments are matched. For example, when performing matching for segments that are sorted according to the y-coordinate values, it is more efficient than performing crossing determination for all combinations of segments. More specifically, first, crossing determination is performed for the combination of the segment $v_a v_{a1}$ and the segment $v_c v_{c1}$, and it is determined that there is no crossing. Next, crossing determination is performed for the combination of the segment $v_{a1} v_{a2}$ and the segment $v_c v_{c1}$, and it is determined that there is no crossing. Then, crossing determination is performed in order for segment $v_{a1} v_{a2}$ and segment $v_{c1} v_{c2}$, segment $v_{a2} v_{a3}$ and segment $v_{c1} v_{c2}$, in sequence and it is determined that segment $v_{a3} v_{a4}$ and segment $v_{c1} v_{c2}$ cross. After that, crossing determination is performed up to the combination of segment $v_{a7} v_b$ and segment $v_{c2} v_d$, after which the processing of step S107 has been completed for this combination of monotonic sections.

Figure 50:
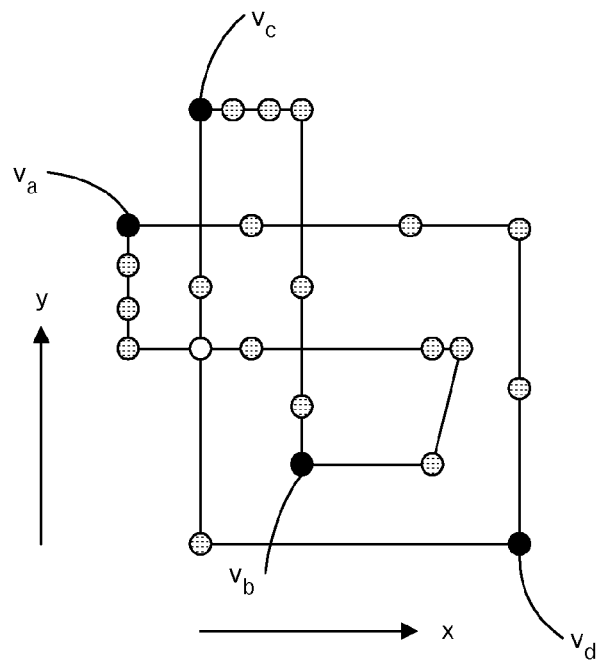
FIG. 50 is a diagram depicting an intersection point of the monotonic sections.

When monotonic sections do not cross, the processing moves to step S117 (FIG. 46). On the other hand, when monotonic sections cross, the sight-line single-valued area generator 123 calculates the coordinates of the intersection points on the projection plane (FIG. 46: step S109). Here, the intersection point represented by the white dot in FIG. 50 is identified. This kind of intersection point on the projection plane is hereafter called a self-intersection point.

Figure 51:
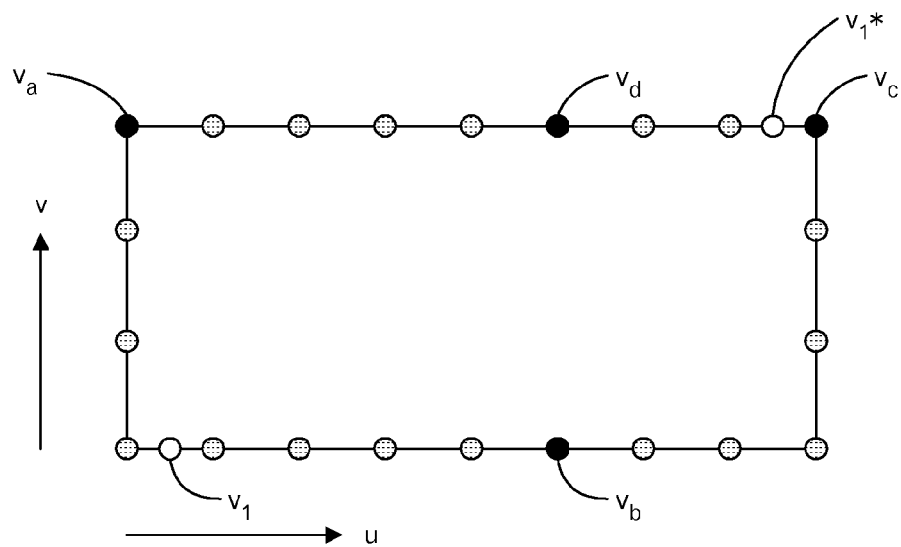
FIG. 51 is a diagram to explain a superposition point corresponding to a self-intersecting point.

The sight-line single-valued area generator 123 then calculates the superposition points. For example, the sight-line single-values area generator 123 calculates the superposition point by converting the coordinates of a self-intersection point to parameter coordinates of the segment, and converting to spatial coordinates (step S111). Here, two coordinates $v_1$ and $v_1^*$ on the parameter plane as illustrated by white dots in FIG. 51 are identified from the coordinates of the self-intersection point that is represented by the white dot in FIG. 50. The two points on the boundary polyline, which correspond to this self-intersection point, are called superposition points.

Figure 52:
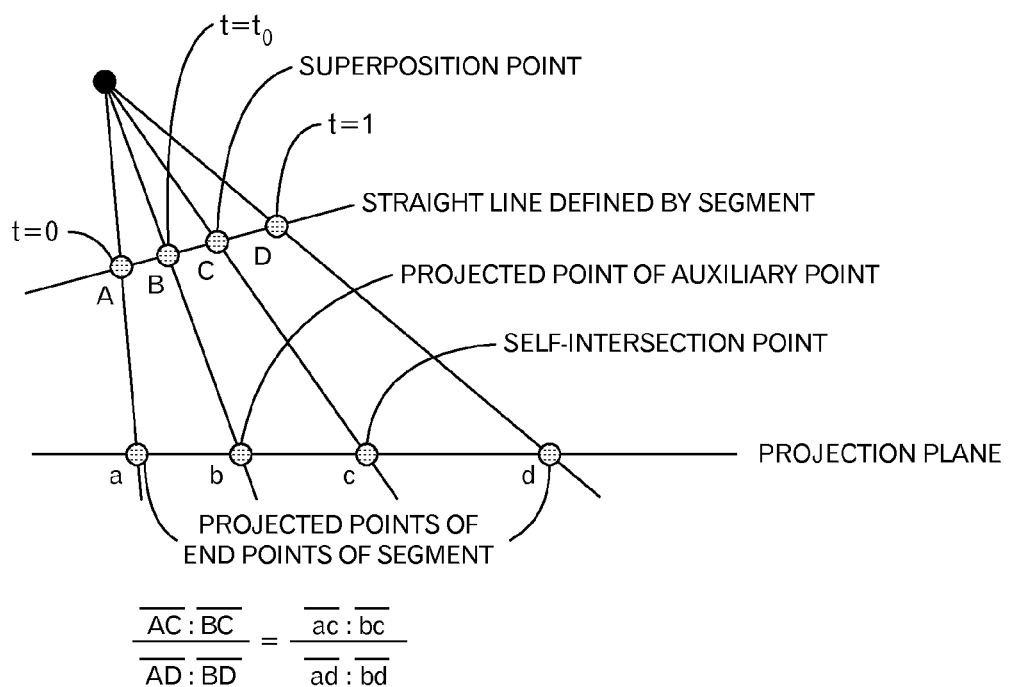
FIG. 52 is a diagram to explain calculation of coordinates using a compound ratio.

More specifically, the coordinates on the projection plane are converted to parameter coordinates of the segment using the compound ratio conservation law. In other words, as illustrated in FIG. 52, using the characteristic that the compound ratio of four points on a straight line for which the parameter t is set with both end points of the segment being 0 and 1 and the compound ratio of the four points that are projected on the projection plane are invariable, conversion to parameter coordinate t is performed. Four points are used to calculate the compound ratio, so normally there is one point short, so in addition to the end points and intersection points of the segments, an auxiliary projection point such as the midpoint of the segment is also used. According to the processing such as described above, it is possible to project points on the projection plane onto the triangles that were obtained by dividing the base surface. This kind of projection onto the base surface (triangles obtained by dividing the base surface) is hereafter called curved surface projection.

After that, the sight-line single-valued area generator 123 calculates the distance in the three-dimensional space from the viewpoint to the two points that correspond to the coordinates of the intersection points (FIG. 46: step S113). Here, the coordinates of the superposition points that were calculated at the step S111 are used to calculate the distance in the three-dimensional space from the viewpoint to the points $v_1$ and $v_1^*$. The sight-line single-valued area generator 123 then adds the two points that correspond to the intersection points on the projection plane to the boundary polyline. Here, the sigh-line single-values area generator 123 assigns an identifier representing front and back of the overlapping when viewed from the viewpoint (step S115), and it may be used in setting of the acquisition order of superposition faces. The data for the superposition points and identifiers is added to the data of the boundary polyline in the structure illustrated in FIG. 44, for example, and stored in the data storage unit 107. The corresponding superposition points can be identified by tracing the list structure of the boundary polyline based on the distance from the viewpoint. In the example in FIG. 51, an asterisk "*" is attached to the further point from the viewpoint among the two corresponding superposition points, and the "vertex on the viewpoint side" or the "vertex on the opposite side of the viewpoint" is registered in the data structure illustrated in FIG. 44. Moreover, part of the boundary polyline, which is divided by the superposition points, or part of the points of the superposition polyline is called the partial boundary polyline.

Figure 53:
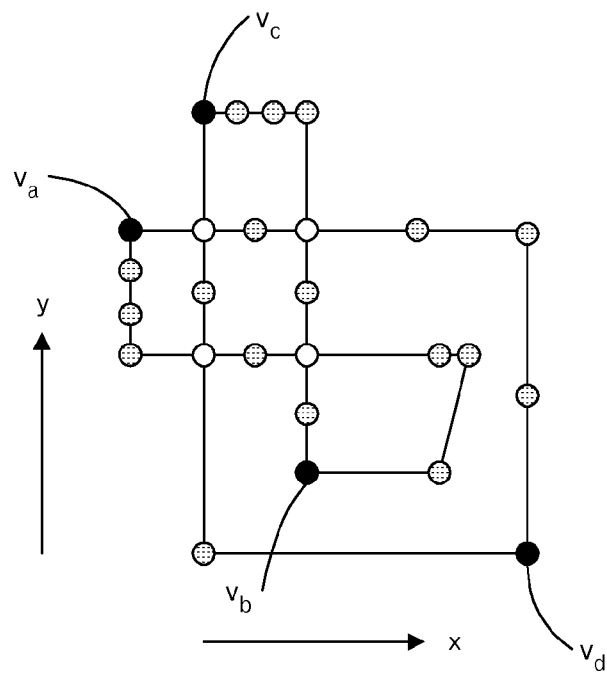
FIG. 53 is a diagram depicting an intersection point of the monotonic sections.
Figure 54:
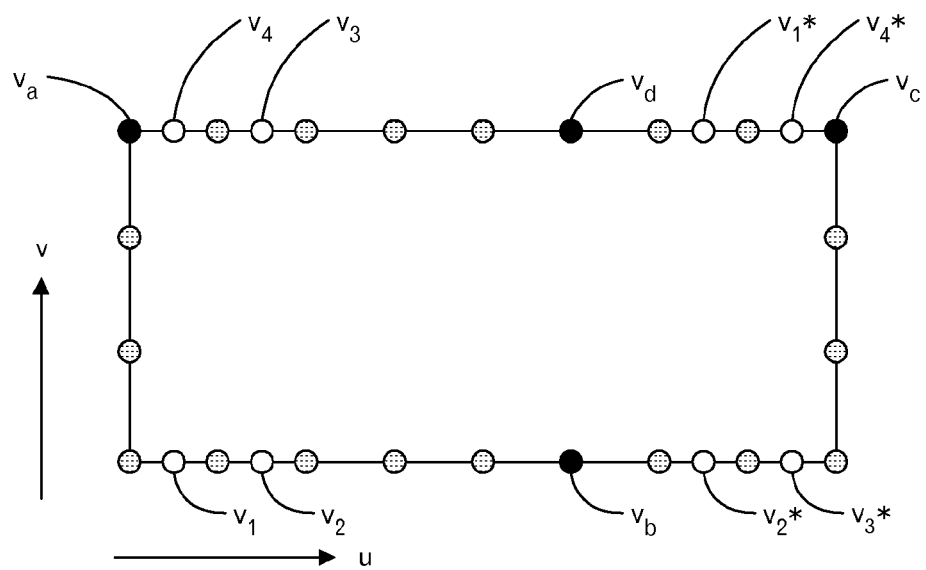
FIG. 54 is a diagram to explain addition of the superposition point.
Figure 55:
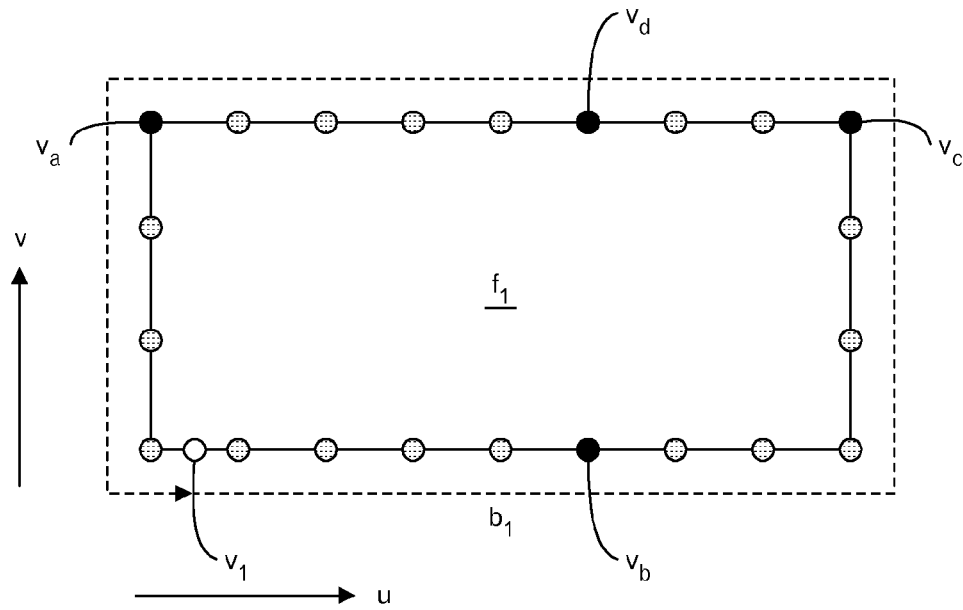
FIG. 55 is a diagram to explain addition of the superposition point.

In the case where it was determined at the step S107 (FIG. 46) that the segments do not cross, or after the step S115, the sight-line single-valued area generator 123 determines whether there are any unprocessed combination of segments (step S117). When there are no unprocessed combinations, the processing for identifying the superposition point (FIG. 46) ends, and the processing returns to the processing for generating the projected superposition polygon in FIG. 45. On the other hand, when there is an unprocessed combination, the processing returns to the step S105. By repeating the processing from the step S105 to the step S117, the intersection points on the projection plane illustrated in FIG. 53 are identified, and the superposition points $v_1$ to $v_4$, and $v_1$ to $v_4^*$ illustrated in FIG. 54 are added.

Figure 56:
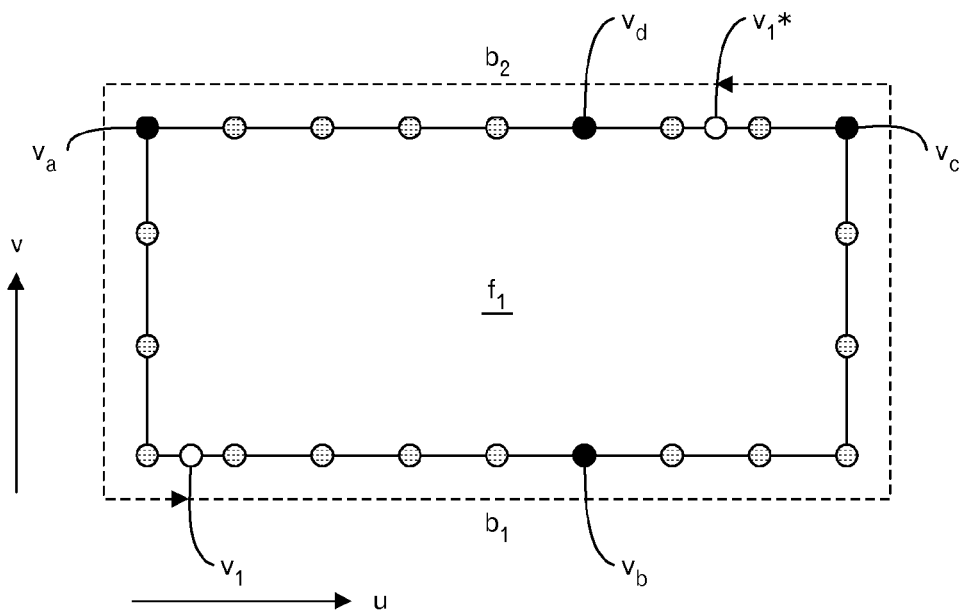
FIG. 56 is a diagram to explain addition of the superposition point.

Here, the relationship between the processing for identifying superposition point and the data structure of the boundary polyline data illustrated in FIG. 44 will be described. The boundary polyline data before performing the processing for identifying superposition point, does not have information expressing the superposition points and the like that correspond to vertices in solid modeling, information that expresses partial boundary polylines that correspond to edges, information that expresses surface regions corresponding to faces, and the like among the data items illustrated in FIG. 44. On the other hand, when superposition points are added to boundary polyline data, partial boundary polyline and surface regions are added. In case of illustrating on a parameter plane using FIG. 55, when the superposition point $v_1$ is added, the partial boundary polyline $b_1$ that is represented by the dashed line, and the surface region $f_1$ that is surrounded by the solid line are added. Moreover, there is one corresponding surface region $f_1$ that is connected to the partial boundary polyline $b_1$, so connection information for the partial boundary polyline and surface region is held as topological information. As illustrated in FIG. 56, when the corresponding superposition point $v_1^*$ is further added to the boundary polyline, the boundary polyline is divided into two partial boundary polylines $b_1$ and $b_2$. When doing this, in the boundary polyline data, connection information for the divided partial boundary polyline $b_2$ and the surface region $f_1$ are added without changing the connection information for partial boundary polyline $b_1$ and the surface region $f_1$. This kind of topological processing of adding super position points corresponds to edge division processing in solid modeling, and is known technology for those skilled in the art.

Returning to the processing for generating the projected superposition polygon in FIG. 45, the sight-line single-valued area generator 123 determines, based on data concerning the boundary polyline for the front surface edge-connected body or rear surface edge-connected body, which is stored in the data storage unit 107, whether there are any superposition points in the edge-connected body that is the object of processing (FIG. 45: step S95). When there are no superposition points, the front surface edge-connected body or rear surface edge-connected body that is the object of processing is the sight-line single-valued area. When there are no superposition points, the processing for generating the projected superposition polygon ends, and the processing returns to the processing for generating the sight-line single-valued area (later half) in FIG. 33.

Figure 57:
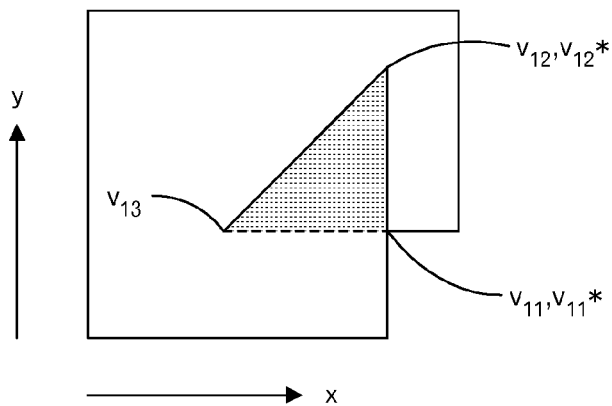
FIG. 57 is a diagram to explain a singular point.
Figure 58:
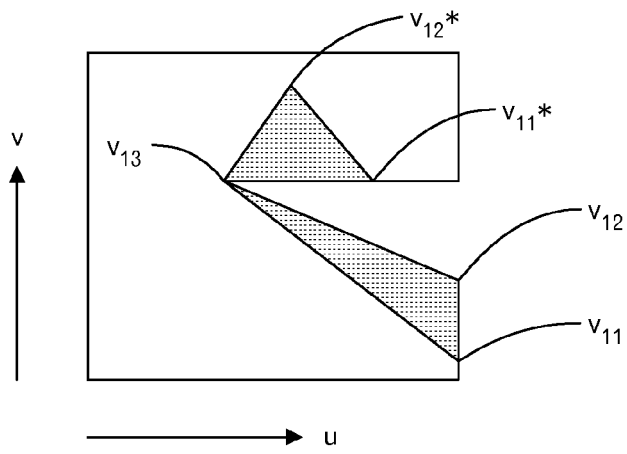
FIG. 58 is a diagram to explain the singular point.

On the other hand, in the case where there is a superposition point, the sight-line single-valued area generator 123 searches for a singular point on the front/rear boundary from the data of front surface edge-connected body or rear surface edge-connected body data that is stored in the data storage unit 107 (FIG. 45: step S97). Here, a point where the front/rear boundary line touches a superposition polyline is called a singular point. In other words, a singular point is a point where a line segment in the front and a line segment in the rear among the front/rear boundary line and superposition polyline that cover each other when viewed from the viewpoint degenerate into one point. FIG. 57 schematically illustrates the front surface edge-connected body of the base surface in FIG. 27 as expressed on a projection plane. The hatched area represents a superposition face. In the example in FIG. 57, $v_{13}$ is a singular point, and $v_{11}$ and $v_{11}*$ are superposition points. Moreover, FIG. 57 can also be expressed on a parameter plane as illustrated in FIG. 58, where the boundary polyline $v_{11}v_{12}v_{13}v_{11}*$ touches the superposition polyline $v_{11}*v_{12}*v_{13}v_{11}$ at one point.

Next, the processing for identifying a singular point will be explained. First, at a singular point, each of two planes that are formed by vectors that go from one vertex of the front/rear boundary to two vertices that are adjacent to that one vertex and the sight-line vector crosses a triangle that does not include the two adjacent vertices, however, include the one vertex of the front/rear boundary. At the step S97, the polyline on the front/rear boundary is scanned, and points that satisfy this kind of condition are searched for.

Figure 59A:
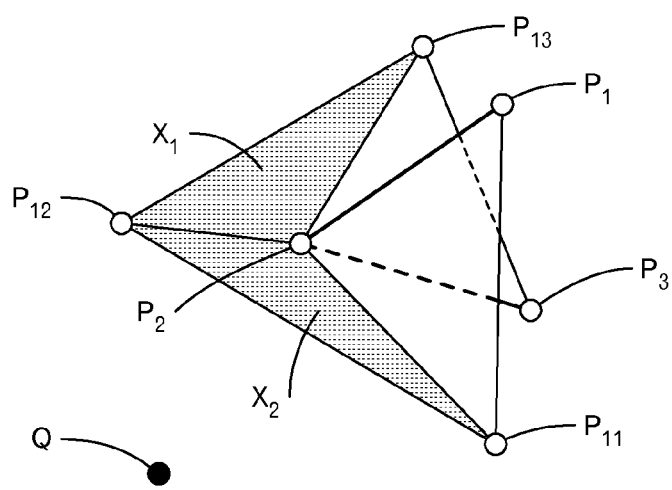
FIG. 59A is a diagram to explain identification of the singular point.
Figure 59B:
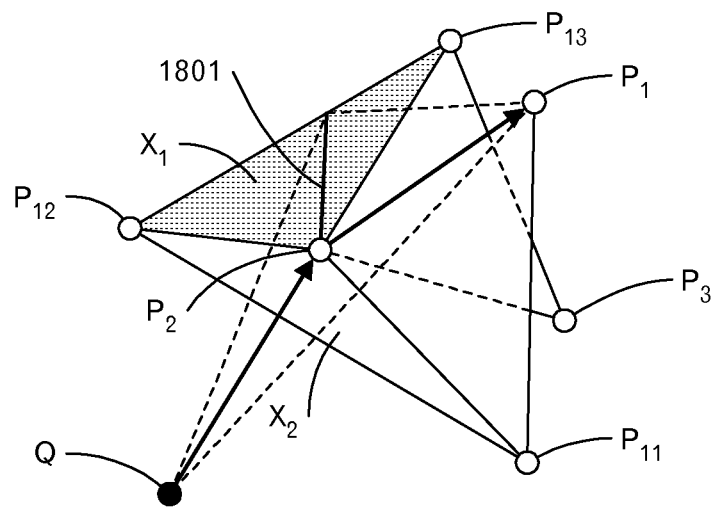
FIG. 59B is a diagram to explain identification of the singular point.
Figure 59C:
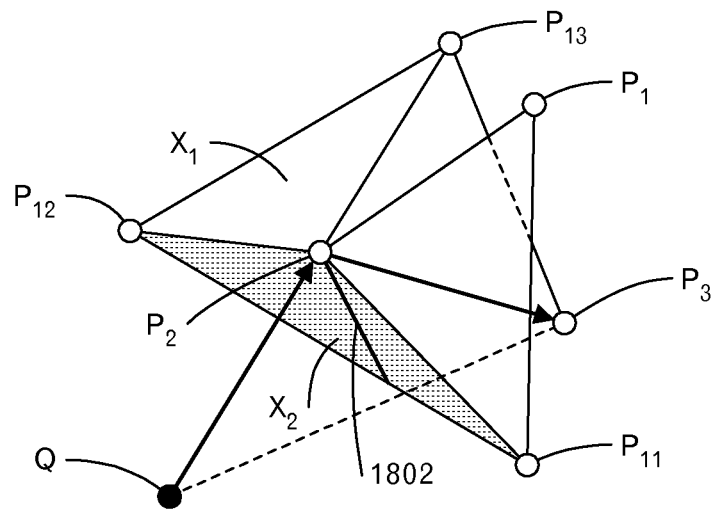
FIG. 59C is a diagram to explain identification of the singular point.

Here, the condition concerning the singular point will be explained using FIG. 59A to FIG. 59C. In FIG. 59A to FIG. 59C, $P_1$, $P_2$, $P_3$, $P_{11}$, $P_{12}$ and $P_{13}$ are vertices of triangles that were generated by dividing the base surface. Moreover, $P_1$, $P_2$ and $P_3$ are points on the front/rear boundary, and $P_{11}$, $P_{12}$ and $P_{13}$ are points inside the edge-connected body. The hatched triangles $X_1$ and $X_2$ are triangles that include one point $P_2$ on the front/rear boundary, and do not include the two points $P_1$, $P_3$ that are adjacent to $P_2$. Point Q represents the viewpoint.

At the step S97 (FIG. 45), the polyline on the front/rear boundary is scanned to search for a singular point. In FIG. 59A, it is determined whether or not points $P_1$, $P_2$ and $P_3$ on the front/rear boundary line that is expressed by the bold line satisfy the conditions above. When $P_2$ is being processed, first, as illustrated in FIG. 59B, it is determined whether a first plane that is formed by a vector from the viewpoint Q to the point $P_2$, and a vector from point $P_2$ to the adjacent point $P_1$ crosses the triangle $X_1$ or $X_2$. Here, the first plane crosses at the intersecting line 1801. Moreover, as illustrated in FIG. 59C, it is determined whether a second plane that is formed by a vector from the viewpoint Q to point $P_2$ and a vector from point $P_2$ to the adjacent point $P_3$ crosses a triangle $X_1$ or $X_2$. Here, the second plane crosses at the intersecting line 1802. In this way, when both of the two planes satisfy the conditions, point $P_2$ is determined to be a singular point. FIG. 59A to FIG. 59C correspond to the enlarged drawing surrounding point $v_{13}$ in FIG. 57 and FIG. 58, and point $P_2$ in FIG. 59A to FIG. 59C corresponds to point $v_{13}$ in FIG. 57 and FIG. 58.

Figure 60:
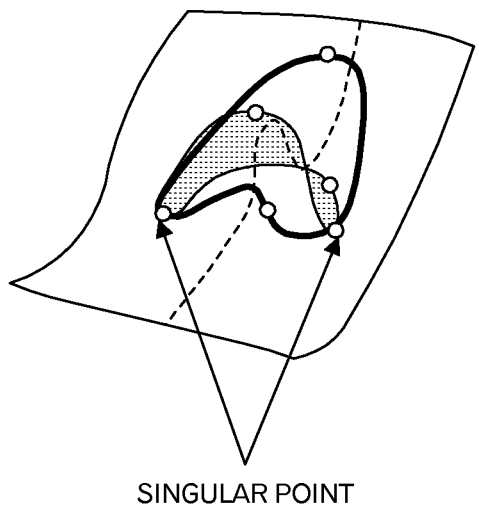
FIG. 60 is a diagram to explain the singular point.

Even in a case such as illustrated in FIG. 28 where the rear surface edge-connected body is inside the front surface edge-connected body, it is possible to search for a singular point based on the conditions that were explained using FIG. 59A to FIG. 59C. Moreover, as illustrated in FIG. 60, in the case where there is an upwardly convex protrusion in the center portion, the identified singular point is a point of contact between the front/rear boundary line and the superposition polyline (bold line). Furthermore, an identifier that represents that this point is a singular point is added to the data of the boundary polyline, which is stored in the data storage unit 107. It is presumed that the partial boundary polyline is further divided into two partial boundary polylines by this singular point. The topological processing for adding this singular point corresponds to the edge division processing in the solid modeling, and is known technique by those skilled in the art.

After that, the sight-line single-valued area generator 123 performs a processing for identifying a superposition face (FIG. 45: step S99). In this processing for identifying the superposition face, the processing advances to the processing flow in FIG. 61. That processing will be explained using FIG. 61 to FIG. 67.

In the processing for identifying the superposition face, a boundary polyline is scanned from a superposition point or singular point to identify a superposition polyline that is projected inside the front surface edge-connected body or rear surface edge-connected body, and the edge-connected body is divided by the identified superposition polyline. Then, the correlation data is registered for the superposition faces that overlap on the projection surface among the divided faces.

Figure 61:
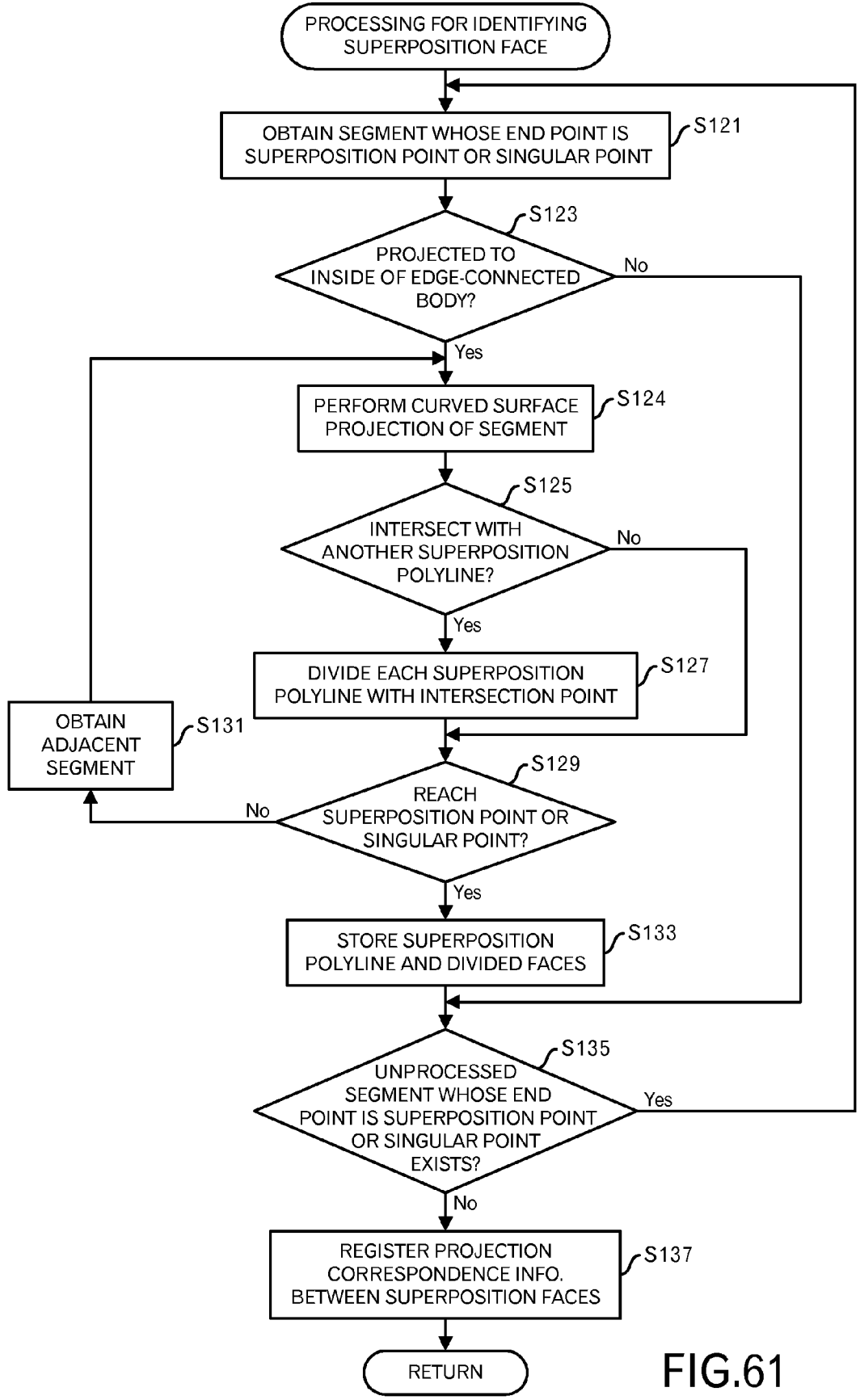
FIG. 61 is a diagram depicting a processing flow of a processing for identifying a superposition face in the second embodiment.

FIG. 61 illustrates a processing flow of the processing for identifying the superposition face. First, the sight-line single-valued area generator 123 acquires one unprocessed segment whose end point is a superposition point or a singular point from data of the boundary polyline, which is stored in the data storage unit 107 (FIG. 61: step S121). In the example illustrated in FIG. 62, it is presumed that the segment $v_1x$ having the superposition point $v_1$ as an end point is acquired. The sight-line single-valued area generator 123 then determines whether the acquired segment is projected inside the front surface edge-connected body or rear surface edge-connected body, for example, on the projection plane (step S123). Here, it is determined whether the end point on the opposite side to the superposition point or singular point, which is one end of the segment, is projected inside the front surface edge-connected body or rear surface edge-connected body on the projection plane. More specifically, as illustrated in FIG. 63, the front/rear boundary points $v_1$ and $v_2$, which are projected onto the projection plane, the curved surface boundary points $w_1$ and $w_2$, the self-intersection point x and the normal vector n of the front surface edge-connected body are used, and when the value of the following equation (1) is positive, it is determined that $v_2$ is located inside the front surface edge-connected body.

$$(\vec{w_1w_2} \times \vec{xv_2}) \cdot \vec{n} \quad (1)$$

When the segment is not projected inside the edge-connected body, the processing moves to the step S135 (FIG. 61). On the other hand, when the segment is projected inside the edge-connected body, the sight-line single-valued area generator 123 performs curved surface projection of the segment that is the object of processing. (step S124). When expressed on a parameter plane, using FIG. 62, at the step S124, the segment $v_1x$ is projected inside the edge-connected body as superposition polyline $v_1*x*$. The sight-line single-valued area generator 123 then determines whether a projected superposition polyline crosses another superposition polyline (step S125). In the example in FIG. 62, it is determined that the projected superposition polyline does not cross another superposition polyline. When there is no crossing, the processing moves to the processing of step S129. On the other hand, when there is crossing, the sight-line single-valued area generator 123 adds the superposition point to the intersection point of the point sequences of the superposition polylines in the data of the boundary polyline, which is stored in the data storage unit 107, and divides the superposition polyline with that superposition point (step S127).

Figure 64:
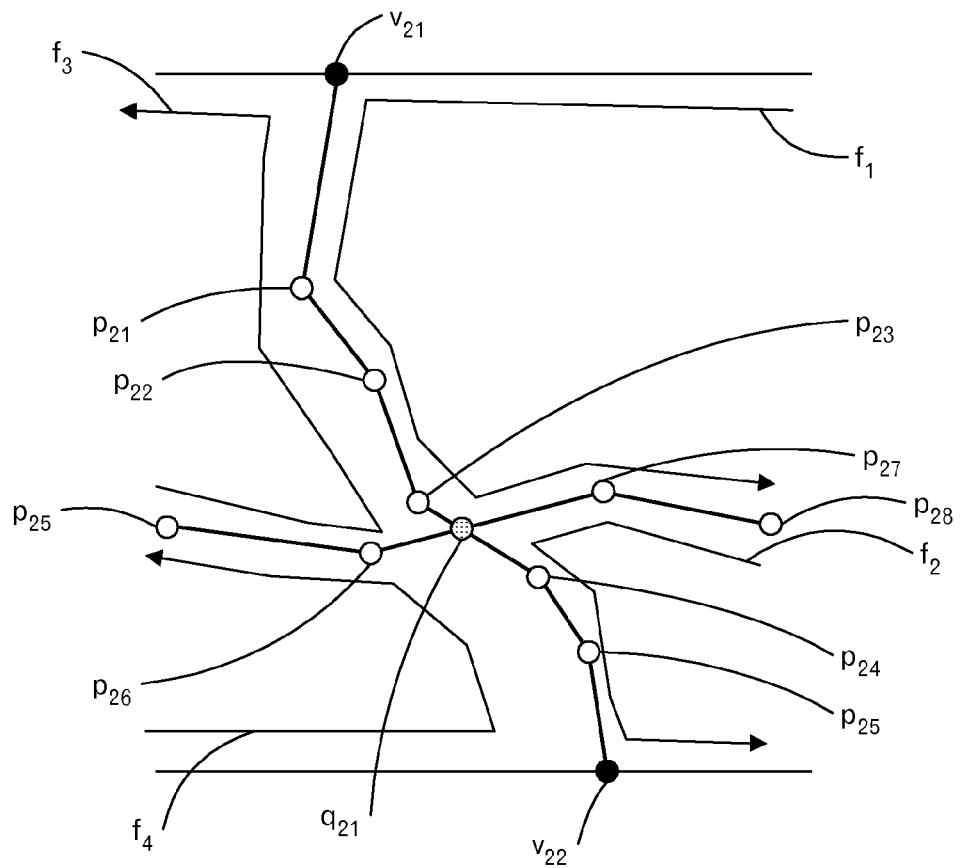
FIG. 64 is a diagram to explain division of intersecting superposition polyline.

Here, as illustrated in FIG. 64, there are cases where superposition polylines cross each other. In the example in FIG. 64, it is presumed that the superposition polyline . . . $p_{25}p_{26}p_{27}p_{28}$ . . . has already been projected, and the superposition polyline $v_{21}p_{21}p_{22}p_{23}p_{24}$ is newly projected. After that, the superposition polyline $p_{23}p_{24}$ is projected, and, when crossing determination is performed at the step S125, it is determined that the superposition polyline $p_{23}p_{24}$ crosses an existing superposition polyline. Then, at the step S127 (FIG. 61), together with intersection point $q_{21}$ being added to the partial boundary polyline of the superposition polyline in the data of the boundary polyline in the data storage unit 107, the partial boundary polyline is further divided into . . . $p_{25}p_{26}q_{21}$, $q_{21}p_{27}p_{28}$ and $v_{21}p_{21}p_{22}p_{23}q_{21}$. After that, $q_{21}p_{24}p_{25}v_{22}$ projected after that is also registered in the data of the boundary polyline in the data storage unit 107 as a partial boundary polyline. Here, $f_1$ to $f_4$ represent faces that are divided by the partial boundary polyline, and this kind of face data is also registered in a later processing.

When it is determined at the step S125 (FIG. 61) that there is no crossing with another superposition polyline, or after the step S127, the sight-line single-valued area generator 123 determines whether the segment that is the object of processing has reached another superposition point, or a singular point (step S129). Here, using a superposition point or singular point of the segment that was acquired at the step S121 as the starting point, it is determined whether the other end of the segment that was projected onto the base surface in this processing up to this point is a superposition point or singular point. More specifically, by referencing the data of the boundary polyline, which is stored in the data storage unit 107, it is determined whether identifiers that express a superposition point and singular point are registered for the point that expresses the other end of the segment.

When the segment has not reached a superposition point or singular point, the sight-line single-valued area generator 123 performs curved surface projection of the segment that is adjacent to the other end of the segment that was projected in the processing up to this point, with the superposition point or singular point of the segment that was acquired at the step S121 (FIG. 61) as a starting point (step S131). After that, the processing returns to the step S124. In the example in FIG. 62, it is determined at the step S129 that the end point x of the segment $v_1 x$ that was acquired first is not a superposition point or singular point, and after the adjacent segment $xv_2$ is acquired at the step S131, the superposition polyline $x^* v_2^*$ is projected at the step S124.

On the other hand, when the segment has reached a superposition point or singular point, the sight-line single-valued area generator 123 registers the data that expresses the superposition polyline or superposition face in the data storage unit 107 as a face that forms the front surface edge-connected body or rear surface edge-connected body (FIG. 61: step S133). In the example in FIG. 62, after segment $xv_2$ has been projected, it is determined at the step S129 that the segment has reached superposition point $v_2$, and the data of the partial boundary polyline, which represents the superposition polyline, and the face represented by the partial boundary polyline is registered at the step S133.

The generated superposition polylines divide the faces that form the edge-connected body, and have connection information for the two faces. Moreover, the partial boundary polyline is held in order to adjust the direction, and forms a face. The topological processing for adding the superposition polyline corresponds to the face dividing processing in the solid modeling, and is known technique to those skilled in the art.

After that, the sight-line single-valued area generator 123 determines whether there is an unprocessed segment that has a superposition point or singular point as an end point (FIG. 61: step S135). When there is an unprocessed segment, the processing returns to the step S121. On the other hand, when there are no unprocessed segments, the sight-line single-valued area generator 123 identifies a corresponding superposition face based on the data of the boundary polyline, which is stored in the data storage unit 107, and registers data that expresses the correlation between faces in the data of the boundary polyline (step S137).

As was described above, corresponding superposition points and order information that expresses the front and rear relationship when viewed from the viewpoint are registered for a superposition point. More specifically, as illustrated in FIG. 44, $v_1^*$ is registered for $v_1$ as the vertex on opposite side of the viewpoint, and $v_1$ is registered for $v_1^*$ as the vertex on the side of the viewpoint. Similarly, the correlations of $v_2$ and $v_2^*$, $v_3$ and $v_3^*$, $v_4$ and $v_4^*$, x and $x^*$ and the like are registered. When the correlation between superposition points is known, it is possible to determine that the partial boundary polyline, which includes a corresponding superposition point, corresponds to another corresponding partial boundary polyline, and it is possible to determine that faces that are surrounded by the corresponding partial boundary polyline also correspond each other. At the step S137, the correlation between the partial boundary polylines and between faces is identified, and registered in the data storage unit 107 as order information for the partial boundary polylines and order information for faces.

Figure 62:
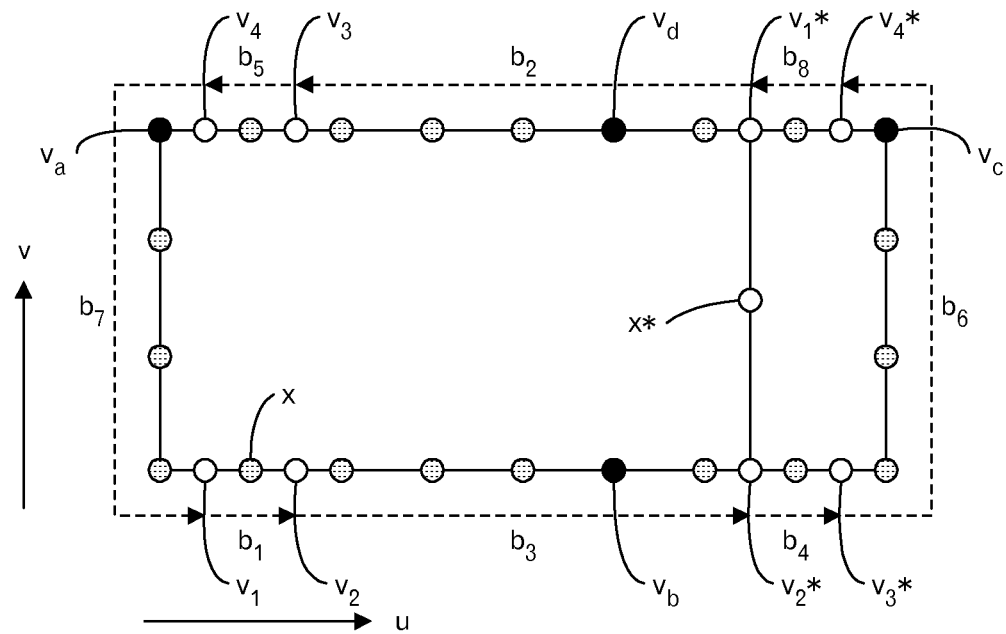
FIG. 62 is a diagram to explain the processing for identifying the superposition face.
Figure 63:
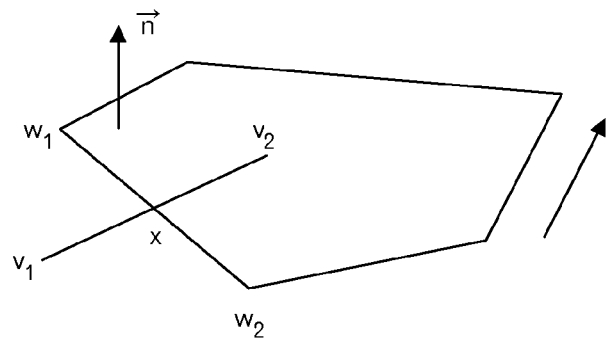
FIG. 63 is a diagram to explain inside/outside determination of a segment end point.
Figure 65A:
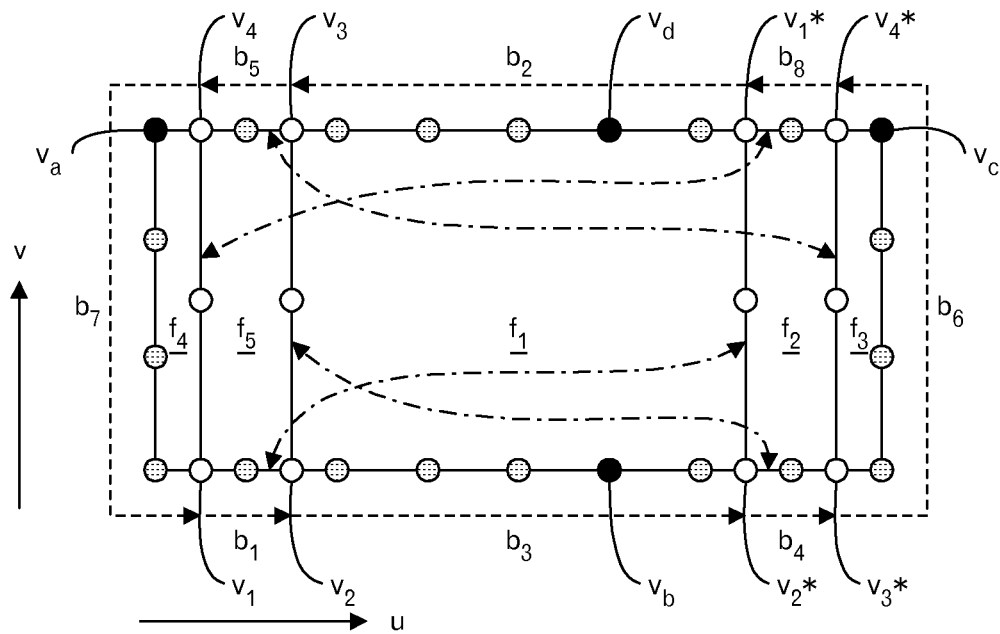
FIG. 65A is a diagram to explain addition of the superposition polyline and division of a face.
Figure 65B:
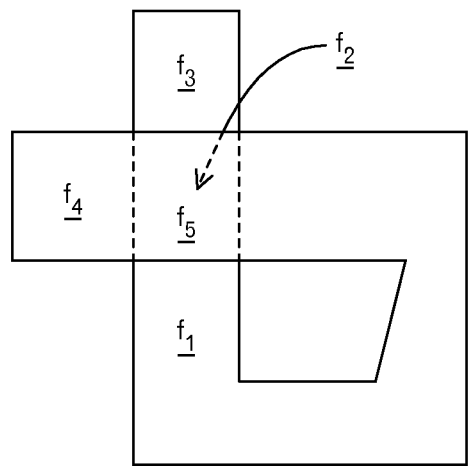
FIG. 65B is a diagram to explain a relationship between superposition faces.
Figure 66:
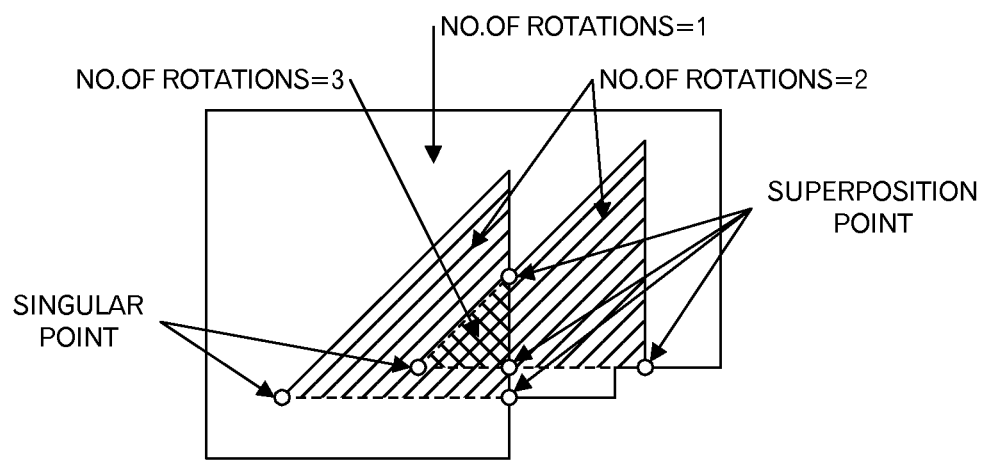
FIG. 66 is a diagram depicting three superposition faces.

By repeating the processing from step S121 to step S135 (FIG. 61) for the example in FIG. 62, superposition polylines are finally added as illustrated in FIG. 65A, and the front surface edge-connected body that is the object of processing is divided by faces $f_1$ to $f_5$. Moreover, at the step S137, from the order information for the points that form the partial boundary polyline $b_1$ and superposition polyline $v_1^* v_2^*$, the partial boundary polyline $b_4$ and superposition polyline $v_2 v_3$, the partial boundary polyline $b_5$ and superposition polyline $v_3^* v_4^*$ and the partial boundary polyline $b_8$ and superposition polyline $v_4 v_1$, the correlation of the point sequence represented by the arrows of the dash dotted lines in FIG. 65A is known, so the faces $f_2$ and $f_5$ that are surrounded by these point sequences are identified as corresponding superposition faces. According to the processing described above, topological information of the faces and the correlation of the superposition faces are registered. The faces that are divided by superposition polylines are sight-line single valued areas. FIG. 65B illustrates an example in which the front surface edge-connected body in FIG. 65A is expressed on a projection plane.

Here, the case where a superposition polyline crosses another superposition polyline will be supplementarily explained. For example, there are three corresponding superposition faces in the front surface edge-connected body in FIG. 66. Even in the case of this kind of edge-connected body, it is possible to divide the faces by the processing for identifying the superposition point and processing for identifying the superposition face, which were described above. As for such faces, the faces on the viewpoint side and on the opposite side of the viewpoint are registered, and superposition faces can be identified by tracing the list structure.

Figure 67:
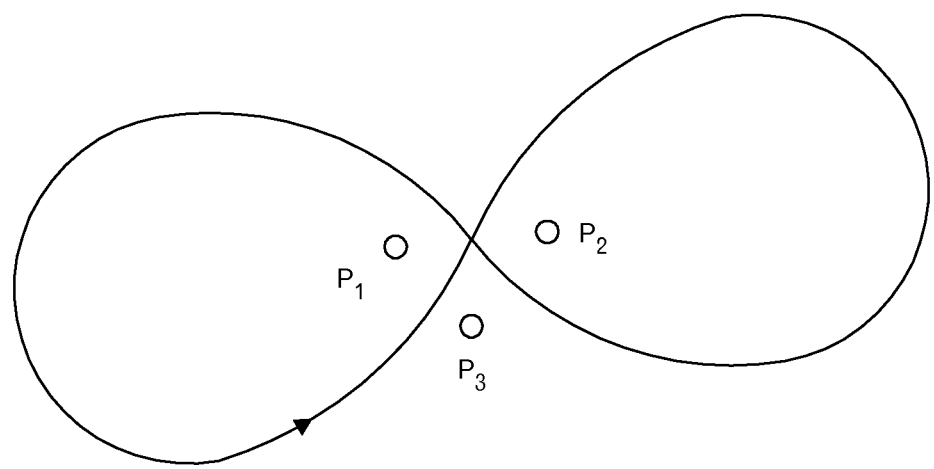
FIG. 67 is a diagram to explain the number of rotations.

The number of superposition faces can be calculated using the number of rotations of the projected boundary polyline with respect to the points on the faces that are expressed by the projected boundary polyline. The number of rotations is the number of times that rotation is performed in the positive direction around a certain point p when rounding on the closed curve C(t) along the parameter one time. Here, the number of rotations represents the number of corresponding faces. In other words, in FIG. 66, a face having the number of rotations "1" means that there are no other superposition faces, and a face having the number of rotations "2" means that there is another superposition face. In FIG. 67, when the counterclockwise direction is taken to be the positive direction, the number of rotations around points $p_1$, $p_2$ and $p_3$ are +1, −1 and 0, respectively. It can be determined that the projected boundary polylines that exist around the self-intersection points on the projection plane, and have different signs for the number of rotations are not the boundaries of a front surface edge-connected body or rear surface edge-connected body.

After the step S137 (FIG. 61), the processing for identifying the superposition face ends, the processing returns to the processing for generating the projected superposition polygon, and then the processing for generating the projected superposition polygon ends, after which the processing returns to the processing for generating the sight-line single-valued area (later half) in FIG. 33. The sight-line single-valued area generator 123 performs a processing for finalizing a sight-line single-valued area (FIG. 33: step S79). Here, moving to FIG. 68A, this processing for finalizing the sight-line single-valued area will be explained using FIG. 68A to FIG. 70.

The processing for finalizing the sight-line single-valued area is a processing for finalizing the sight-line single-valued area that will be actually displayed. The simplest processing for finalizing the sight-line single-valued area is a method that employs identified faces as the sight-line single-valued areas. The procedure for a simple processing for finalizing the sight-line single-valued area is illustrated in FIG. 68B.

Figure 68A:
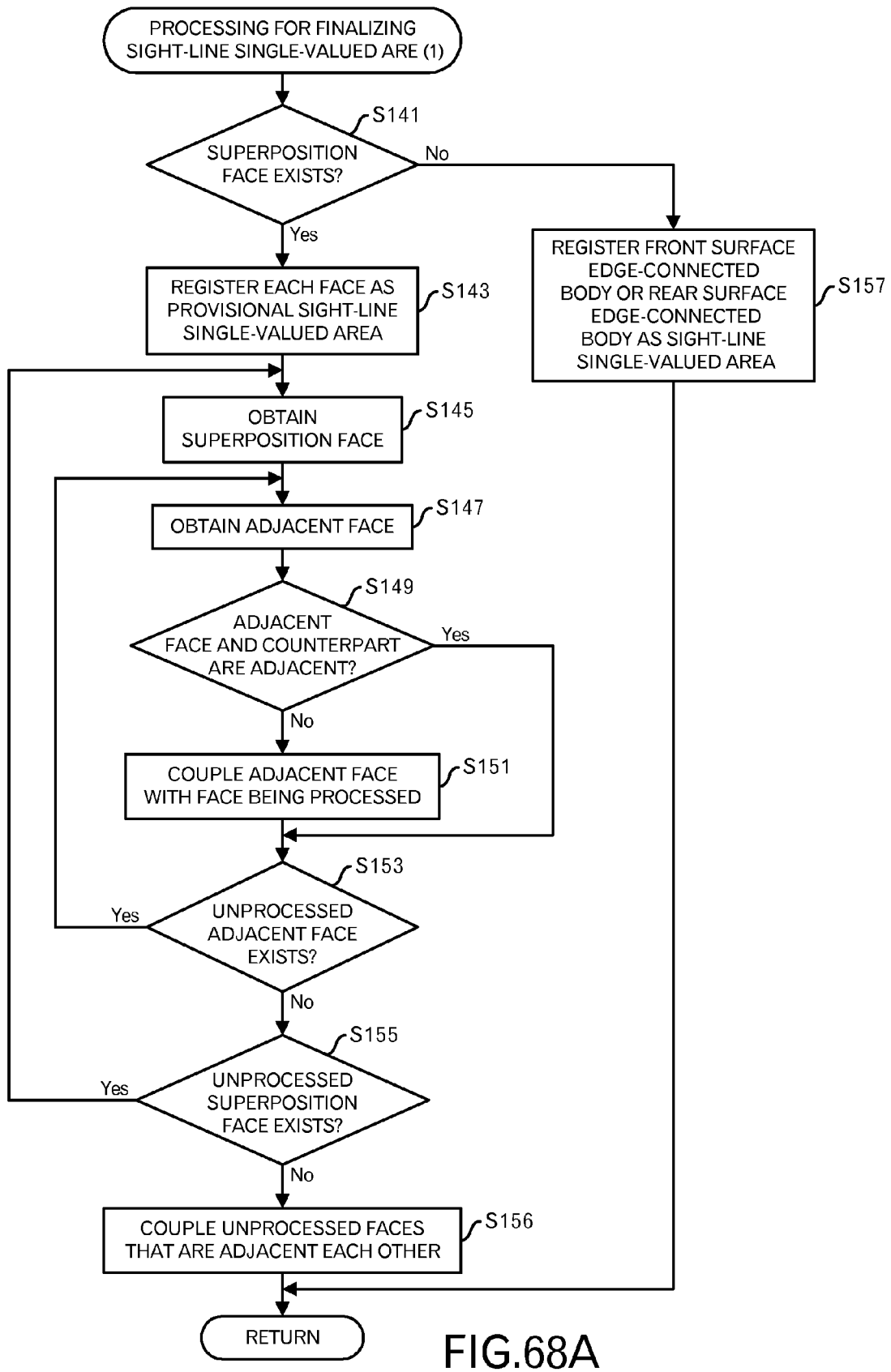
FIG. 68A is a diagram depicting a processing flow of a processing for finalizing a sight-line single-valued area in the second embodiment.
Figure 68B:
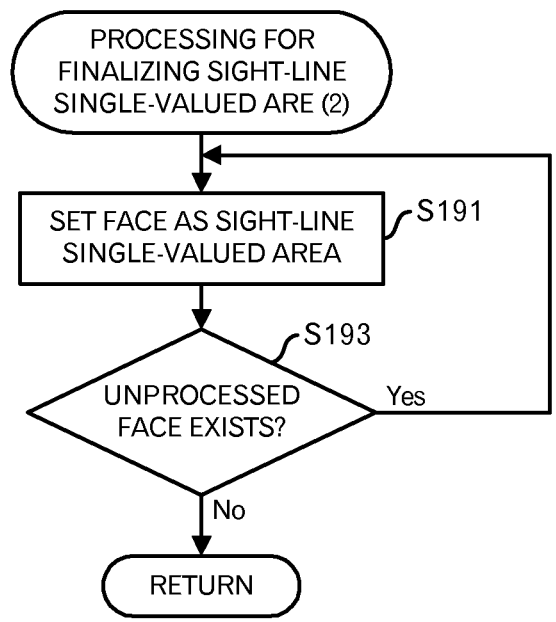
FIG. 68B is a diagram depicting a processing flow of a simple processing for finalizing a sight-line single-valued area in the second embodiment.

In the processing for finalizing the sight-line single-valued area in FIG. 68B, the sight-line single-valued area generator 123 extracts one unprocessed face from the data storage unit 107, and registers data that expresses that the face is a sight-line single-value area for the identified face (FIG. 68B: step S191). The sight-line single-valued area generator 123 then determines whether there are any unprocessed faces in the data storage unit 107 (step S193), and when there is an unprocessed face, the processing returns to the processing of step S191. However, when there are no unprocessed faces, the processing for finalizing the sight-line single-valued area ends, and the processing returns to the processing for generating the sight-line single-valued area (later half) in FIG. 33. In this way, there is no problem even though each face is finalized as a sight-line single-valued area.

However, when observing FIG. 65B, for example, it can be seen that there is no problem even when faces $f_1$, $f_2$ and $f_3$ are taken to be one sight-line single-valued area. Topological calculation can be executed at high-speed, so the efficiency of the processing may be improved by connecting divided faces. In the processing for generating the sight-line single-valued area, based on the faces that were divided out in the processing for identifying the superposition face, adjacent faces, which entirely becomes sight-line single valued even when the faces are connected, are connected together. In other words, in order that one sight-line single-valued area will become larger, divided faces are reconnected. The method for performing this processing will be explained below.

First, the sight-line single-valued area generator 123 acquires data of the boundary polyline, which is stored in the data storage unit 107, and determines whether the front surface edge-connected body or rear surface edge-connected body includes a superposition face (FIG. 68A: step S141). More specifically, it is possible to determine according to whether or not there is registration of a corresponding face on the viewpoint side or face on the opposite side of the viewpoint in the data of the boundary polyline. For example, the front surface edge-connected body in FIG. 65A is determined to include corresponding face $f_2$ and face $f_5$. When there are no superposition faces, the sight-line single-valued area generator 123 stores data that expresses that the front surface edge-connected body or rear surface edge-connected body is a sight-line single-valued area in the data storage unit 107 (step S157). For example, ON may be set to a flag representing that the edge-connected body has been finalized as being sight-line single-valued, for data of the edge-connected body in the data of the boundary polyline, or when the data of the edge-connected body is not divided into faces in the later processing, no special data may not be registered so as to handle the entire edge-connected body as being sight-line single-valued. After that, the processing for finalizing the sight-line single-valued area ends, and the processing returns to the processing for generating the sight-line single-valued area (later half) in FIG. 33.

On the other hand, when it is determined at the step S141 (FIG. 68A) that there is a superposition face, the sight-line single-valued area generator 123 initially registers each face in the data storage unit 107 as a provisional sight-line single-valued area (step S143). For example, ON may be set to a flag representing the face is the sight-line single-valued area for data of the face included in the edge-connected body in the data of the boundary polyline, or no special data may not be registered so that each of the faces is handled as being sight-line single-valued in the later processing. In the example in FIG. 65A, data that represents that each of the faces $f_1$ to $f_5$ is a sight-line single-valued area is registered, for example. The sight-line single-valued area generator 123 then acquires one unprocessed superposition face from the data of the boundary polyline in the data storage unit 107 (step S145). Here, for example, the sight-line single-valued area generator 123 acquires one superposition face that satisfies the conditions that the corresponding face is a superposition face that are registered in the order information, and that the superposition face and the corresponding faces (in the case where there are one or more corresponding faces, at least one of the corresponding faces) are all unprocessed. The faces that correspond to the acquired superposition face will be called a counterpart, for convenience' sake. Here, it is presumed that face $f_5$ is acquired from the front surface edge-connected body in FIG. 65A, and face $f_2$ is identified from the order information of the acquired face as a counterpart.

Figure 69:
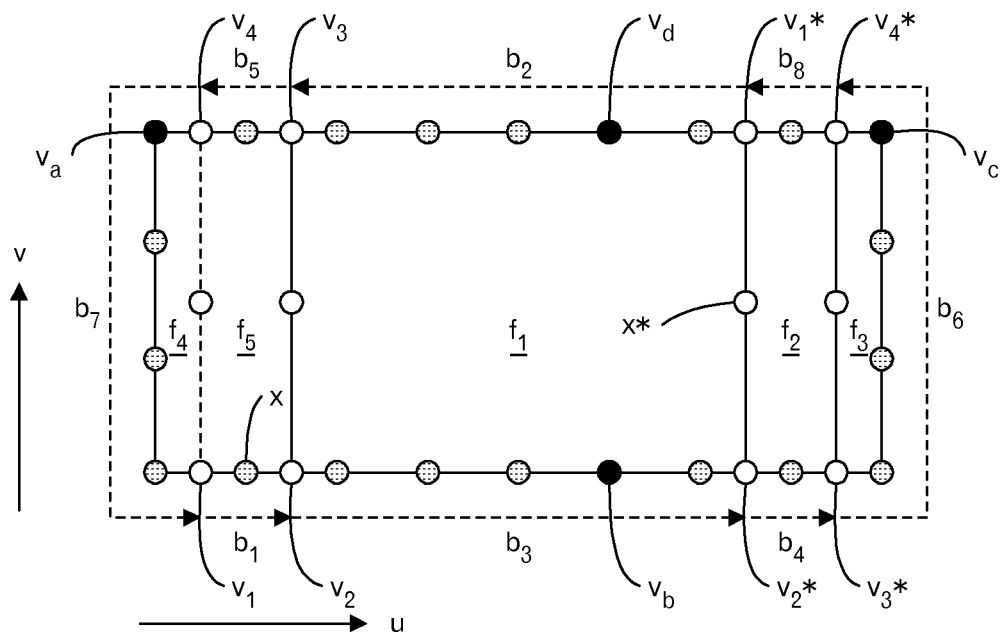
FIG. 69 is a diagram to explain the processing for finalizing the sight-line single-valued area in the second embodiment.

After that, the sight-line single-valued area generator 123 acquires one unprocessed face that is adjacent to the face X that is the object of processing (FIG. 68A: step S147). More specifically, an unprocessed face that shares an edge (the partial boundary polyline) with the face X that is the object of processing is acquired. Here, the face $f_4$ in FIG. 65A is acquired. The sight-line single-valued area generator 123 then determines whether the face that is adjacent to the face X and the counterpart of the face X are adjacent (step S149). Here, it is determined whether the adjacent face and counterpart share an edge. When the adjacent face and counterpart are adjacent, the processing moves to step S153. In the example in FIG. 65A, face $f_4$ that is adjacent to face $f_5$ and the counterpart $f_2$ of face $f_5$ do not share an edge, so they are determined not to be adjacent. When the adjacent face and counterpart are not adjacent, the sight-line single-valued area generator 123 couples the adjacent face with the face that is the object of processing (step S151). Here, as illustrated in FIG. 69, face $f_4$ and face $f_5$ are coupled to form one face. In the later processing, the coupled face $f_4$ and face $f_5$ are handled as the face to be processed.

When it is determined at the step S149 (FIG. 68A) that the adjacent face and the counterpart are not adjacent, or after the step S151, the sight-line single-valued area generator 123 determines whether there is an unprocessed face that is adjacent to the face, which is the object of processing, in the data of the boundary polyline in the data storage unit 107 (step S153). When there is an unprocessed face, the processing returns to the step S147. In the example in FIG. 69, face $f_1$ is an unprocessed adjacent face. Face $f_1$ is acquired at the step S147, and it is determined, at the step S149 after that, that face $f_1$ is adjacent to the counterpart $f_2$ of face $f_5$, then the processing moves to step S153.

On the other hand, when it is determined at the step S153 (FIG. 68A) that there are no unprocessed adjacent faces, the sight-line single-valued area generator 123 determines whether there is an unprocessed superposition face in the data of the boundary polyline in the data storage unit 107 (step S155). The processing of the face that was the object of processing is complete, and that face is finalized as one sight-line single-valued area. Similarly to the step S145, it is determined at the step S155 whether there is a superposition face that satisfies the condition that the superposition face is not processed and at least one counterpart is not processed. When there is an unprocessed superposition face, the processing returns to the step S145.

Figure 70:
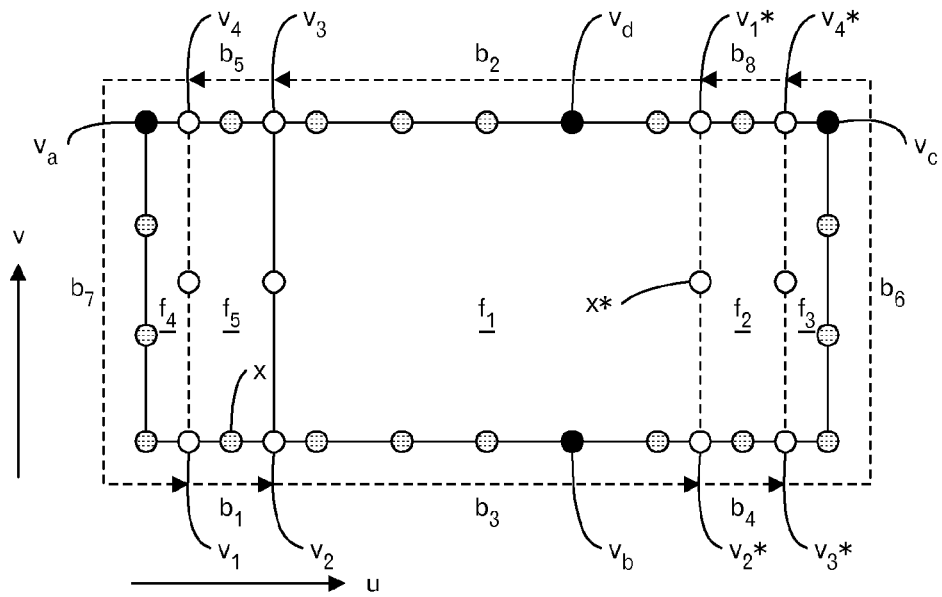
FIG. 70 is a diagram to explain the processing for finalizing the sight-line single-valued area in the second embodiment.

On the other hand, when there are no unprocessed superposition faces, the sight-line single-valued area generator 123 couples adjacent faces among the unprocessed faces (step S156). For example, as illustrated in FIG. 70, faces $f_1$, $f_2$ and $f_3$, which are remaining provisional sight-line single-valued areas, are coupled as one sight-line single-valued area. After that, the processing for finalizing the sight-line single-valued area ends, and the processing returns to the processing in FIG. 33.

In the processing for finalizing the sight-line single-valued area, plural corresponding superposition faces are coupled so as not to be included in one sight-line single-valued area. Therefore, at the step S149, as long as the adjacent face itself is not a counterpart, the adjacent face may be coupled to the face which is the object of processing at the step S151. Moreover, because the faces that are divided in the processing for identifying the superposition face are respectively sight-line single valued areas, each face may be handled as a sight-line single-valued area without performing the processing for finalizing the sight-line single-valued area. At the step S145, the order of acquiring the superposition face is arbitrary, however the superposition face may be acquired in order from the closest to the viewpoint. Moreover, these internal processing are performed frequently in the solid modeling, and are known by those skilled in the art.

Returning to the processing for generating the sight-line single-valued area (later half) in FIG. 33, the sight-line singled-valued area generator 123 determines whether there is any unprocessed front surface edge-connected body or rear surface edge-connected body in the data storage unit 107 (step S81). When there is an unprocessed front surface edge-connected body or rear surface edge-connected body, the processing returns to the step S75. On the other hand, when there are no front surface edge-connected bodies or rear surface edge-connected bodies, the processing for generating the sight-line single-valued area ends, and the processing returns to FIG. 31.

Returning to the processing in FIG. 31, the mask generator 113 acquires one unprocessed sight-line single-valued area that is stored in the data storage unit 107 (step S57). The processing of this step is the same as that of the step S7. When the entire base surface is a sight-line single-valued area, the entire base surface is acquired. The mask generator 113 also acquires data of the loop polygon from the data storage unit 107. Here, it is presumed that the faces $f_4$ and $f_5$ in FIG. 70 are acquired as the sight-line single-valued area. Moreover, as was described above, the entire base surface that is illustrated in FIG. 30 is a trimmed surface, so the data of the outer loop polygon that approximates the outer shape of the base surface is acquired. In the example used for explaining this embodiment, there is no inner loop polygon. The mask generator 113 then performs a mask data generation processing (step S59). This mask data generation processing will be explained using FIG. 71 and FIG. 72.

Figure 72:
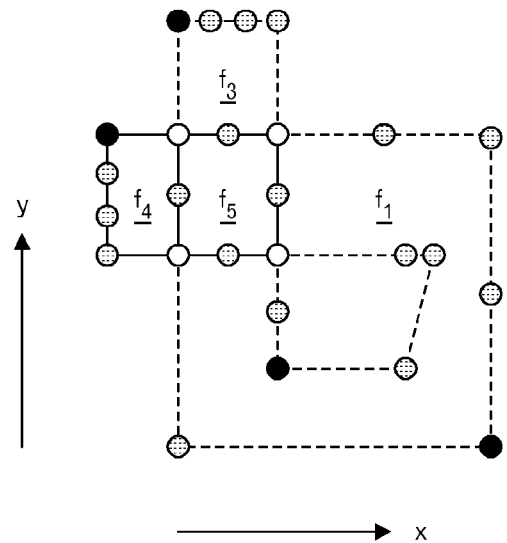
FIG. 72 is a diagram to explain the mask data generation processing.
Figure 71:
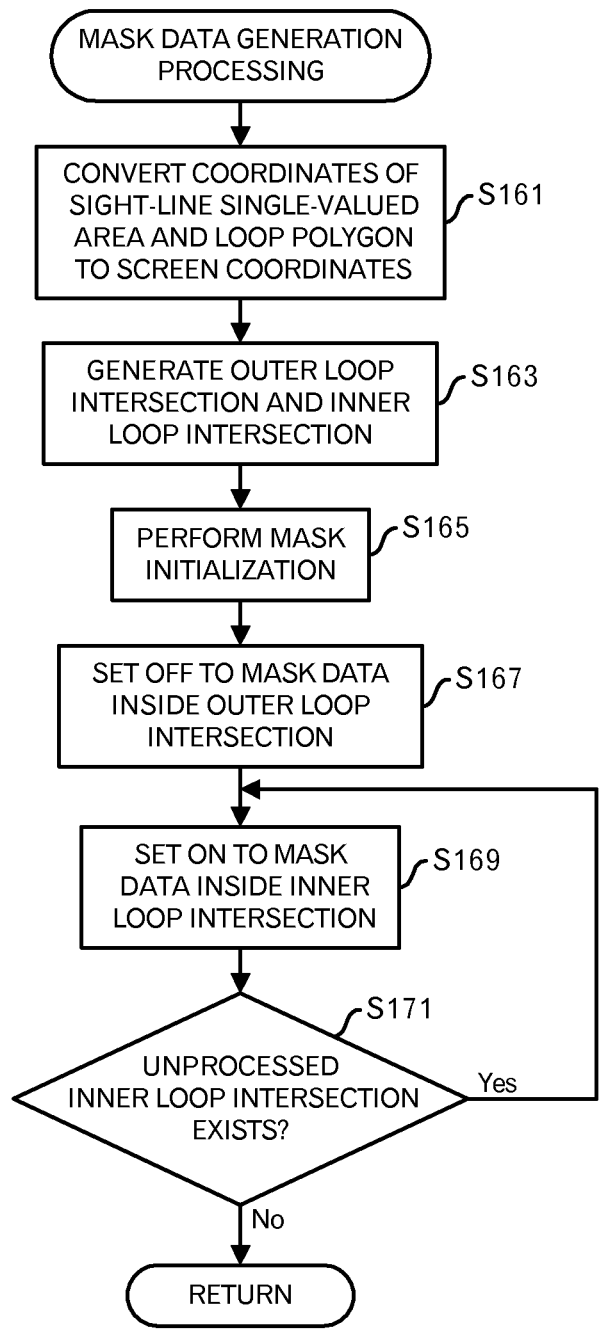
FIG. 71 is a diagram depicting a processing flow of a mask data generation processing.

FIG. 71 illustrates a processing flow of the mask data generation processing. First, the mask generator 113 converts the coordinates of the acquired sight-line single-valued area and loop polygon to screen coordinates, and stores the converted coordinates in the data storage unit 107 (FIG. 71: step S161). The processing of this step is the same as that of the step S31 (FIG. 10). In this embodiment as well, the explanation will be made using the screen coordinate system. At this step, when faces $f_4$ and $f_5$ in FIG. 70 are the sight-line single-valued area that is the object of processing, those faces are mapped onto the screen coordinate system as in FIG. 72. In FIG. 72, faces $f_1$ to $f_3$ are represented by dashed lines.

Next, the mask generator 113 uses data of the sight-line single-valued area and loop polygon, which is stored in the data storage unit 107, to generate a loop intersection, and stores the generated data in the data storage unit 107 (step S163). The processing of this step is the same as that of the step S33 (FIG. 10). At this step, an outer loop intersection having the same shape as that illustrated in FIG. 72 is obtained for the sight-line single-valued area that is the object of processing.

Using the data of the boundary polyline for the sight-line single-valued areas and the loop polygons, set operation that is faster than the polygon clipping, which was explained previously, to select fragments due to the intersection according to the type such as union, difference and intersection becomes possible. For example, when a loop polygon and a boundary of a sight-line single-valued area do not cross and the loop polygon is included inside the sight-line single-valued area, the loop polygon is a loop intersection, and when the loop polygon is not included in the sight-line single-valued area, there is no loop intersection. When a loop polygon and a boundary of a sight-line single-valued area cross, the loop polygon does not cross the boundary of the sight-line single-valued area on a curved surface boundary, however, crosses it on a front/rear boundary line or superposition polyline. Also in such a case, by selecting (synchronizing) the direction of the boundary polyline of the sight-line single-valued area and the direction of the boundary polyline of the loop polygon without any contradiction, it is possible to calculate the loop intersection faster than with the polygon clipping described above.

The mask generator 113 then initializes the mask data in the mask data storage unit 115 (FIG. 71: step S165). The processing of this step is the same as that of the step S35, and the entire mask data is initialized to ON. The mask generator 113 also uses the data of the outer-loop intersection, which is stored in the data storage unit 107, to set OFF to the mask data that corresponds to the inside of the outer-loop intersection (step S167). However, when the entire base surface is set as being a sight-line single-valued area at the step S65 (FIG. 32), and the boundaries of the trimmed surface and base surface match, and the result that the entire base surface is a sight-line single-valued area is obtained in the simplified determination processing, OFF may be set to the mask data of the entire screen, or the entire screen may be displayed without using the mask. The processing of this step is the same as that of step S37 (FIG. 10), and OFF is set to the mask data of the area that corresponds to the inside of the outer-loop intersection in FIG. 72.

After that, the mask generator 113 uses the data of the inner-loop intersection, which is stored in the data storage unit 107, to set ON to the mask data that corresponds to the inside of the inner-loop intersection (FIG. 71: step S169). The processing of this step is the same as that of the step S39 (FIG. 10). In this embodiment, there is no inner loop, so at this step, there are no areas to which ON is set. The mask generator 113 then determines whether there is an unprocessed inner-loop intersection (step S171), and when there is an unprocessed inner-loop intersection, the processing returns to the step S169. When there is an inner loop, the step S169 is repeated for all of the inner loops. On the other hand, when there is no unprocessed inner-loop intersection, the mask data generation processing ends and the processing returns to the processing in FIG. 31, and the processing moves to the processing in FIG. 73 via terminal C.

Figure 73:
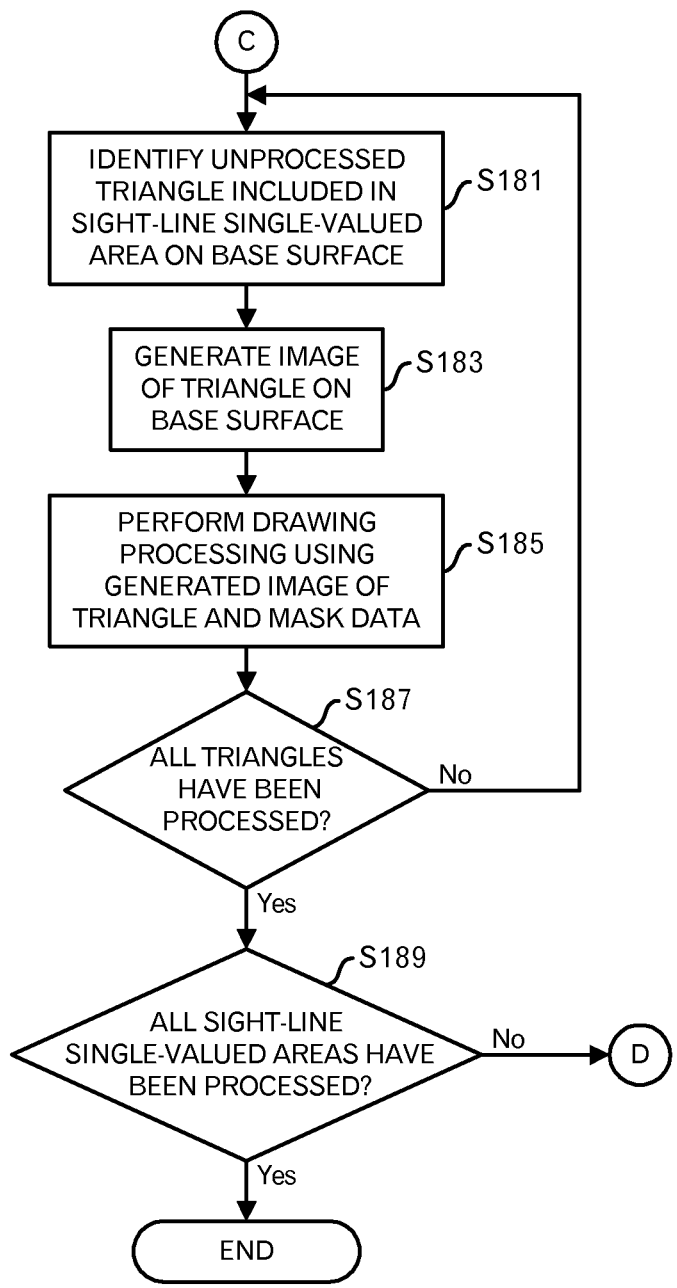
FIG. 73 is a diagram depicting a processing flow (second half) relating to the second embodiment.

After that, the image data generator 117 acquire, from the data storage unit 107, an unprocessed triangle data that is included in the sight-line single-valued area from among the triangle data that was generated by dividing the base surface (FIG. 73: step S181). The processing of this step is the same as that of the step S21 (FIG. 21). The image data generator 117 then generates image data for that triangle, and stores that image data in the data storage unit 107 (step S183). Here, the image data generator 117 generates image data by using triangle data that was generated by dividing the base surface and stored in the data storage unit 107, and viewpoint data and lighting data that are stored in the display condition storage unit 103. The processing of this step is the same as that of the step S23 (FIG. 21).

After that, the drawing processing unit 119 uses the image data that is stored in the data storage unit 107 and the mask data that is stored in the mask data storage unit 115 to perform the drawing processing on the frame buffer (FIG. 73: step S185). Here, with respect to a pixel whose mask data is OFF, the Z value is compared with a value of a Z buffer, which is stored for the pixel, and when the Z value represents the image is closer to the viewpoint side, the frame buffer is updated with the color information of the pixel. Moreover, the Z buffer is updated with the Z value. On the other hand, the drawing is not performed for pixels whose mask data is ON. The processing of this step is the same as that of the step S25 (FIG. 21).

After that, the image data generator 117 determines whether there is an unprocessed triangle from among the triangles inside the sight-line single-valued area (FIG. 73: step S187), and when there is an unprocessed triangle, the processing returns to the step S181. On the other hand, when there are no unprocessed triangles, the mask generator 113 determines whether there are any unprocessed sight-line single-valued areas (step S189), and when there is an unprocessed sight-line single-valued area, the processing returns to the processing of the step S57 (FIG. 31) by way of terminal D.

However, when there are no unprocessed sight-line single-valued areas, the processing ends.

Figure 74:
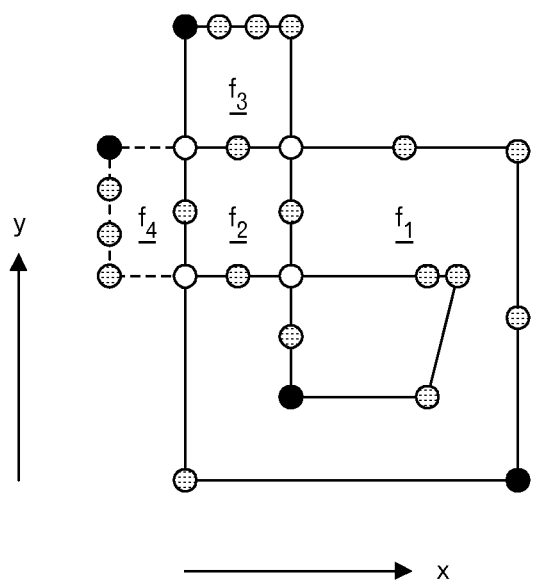
FIG. 74 is a diagram to explain the drawing processing.

According to the aforementioned processing, one trimmed surface is drawn. In this embodiment, after the drawing processing has been performed for the sight-line single-valued area in FIG. 72, the processing returns to the processing of the step S57 by way of terminal D. Then, as illustrated in FIG. 74, the drawing processing is performed for the sight-line single-valued area in which the faces $f_1$, $f_2$ and $f_3$ in FIG. 70 are coupled. By removing hidden surfaces by using the Z buffer, for example, finally face $f_5$ is displayed and face $f_2$ is not displayed.

Moreover, in this embodiment, faces are divided so that corresponding superposition faces belong to different sight-line single-valued areas, so each face can be drawn, appropriately. In this embodiment, it is presumed that the entire base surface is a trimmed surface, however, for example, even when there is an outer loop or inner loop in the portion that corresponds to face $f_5$ of the trimmed surface, the face $f_5$ and face $f_2$ respectively belong to different sight-line single-valued areas, and a mask is generated for each of the face $f_5$ and face $f_2$. Therefore, the face $f_2$ that is in the back is drawn on the outside of the outer loop or on the inside of the inner loop.

Furthermore, in the processing for finalizing the sight-line single-valued area, a larger sight-line single-valued area is generated. Therefore, the amount of calculation for calculating intersections is less than that in the conventional case in which intersection points with the loop polygons are calculated for each triangle that was obtained by dividing the base surface, so the processing load is decreased.

[Simplified Determination Processing For Sight-Line Single-Valuedness]

The simplified determination processing for the sight-line single-valuedness (FIG. 32: step S61), the explanation of which was postponed in the explanation of the second embodiment, will be explained here using FIG. 75 to FIG. 87. In the simplified determination processing for the sight-line single-valuedness, areas for which the entire base surface is assured to be sight-line single-valued are calculated in advance for each base surface. Then, it is determined whether or not an entire base surface is sight-line single valued according to whether or not the position of the viewpoint belongs to the area. A three-dimensional model, which is a collection of coordinates of viewpoints for which the entire base surface is assured to be sight-line single valued, is hereafter called a sight-line single-valuedness definite volume.

For example, with respect to a base surface for expressing a trimmed surface that is used, for example, industrially, there are a lot of cases that there are sight-line single-valuedness definite volumes, and typically, there are also a lot of cases that the viewpoint is also included in the sight-line single-valuedness definite volumes. Therefore, the simplified determination processing for the sight-line single-valuedness is effective in improving the display speed. For example, like the case of the base surface illustrated in FIG. 75, there are also base surfaces for which there is not a sight-line single-valuedness definite volume.

Figure 76:
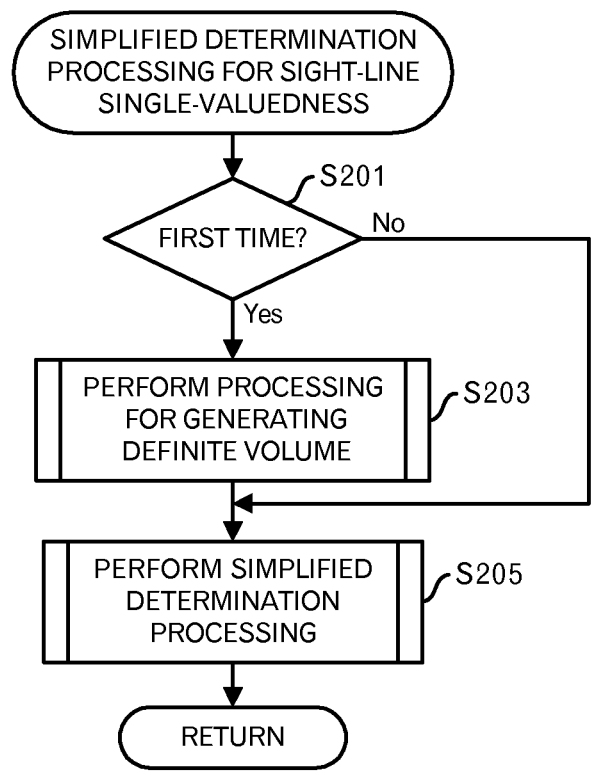
FIG. 76 is a diagram depicting a processing flow of a simplified determination processing for the sight-line single-valuedness.

The processing contents of the simplified determination processing for the sight-line single-valuedness will be explained using FIG. 76. First, the sight-line single-valued area generator 123 determines whether this time is the first time processing for the base surface that is the object of processing (FIG. 76: step S201). Here, for example, the sight-line single-valued area generator 123 determines whether a sight-line single-valuedness definite volume that is correlated with the base surface that is the object of processing is stored in the data storage unit 107. When this is not the first time processing, the processing moves to step S205. However, when this is the first time processing, the simplified determination pre-processing unit 121 performs a definite volume generation processing (step S203). The definite volume generation processing will be explained using FIG. 77 to FIG. 86. This embodiment employs a method in which determination is made first time, however, the definite volume generation processing may be executed in another processing in a CAD system or the like.

Figure 77:
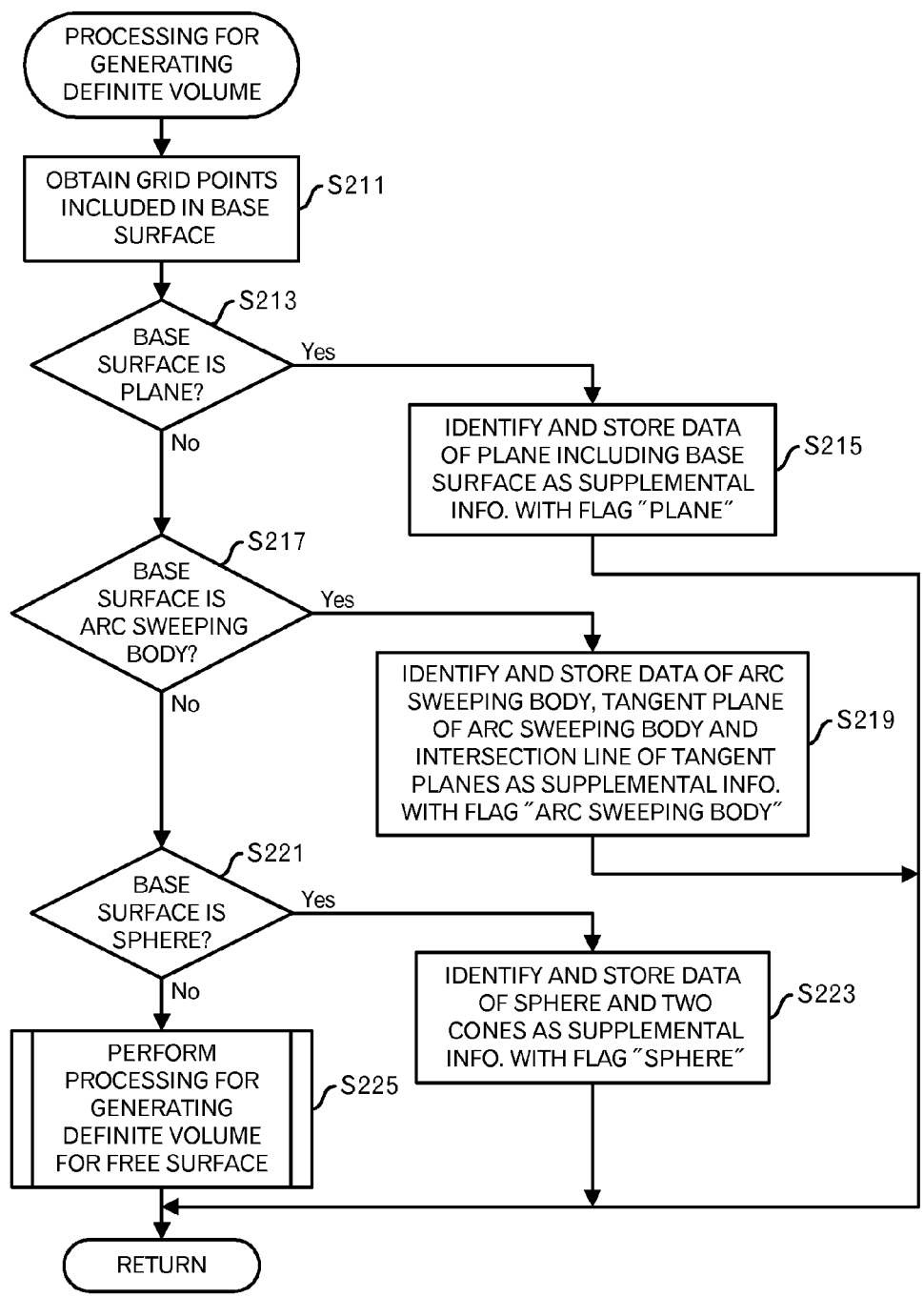
FIG. 77 is a diagram depicting a processing flow of a definite volume generation processing.

FIG. 77 illustrates a processing flow of the definite volume generation processing. First, the simplified determination pre-processing unit 121 divides the data of the base surface that is the object of processing and that is stored in the data storage unit 107 into triangles, and temporarily stores data for the grid points in the data storage unit 107 (FIG. 77: step S211). Here, based on the predetermined level of detail, the base surface is divided into lattice diagonal triangles. Dividing the base surface into triangles is a processing that is the same as that of the step S1 (FIG. 3) and step S51 (FIG. 31). Moreover, in this embodiment, a triangulation method is employed, however, a method for calculating directly from a curved surface expression may be employed.

Next, the simplified determination pre-processing unit 121 uses the data of the grid points, which is stored in the data storage unit 107, to determine whether the base surface is a plane (FIG. 77: step S213). Here, for example, this is determined by whether a plane that is determined by three points among four corner grid points includes another corner point. Points other than four corners may be used, or 5 or more points may be used for the determination. When it is determined that the base surface is a plane, the simplified determination pre-processing unit 121 identifies data of the plane that includes the base surface, and stores a flag "plane" and data that defines the plane in correlation with the base surface that is the object of processing in the data storage unit 107 (step S215). Coordinates of three grid points, for example, are stored as data that defines the plane.

Figure 78:
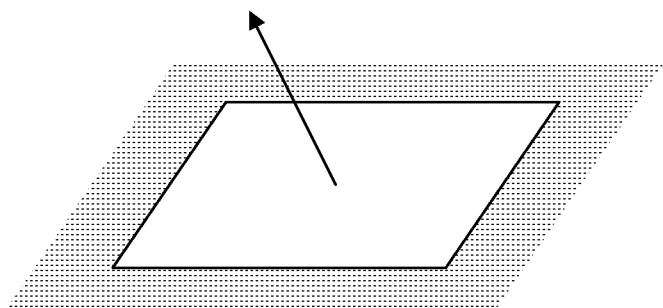
FIG. 78 is a diagram to explain a sight-line single-valuedness definite volume of a plane.

When the base surface is a plane, a region other than the plane that includes that base surface becomes a sight-line single-valuedness definite volume. For example, it is presumed that a plane and normal line are illustrated in FIG. 78, and the front surface is seen from the space on the arrow side of the plane, and the rear surface is seen from the space on the opposite side. Moreover, an example of data that is stored in the data storage unit 107 is illustrated in FIG. 79. When the base surface is a plane, a flag "plane" and geometric data for the plane are registered as in the first line of data. Here, as an option, whether or not the boundaries between the trimmed surface and base surface match may be checked, and the check result may be recorded as supplemental information. After that, the definite volume generation processing ends and the processing returns to FIG. 76.

Figure 80:
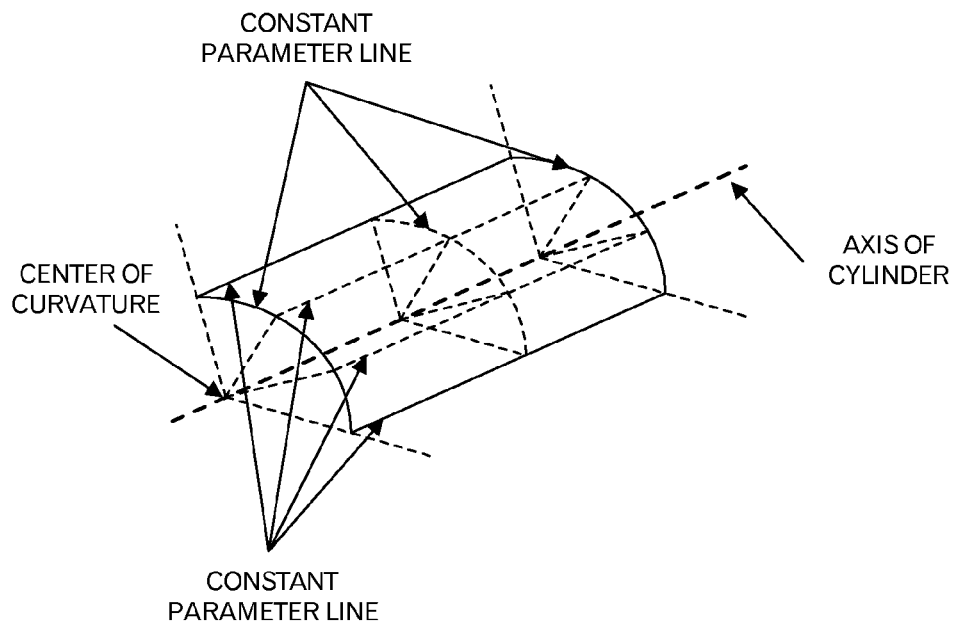
FIG. 80 is a diagram to explain determination conditions of an arc sweeping body.

On the other hand, when the base surface is not a plane, the simplified determination pre-processing unit 121 determines whether the base surface that is the object of processing and that is stored in the data storage unit 107 is an arc sweeping body (FIG. 77: step S217). Here, the base surface is determined to be an arc sweeping body, when, for constant parameter lines that are obtained by keeping one parameter value fixed and changing the other parameter values, one constant parameter line is a straight line, and the center of curvature for the other constant parameter lines is on one straight line. For example, in a base surface that is expressed by the solid lines in FIG. 80, one constant parameter line is a straight line, and the center of curvature for the other constant parameter lines is on a straight line (bold dashed line), and the base surface is determined to be an arc sweeping body. FIG. 80 illustrates a cylindrical shaped base surface, however, under the same conditions, it is possible to determine that a conical shaped base surface is an arc sweeping body.

Figure 81:
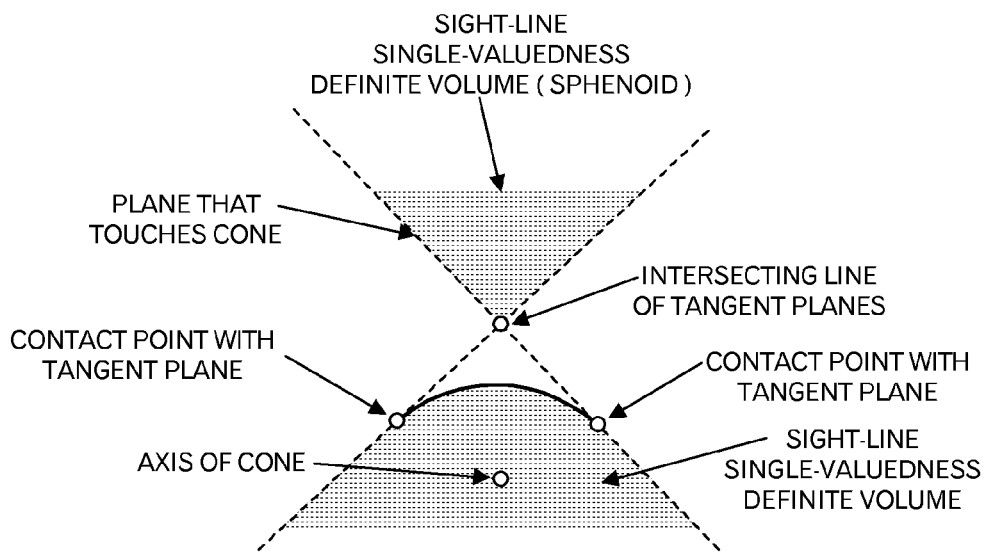
FIG. 81 is a diagram depicting a sight-line single-valuedness definite volume of the arc sweeping body.
Figure 82:
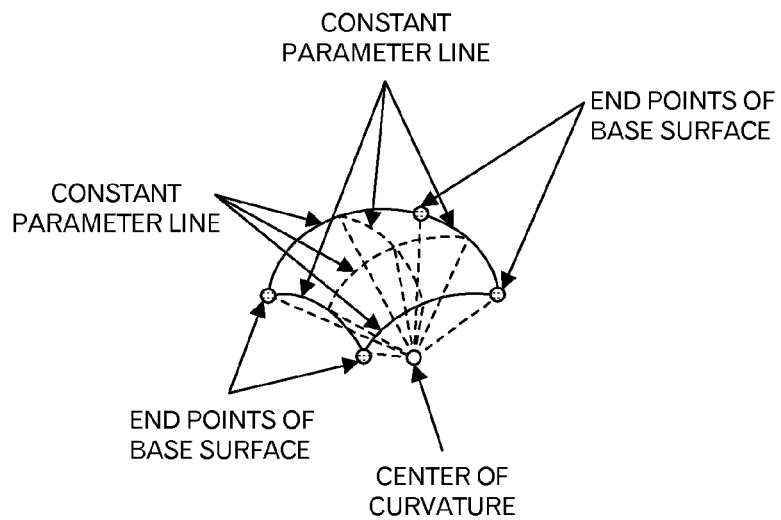
FIG. 82 is a diagram to explain determination conditions of a sphere surface.

When the base surface is determined to be an arc sweeping body, the simplified determination pre-processing unit 121 stores a flag "arc sweeping body" and supplemental information for identifying a sight-line single-valuedness definite volume in correlation with the base surface that is the object of processing, in the data storage unit 107 (FIG. 77: step S219). Here, FIG. 81 illustrates a cross-sectional view that cuts through the sight-line single-valuedness definite volume by a plane that is perpendicular to the axis of a cone. In FIG. 81, the hatched areas are sight-line single-valuedness definite volumes. In other words, the sight-line single-valuedness definite volumes are the first area including the axis of the cone in the areas that are sectioned off by the cone that is represented by the solid line and the tangent planes that are represented by the dashed lines and touch the defined boundary line of the cone, and the second area that is on the opposite side of the area including the cone over the intersecting lines of the tangent planes among the areas sectioned by the two tangent planes.

As illustrated in the second line in FIG. 79, geometric data that expresses an arc sweeping body, geometric data of two tangent planes that touch the defined boundary line of the arc sweeping body, and geometric data of the intersection line of the tangent planes are registered as supplemental information for identifying a sight-line single-valuedness definite volume. Here, as an option, it may be checked whether or not the boundaries between a trimmed surface and the base surface match, and the check result may be recorded as supplemental information. After that, the definite volume generation processing ends, and the processing returns to the processing in FIG. 76.

On the other hand, when the base surface is not an arc sweeping body, the simplified determination pre-processing unit 121 determines whether the base surface that is the object of processing and that is stored in the data storage unit 107 is a spherical surface (FIG. 77: step S221). Here, the center of curvature is calculated for the constant parameter line for u and the constant parameter line for v, and when the center of curvature is at one point, the base surface is determined to be a spherical surface. For example, as for a base surface that is expressed by the solid line in FIG. 82, the center of curvature of the constant parameter lines for u and v is at one point, so the base surface is determined to be a spherical surface.

Figure 83:
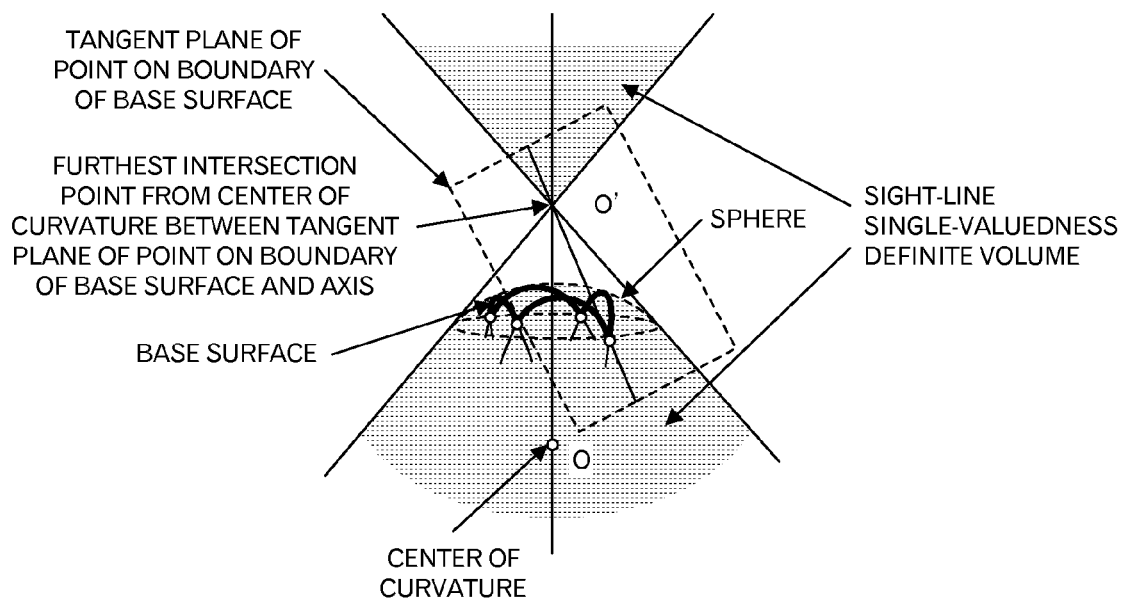
FIG. 83 is a diagram depicting a sight-line single-valuedness definite volume of the sphere surface.

When it is determined that the base surface is a spherical surface, the simplified determination pre-processing unit 121 stores a flag "spherical surface" and supplemental information for identifying a sight-line single-valuedness definite volume in correlation with the base surface that is the object of processing, in the data storage unit 107 (step S223). In the example in FIG. 83, the boundary of a spherical base surface is represented by bold lines, and the sight-line single-valuedness definite volumes of that base surface are represented as hatched areas. As illustrated in FIG. 83, the sight-line single-valuedness definite volumes are expressed by a cone and a spherical surface, and the straight line that connects the coordinates of the parameter center value of the base surface and the center of curvature of the base surface becomes the axis. The apex of the cone is the point that is furthest from the center of the curvature among the intersection points between the axis and the tangent planes on the boundary of the base surface. The sight-line single-valuedness definite volumes are the first area including the center of curvature among the areas that are sectioned off by the side surface of the cone and the spherical surface, and the second area inside of the cone on the opposite side over the apex of the cone.

As illustrated in the third line of FIG. 79, geometric data expressing a spherical surface, and geometric data for a cone such as the axis, apex and half angle of the cone, are registered as supplemental information for identifying the sight-line single-valuedness definite volume. Here, as an option, it may be checked whether the boundaries between the trimmed surface and base surface match, and the check result may be recorded as supplemental information. After that, the definite volume generation processing ends, and the processing returns to the processing in FIG. 76.

On the other hand, when the base surface is not a spherical surface, the simplified determination pre-processing unit 121 performs a definite volume generation processing for the free surface (FIG. 77: step S225). The definite volume generation processing for the free surface will be explained using FIG. 84 to FIG. 86.

Figure 84:
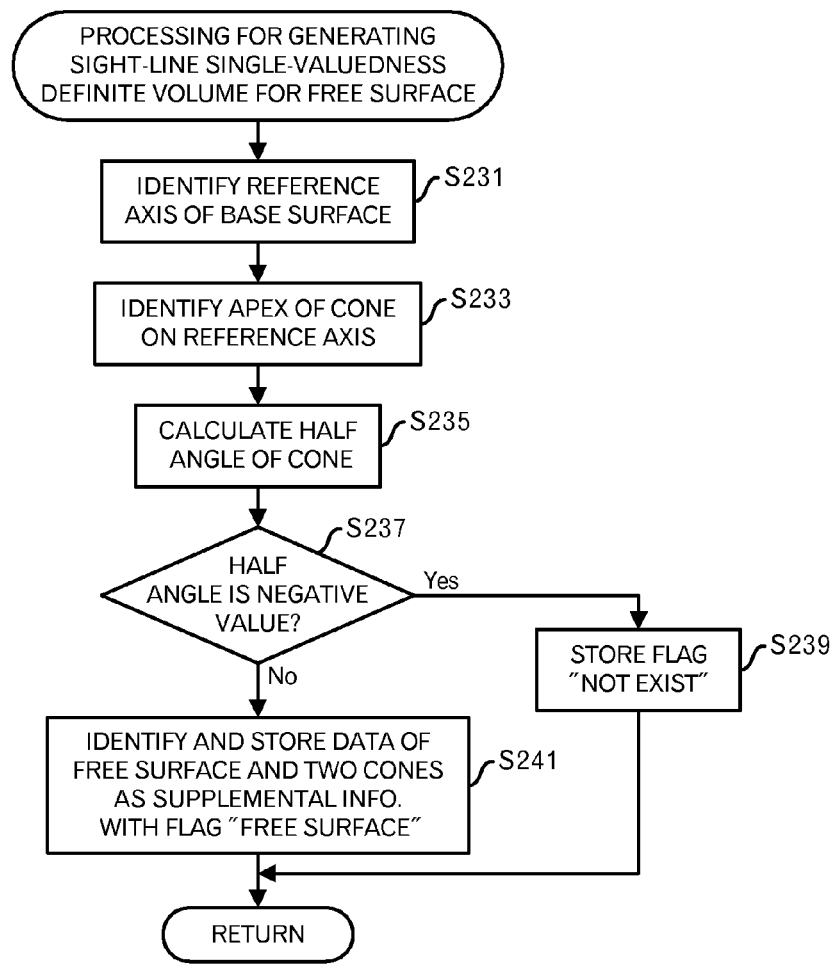
FIG. 84 is a diagram depicting a processing flow of a definite volume generation processing for a free surface.
Figure 85:
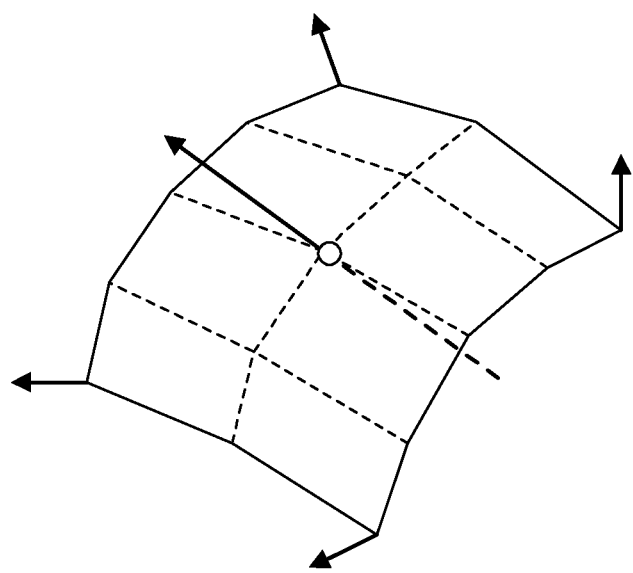
FIG. 85 is a diagram to explain a reference axis of the free surface.

FIG. 84 illustrates a processing flow of the processing for generating the sight-line single-valuedness definite volume for the free surface. First, the simplified determination pre-processing unit 121 identifies a reference axis based on the data for the base surface that is stored in the data storage unit 107, and temporarily stores geometric data expressing the reference axis in the data storage unit 107 (FIG. 84: step S231). Here, a unit normal vector V of the tangent plane that passes through the coordinates of the parameter center value of the base surface as illustrated in FIG. 85 is calculated, and a straight line that V passes is taken to be a reference axis. Next, the simplified determination pre-processing unit 121 identifies an apex of the cone on the reference axis, and temporarily stores data of the coordinates of the apex of the cone in the data storage unit 107 (step S233). Here, the intersection point between the tangent plane at each grid point that divides the base surface and the reference axis is calculated, and the point that is furthest from the base surface is taken to be the apex of a cone.

Figure 75:
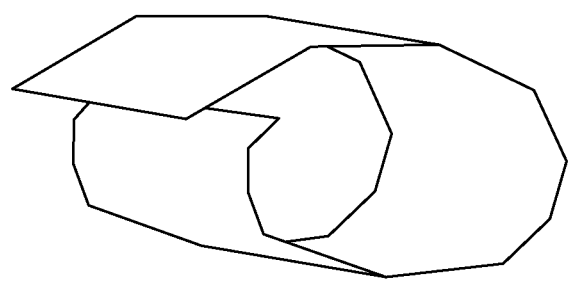
FIG. 75 is a diagram depicting an example of a base surface in which no sight-line single-valuedness definite volume exists.
Figure 86:
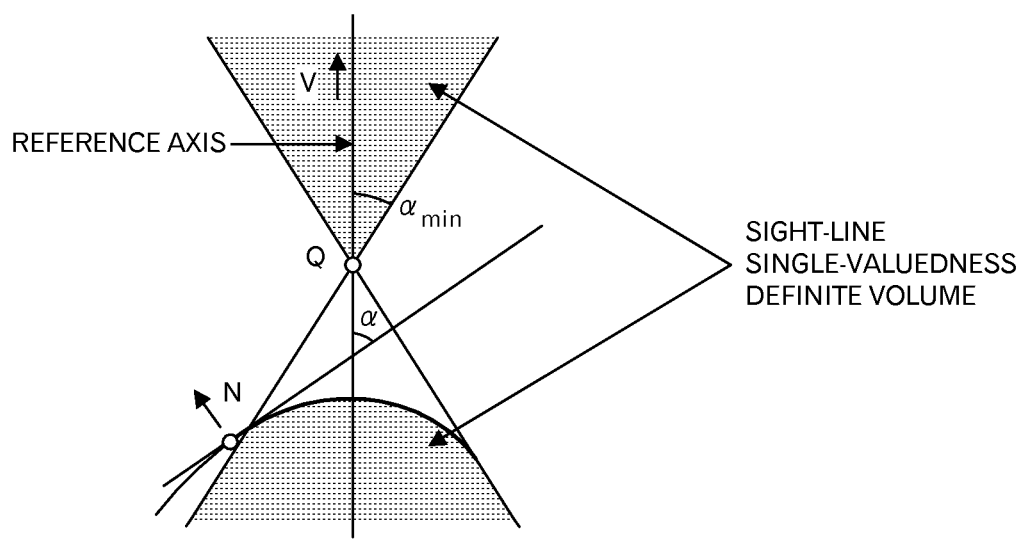
FIG. 86 is a diagram depicting the sight-line single-valuedness definite volume for the free surface.

After that, the simplified determination pre-processing unit 121 calculates the half angle of the cone (step S235). Here, as illustrated in FIG. 86, the angles α between the reference axis and the tangent planes of the base surface are calculated, and the minimum value $\alpha_{min}$ is taken to be the half angle of the cone. When the unit normal vector of the tangent plane of the base surface is taken to be N, cos α=V*N. The simplified determination pre-processing unit 121 determines whether cos $\alpha_{min}$ is a negative value (step S237). In the case of a base surface such as illustrated in FIG. 75, the reference axis and the tangent plane of the base surface cross in a portion that is lower than the base surface in FIG. 86, and α becomes an obtuse angle. As a result, the minimum value cos $\alpha_{min}$ becomes negative. When cos $\alpha_{min}$ is negative, it is determined that the sight-line single-valuedness definite volume does not exist. When cos $\alpha_{min}$ is negative, the simplified determination pre-processing unit 121 stores a flag "not exist" in the data storage unit 107 (step S239), then the definite volume generation processing ends and the processing returns to the processing in FIG. 76. For example, the flag "not exist" is registered as illustrated in the fifth line in FIG. 79.

On the other hand, when cos $\alpha_{min}$ is not a negative value, the simplified determination pre-processing unit 121 stores a flag "free surface" and supplemental information for identifying the sight-line single-valuedness definite volume in correlation with the base surface that is the object of processing, in the data storage unit 107 (step S241). In FIG. 86, the hatched areas are the sight-line single-valuedness definite volumes. In other words, cones having a side surface whose half angle $\alpha_{min}$ are defined on both sides of the apex Q of the cone on the reference axis as the center, and the sight-line single-valuedness definite volumes are the first area on the opposite side of the apex of the cone and the second area within the cone on the other side over the apex of the cone among the areas obtained by dividing the cone by the free surface. The sight-line single-valuedness definite volume for a free surface may also be calculated as a typical conic solid instead of a cone. However, when a typical conic solid is used, the determination processing becomes complex, so from the aspect of a simple determination processing, the processing for generating the sight-line single-valuedness definite volume, which uses a cone, is advantageous.

As illustrated in fourth line in FIG. 79, geometric data expressing a free surface, and geometric data for a cone, such as the axis, apex and half angle of the cone, are registered as the supplemental information for identifying a sight-line single-valuedness definite volume. Here, as an option, it may be checked whether the boundaries of the trimmed surface and base surface match, and the check result may be recorded as supplemental information. After that, the definite volume generation processing ends, and the processing returns to the processing in FIG. 76.

When the base surface is an arc sweeping solid or a sphere that is often used in the machine-type CAD, the front surface edge-connected body or rear surface edge-connected body becomes the sight-line single-valued area. In other words, the ridgeline of the side surface of an arc sweeping body or a spherical surface as seen from the viewpoint is the boundary between the front surface and rear surface, and the front surface edge-connected body or rear surface edge-connected body becomes the sight-line single-valued area. Therefore, by storing information for calculating the boundary between the front surface and rear surface in the data storage unit 107 beforehand, and then using that information when generating a sight-line single-valued area, it is possible to improve the processing efficiency even when the entire base surface is not determined to be sight-line single valued.

For example, a cone is typically expressed by parameters such as the circumferential direction and generatrix direction. Moreover, the normal vector on the generatrix of the cone is constant, and so the generatrix, which is the ridgeline as seen from the viewpoint, becomes the boundary between the front surface and rear surface. Therefore, the axis of the cone, and parameters for the circumferential direction are stored, and based on the relationship with the viewpoint, it is possible to calculate a sight-line single-valued area. The same is possible in the case of a column or a spherical surface. In the definite volume generation processing, this kind of information may also be prepared.

Figure 87:
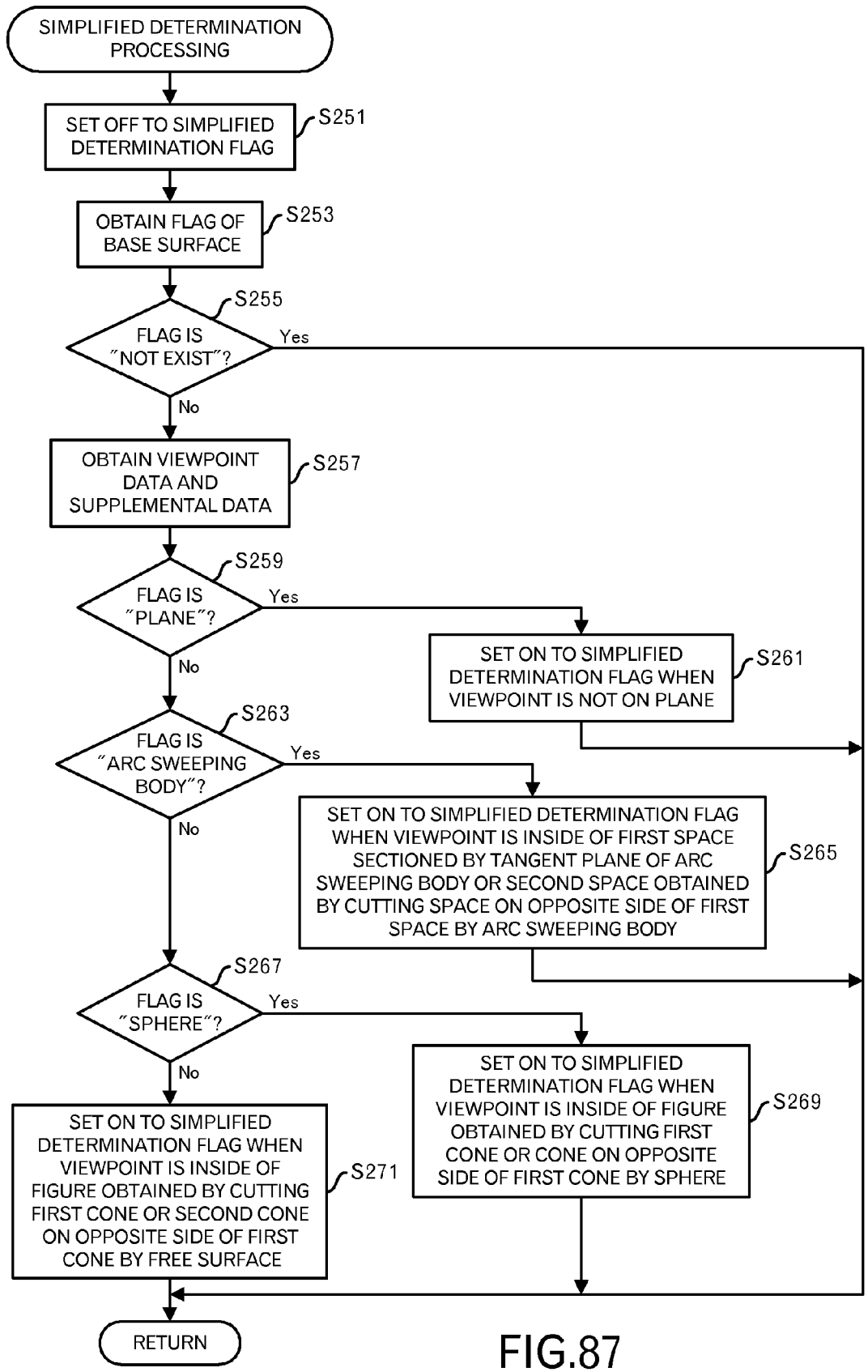
FIG. 87 is a diagram depicting a processing flow of a simplified determination processing.
Figure 89:
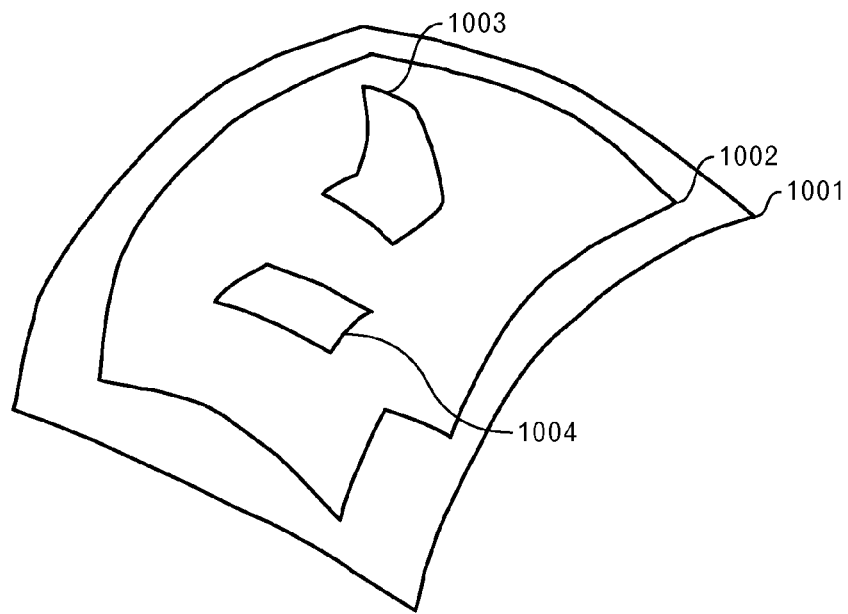
FIG. 89 is a diagram depicting a base surface and trimmed surface before the tessellation.
Figure 90:
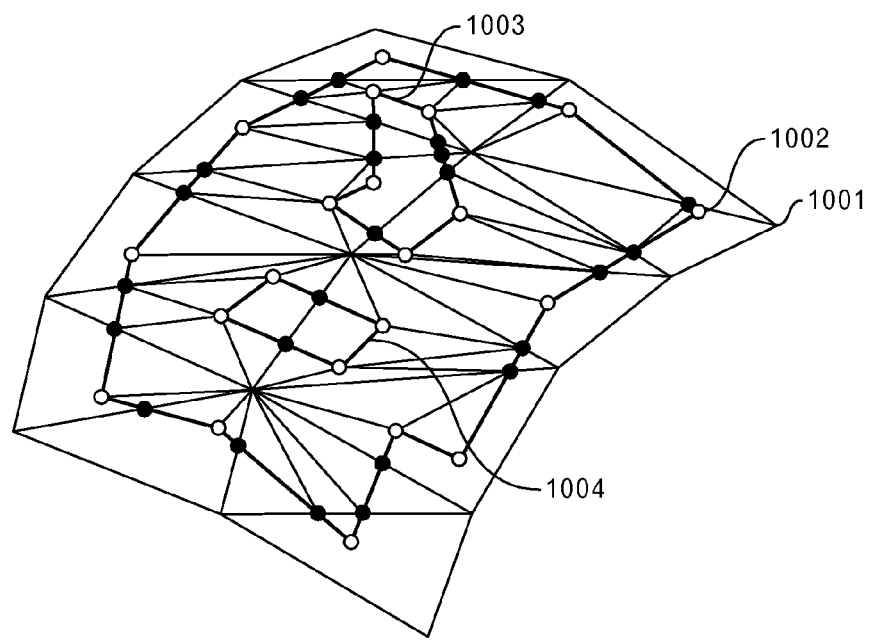
FIG. 90 is a diagram depicting the base surface that is divided into triangles and trimmed surface for which tessellation is performed.

Returning to the simplified determination processing for the sight-line single-valuedness in FIG. 76, after the step S203, or when it is determined at the step S201 that this is not the first time, the sight-line single-valued area generator 123 performs a simplified determination processing (step S205). This simplified determination processing is explained using FIG. 87. First, the sight-line single-valued area generator 123 initializes the simplified determination flag that was correlated with the base surface that is the object of processing to OFF, and stores the flag in the data storage unit 107 (FIG. 87: step S251). The sight-line single-valued area generator 123 then acquires the flag that was correlated with the base surface that is the object of processing from the data storage unit 107 (step S253). Here, data that is stored for the item "flag" of the base surface that is the object of processing is acquired from the data illustrated in FIG. 79.

Next, the sight-line single-valued area generator 123 determines whether the flag represents "not exist" (FIG. 87: step S255). When the flag represents "not exist", regardless of the position of the viewpoint, the base surface is not sight-line single-valued area, so the simplified determination processing ends while OFF is set to the simplified determination flag, and the processing returns to the simplified determination processing for the sight-line single-valuedness in FIG. 76, then after that, the processing returns to the processing for generating the sight-line single-valued area in FIG. 32.

On the other hand, when the flag does not represent "not exist", the sight-line single-valued area generator 123 acquires viewpoint data from the display condition storage unit 103 and supplemental data from the data storage unit 107 (step S257). The processing of this step may be performed simultaneously with the step S253 (FIG. 87), for example. The sight-line single-valued area generator 123 then determines whether the flag is "plane" (step S259). When the flag is "plane", the space other than the plane is the sight-line single-valuedness definite volume. Therefore, the sight-line single-valued area generator 123 determines whether the coordinates of the viewpoint that are expressed by the acquired viewpoint data are located on the plane that is registered as supplemental data, and when the coordinates representing the viewpoint is not on the plane, the sight-line single-valued area generator 123 sets ON to the simplified determination flag in the data storage unit 107 (step S261). After that, the simplified determination processing ends, and the processing returns to the processing in FIG. 76, and the processing then further returns to the processing for generating the sight-line single-valued area in FIG. 32.

On the other hand, when the flag does not represents "plane", the sight-line single-valued area generator 123 determines whether the flag represents "arc sweeping body" (FIG. 87: step S263). When the flag represents "arc sweeping body", the hatched areas in FIG. 81 are the sight-line single-valuedness definite volumes. Therefore, the sight-line single-valued area generator 123 determines whether the coordinates of the viewpoint, which is expressed by the viewpoint data, are included in the first area including the axis of the cone in the areas that are sectioned off by the tangent planes that touch the defined boundary line of the base surface and the base surface, or the second area that is on the opposite side of the area including the cone over the intersecting lines of the tangent planes among the areas sectioned by the two tangent planes, and when the coordinates are included in the first area or second area, the sight-line single-valued area generator 123 sets ON to the simplified determination flag in the data storage unit 107 (step S265). After that, the simplified determination processing ends, the processing returns to the processing in FIG. 76, and the processing then further returns to the processing for generating the sight-line single-valued area in FIG. 32.

On the other hand, when the flag does not represent "arc sweeping solid", the sight-line single-valued area generator 123 determines whether the flag represents "spherical surface" (FIG. 87: step S267). When the flag represents "spherical surface", the hatched areas in FIG. 83 are the sight-line single-valuedness definite volumes. Therefore, the sight-line single-valued area generator 123 determines whether the viewpoint coordinates that are expressed by the viewpoint data are included in the first area including the center of curvature among the areas that are sectioned off by the side surface of the cone and the spherical surface, or the second area inside of the cone on the opposite side over the apex of the cone, and when the coordinates are included in the first area or second area, the sight-line single-valued area generator 123 sets ON to the simplified determination flag in the data storage unit 107 (step S269). After that, the simplified determination processing ends and the processing returns to the processing in FIG. 76, and the processing then further returns to the processing for generating the sight-line single-valued area in FIG. 32.

On the other hand, when the flag does not represent "spherical surface", it is possible to determine that the flag represents "free surface". When the flag represents "free surface", the hatched areas in FIG. 86 are the sight-line single-valuedness definite volumes. Therefore, the sight-line single-valued area generator 123 determines whether the coordinates of the viewpoint are included in the first area on the opposite side of the apex of the cone or the second area within the cone on the other side over the apex of the cone among the areas obtained by dividing the cone by the free surface, and when the coordinates are included in the first area or second area, the sight-line single-valued area generator 123 sets ON to the simplified determination flag in the data storage unit 107 (step S271). After that, the simplified determination processing ends and the processing returns to the processing in FIG. 76, and the processing further returns to the processing for generating the sight-line single-valued area in FIG. 32.

When information is prepared for calculating the boundary between the front surface and the rear surface in the definite volume generation processing for a base surface that is an arc sweeping body or spherical surface, it is possible to easily divide the base surface into sight-line single-valued areas even when the viewpoint is not located in a sight-line single-valuedness definite volume. In other words, it is possible to generate a front surface edge-connected body and rear surface edge-connected body by the ridgeline of the side surface of an arc sweeping body or spherical surface when viewed from the viewpoint using parameters that are stored beforehand in the data storage unit 107. For example, ON may be set to a flag representing such a case in the simplified determination processing, so that in a later process, it is easy to generate a sight-line single-valued area.

By performing the processing such as described above, it is possible to easily determine whether the entire base surface is a sight-line single-valued area, and when the entire base surface is a sight-line single-valued area, it is possible to generate a mask in the drawing process based on the loop polygon shape. Therefore, the amount of calculations for calculating intersections becomes less than in the case of calculating intersection points with the loop polygons for each triangle that was obtained by dividing the base surface as was done conventionally, and thus the processing load is reduced. Moreover, as was described above, a base surface having a sight-line single-valuedness definite volume is often used, and often the viewpoint is included in the sight-line single-valuedness definite volume, so that the processing is effective for improving display speed.

Although the embodiments of this technique were explained above, this technique is not limited to those. For example, the functional block diagrams are mere examples, and do not correspond to actual program module configurations. Moreover, as for the processing flows, as long as the processing results do not change, the order of the steps may be changed, or the steps may be executed in parallel. Furthermore, the table illustrated in FIG. 79 is a mere example, data to be registered may be different.

Figure 88:
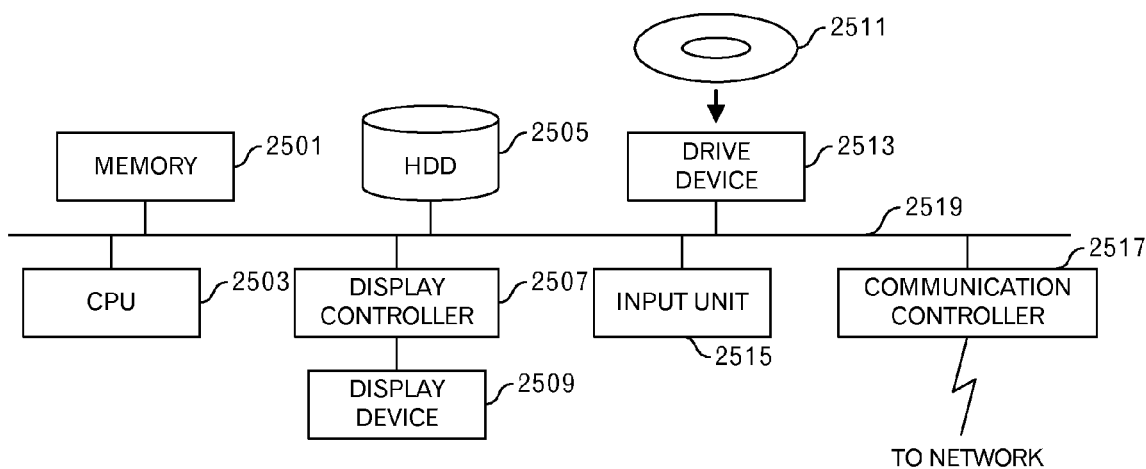
FIG. 88 is a functional block diagram of a computer.

In addition, the aforementioned display processing apparatus is a computer device as illustrated in FIG. 88. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 88. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

A frame buffer in the embodiments is realized by the memory 2501, memory provided in the display controller 2507 or the like. Then, image data stored in the frame buffer is read by the display controller 2507 and displayed on the display device 2509.

The aforementioned embodiments are outlined as follows:

A display processing method relating to the embodiments is a display processing method for displaying a shape of an object including a trimmed surface generated based on a base surface, and the display processing method includes: (A) dividing the base surface into plural triangles, and storing data of generated plural triangles into a data storage unit; (B) generating a loop polygon for loops including an outer loop for defining an outer shape of the trimmed surface and an inner loop provided, in the outer loop, depending on the shape of the object, and storing data of the generated loop polygon into the data storage unit; (C) identifying one or plural sight-line single-valued areas, each of which satisfies a condition that mapping onto a projection surface is bijection, includes plural triangles, and is an area on the base surface, based on a positional relationship between a viewpoint and the base surface, and storing data of the sight-line single-valued area into the data storage unit; (D) generating, for each of the one or plural sight-line single-valued areas, mask data that is data for controlling whether or not display is performed for each pixel from the sight-line single-valued area and the loop polygon stored in the data storage unit, and storing the generated mask data into a mask data storage unit; (E) generating image data on the projection surface for each of the plural triangles stored in the data storage unit, and storing the image data into the data storage unit; and (F) performing a drawing processing from the mask data stored in the mask data storage unit, and the image data stored in the data storage unit.

By identifying the aforementioned sight-line single-valued area, and generating mask data for each sight-line single-valued area, it becomes possible to perform the drawing more efficiently and at high speed rather than performing a processing for each triangle generated by dividing the base surface into the triangles.

The aforementioned identifying may further includes: (C1) determining, for each of the plural triangles within the base surface, whether the triangle is a front surface or rear surface with respect to a viewpoint, and storing a determination result into the data storage unit; and (C2) second identifying a front surface edge-connected body including plural triangles that are determined to be the front surface and are coupled and a rear surface edge-connected body including plural triangles that are determined to be the rear surface and are coupled.

In case of a simple shape, it is possible to process the front surface edge-connected body and rear surface edge-connected body, which are identified by such a processing, as the sight-line single-valued area. Thus, it is possible to efficiently carry out an intersection determination with the loop.

Moreover, the aforementioned identifying may further include: (C3) dividing an edge-connected body that is either of the front surface edge-connected body and the rear surface edge-connected body by a straight line passing through a boundary of the edge-connected body and the viewpoint to generate faces. In case of a more complex shape, it becomes possible to surely identify the sight-line single-valued area by executing such a processing. It may be possible to process such faces as they are as the sight-line single-valued area.

Furthermore, the aforementioned identifying may further include: (C4) coupling the generated faces for each collection of adjacent faces that do not overlap when viewed from the viewpoint. Thus, it is possible to generate a broader sight-line single-valued area, so the efficiency is improved more than a case of processing for each face.

Moreover, the aforementioned identifying may include: (C11) projecting a boundary of an edge-connected body that is either of the front surface edge-connected body and the rear surface edge-connected body onto a certain plane to divide the boundary on the certain plane into monotonic sections; and (C12) determining whether or not a number of monotonic sections is 2 or less. According to such a processing, it is possible to determine whether or not the front surface edge-connected body or rear surface edge-connected body is divided at high speed.

Furthermore, the aforementioned identifying may further include: (C13) upon detecting that the number of monotonic sections is three or more, identifying a first point (e.g. superposition point in the embodiments) that is a point on the boundary of the edge-connected body, which corresponds to an intersection point between the monotonic sections; and (C14) dividing the edge-connected body by projecting (e.g. performing curved surface projection in the embodiments) a segment on the boundary of the edge-connected body, which includes the first point, onto the edge-connected body with a straight line passing through the sight-line to generate faces. Such a processing may be executed on a parameter space, for example. Moreover, it may be possible to process the faces obtained by the processing as they are as the sight-line single-valued area.

Moreover, the aforementioned identifying may further include: (C15) upon detecting the edge-connected body has a front/rear boundary, identifying a second point (e.g. singular point in the embodiments) that touches the front/rear boundary and a line segment obtained by projecting the segment on the boundary of the edge-connected body, which includes the first point, onto the edge-connected body with a straight line passing through the sight-line. At that time, the second point may be used in addition to the first point in the dividing the edge-connected body. When the second point exists, it becomes possible to appropriately generate a face that is the sight-line single-valued area by using the second point in the dividing the edge-connected body.

Furthermore, the aforementioned identifying may further include: (C16) identifying, from the generated faces, a set of faces that overlap when viewed from the viewpoint, based on a point on a boundary including the first point; and (C17) classifying and coupling the generated faces based on an adjacent relationship so as to respectively classify faces included in the set of faces into different groups. Thus, it becomes possible to obtain a broader sight-line single-valued area, and the processing efficiency can be improved.

In addition, the aforementioned generating the mask data may include: (D1) generating outer loop intersection that is intersection between an outer loop polygon, which is a loop polygon for an outer loop among the loop polygons stored in the data storage unit, and the sight-line single-valued area, and storing the outer loop intersection into the data storage unit; (D2) generating inner loop intersection that is intersection between an inner loop polygon, which is a loop polygon for an inner loop among the loop polygons stored in the data storage unit, and the sight-line single-valued area, and storing the inner loop intersection into the data storage unit; (D3) setting mask data of first pixels on the projection surface, which correspond to points within the outer loop intersection stored in the data storage unit so as to represent the first pixels are to be displayed; and (D4) setting mask data of second pixels on the projection surface, which correspond to points within the inner loop intersection stored in the data storage unit so as to represent the second pixels are not to be displayed. Thus, appropriate mask data is generated. The processing for generating the outer loop intersection and inner loop intersection becomes efficient more than a case of performing for each triangle.

Moreover, this display processing method may further include: (G) determining a volume in a space, for which the entire base surface is assured to be the sight-line single-valued area, and storing data of the volume into the data storage unit. Then, the aforementioned identifying may include: (C21) determining whether or not the viewpoint is included in the volume; and (C22) upon determining that the viewpoint is included in the volume, identifying an area obtained by coupling all of the triangles included in the base surface as the sight-line single-valued area. Thus, the processing is simplified, and the possibility that the sight-line single-valued area can be identified at high speed even when the viewpoint moves occurs.

Moreover, the display processing method may further include: (H) before the generating the mask data, determining whether or not the outer loop is identical to a perimeter of the base surface; and (I) upon detecting that the outer loop is identical to the perimeter of the base surface and the entire base surface is the sight-line single-valued area, generating, for each of the plurality of triangles stored in the data storage unit, image data on the projected surface, and performing drawing using the image data. Thus, in a special case where the outer loop is identical to the perimeter of the base surface, a step of calculating an outer loop intersection can be omitted, so the processing speed can be enhanced. Mask may be set so as to represent all of the pixels is to be displayed, or the image data may be drawn without using the mask.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

What is claimed is:

1. A display processing method for displaying a shape of an object including a trimmed surface generated based on a base surface, the display processing method comprising:
dividing, by using a computer, the base surface into a plurality of triangles;
generating, by using the computer, a loop polygon for loops including an outer loop for defining an outer shape of the trimmed surface and an inner loop provided, in the outer loop, depending on the shape of the object;
identifying, by using the computer, one or plural sight-line single-valued areas, each of which satisfies a condition that mapping onto a projection surface is bijection, includes plural triangles, and is an area on the base surface, based on a positional relationship between a viewpoint and the base surface;
generating, by using the computer, for each of the one or plural sight-line single-valued areas, mask data that is data for controlling whether or not display is performed for each pixel from the sight-line single-valued area and the loop polygon;
generating, by using the computer, image data on the projection surface for each of the plurality of triangles; and
performing, by using the computer; a drawing processing from the mask data and the image data.

2. The display processing method as set forth in claim 1, wherein the identifying comprises:
determining, for each of the plurality of triangles within the base surface, whether the triangle is a front surface or rear surface with respect to a viewpoint; and
second identifying a front surface edge-connected body including plural triangles that are determined to be the front surface and are coupled and a rear surface edge-connected body including plural triangles that are determined to be the rear surface and are coupled.

3. The display processing method as set forth in claim 2, wherein the identifying further comprises:
dividing an edge-connected body that is either of the front surface edge-connected body and the rear surface edge-connected body by a straight line passing through a boundary of the edge-connected body and the viewpoint to generate faces.

4. The display processing method as set forth in claim 3, wherein the identifying further comprises:
coupling the generated faces for each collection of adjacent faces that do not overlap when viewed from the viewpoint.

5. The display processing method as set forth in claim 1, wherein the identifying comprises:
projecting a boundary of an edge-connected body that is either of the front surface edge-connected body and the rear surface edge-connected body onto a certain plane to divide the boundary on the certain plane into monotonic sections; and
determining whether or not a number of monotonic sections is 2 or less.

6. The display processing method as set forth in claim 5, wherein the identifying further comprises:
upon detecting that the number of monotonic sections is three or more, identifying a first point that is a point on the boundary of the edge-connected body, which corresponds to an intersection point between the monotonic sections; and
dividing the edge-connected body by projecting a segment on the boundary of the edge-connected body, which includes the first point, onto the edge-connected body with a straight line passing through the viewpoint to generate faces.

7. The display processing method as set forth in claim 6, wherein the identifying further comprises:
upon detecting the edge-connected body has a front/rear boundary, identifying a second point that touches the front/rear boundary and a line segment obtained by projecting the segment on the boundary of the edge-connected body, which includes the first point, onto the edge-connected body with a straight line passing through the viewpoint, and wherein the second point is used in addition to the first point in the dividing the edge-connected body.

8. The display processing method as set forth in claim 6, wherein the identifying further comprises:

identifying, from the generated faces, a set of faces that overlap when viewed from the viewpoint, based on a point on a boundary including the first point; and classifying and coupling the generated faces based on an adjacent relationship so as to respectively classify faces included in the set of faces into different groups.

9. The display processing method as set forth in claim 1, wherein the generating the mask data comprises:

generating outer loop intersection that is intersection between an outer loop polygon, which is a loop polygon for an outer loop among the loop polygons, and the sight-line single-valued area;

generating inner loop intersection that is intersection between an inner loop polygon, which is a loop polygon for an inner loop among the loop polygons, and the sight-line single-valued area;

setting mask data of first pixels on the projection surface, which correspond to points within the outer loop intersection so as to represent the first pixels are to be displayed; and setting mask data of second pixels on the projection surface, which correspond to points within the inner loop intersection so as, to represent the second pixels are not to be displayed.

10. The display processing method as set forth in claim 1, further comprising:

determining a volume in a space, for which the entire base-surface is assured to be the sight-line single-valued area, wherein the identifying comprises:

determining whether or not the viewpoint is included, in the volume;

upon determining that the viewpoint is included in the volume, identifying an area obtained by coupling all of the triangles included in the base surface as the sight-line single-valued area.

11. The display processing method as set forth in claim 1, further comprising:

before the generating the mask data, determining whether or not the outer loop is identical to a perimeter of the base surface; and upon detecting that the outer loop is identical to the perimeter of the base surface and the entire base surface is the sight-line single-valued area, generating, for each of the plurality of triangles, image data on the projected surface, and performing drawing using the image data.

12. A computer-readable, non-transitory storage medium storing a program for causing a computer to execute a display processing process for displaying a shape of an object including a trimmed surface generated based on a base surface, the display processing process comprising:

dividing the base surface into a plurality of triangles;

generating a loop polygon for loops including an outer loop for defining an outer shape of the trimmed surface and an inner loop provided, in the outer loop, depending on the shape of the object;

identifying one or plural sight-line single-valued areas, each of which satisfies a condition that mapping onto a projection surface is bijection, includes plural triangles, and is an area on the base surface, based on a positional relationship between a viewpoint and the base surface;

generating for each of the one, or plural sight-line single-valued areas, mask data that is data for controlling whether or not display is performed for each pixel from the sight-line single-valued area and the loop polygon;

generating image data on the projection surface for each of the plurality of triangles; and performing a drawing processing from the mask data and the image data.

13. A display processing apparatus, comprising:

a memory; and a processor or plural processors configured to use the memory and execute a display processing process for displaying a shape of an object including a trimmed surface generated based on a base surface, the display processing process comprising:

dividing the base surface into a plurality of triangles;

generating a loop polygon for loops including an outer loop for defining an outer shape of the trimmed surface and an inner loop provided, in the outer loop, depending on the shape of the object;

identifying one or plural sight-line single-valued areas, each of which satisfies a condition that mapping onto a projection surface is bijection, includes plural triangles, and is an area on the base surface, based on a positional relationship between a viewpoint and the base surface;

generating for each of the one or plural sight-line single-valued areas, mask data that is data for controlling whether or not display is performed for each pixel from the sight-line single-valued area and the loop polygon;

generating image data on the projection surface for each of the plurality of triangles; and performing a drawing processing from the mask data and the image data.

* * * * *

UNITED STATES PATENT AND TRADEMARK OFFICE
CERTIFICATE OF CORRECTION

Page 1 of 1

PATENT NO. : 8,717,356 B2
APPLICATION NO. : 13/898049
DATED : May 6, 2014
INVENTOR(S) : Mori It is certified that error appears in the above-identified patent and that said Letters Patent is hereby corrected as shown below:

In the Claims

Column 42, Line 40, in Claim 5, delete "claim 1," and insert -- claim 2, --, therefor.

Signed and Sealed this
Nineteenth Day of August, 2014

Michelle K. Lee
*Deputy Director of the United States Patent and Trademark Office*